US012604317B2

(12) United States Patent
Cirik et al.

(10) Patent No.: US 12,604,317 B2
(45) Date of Patent: Apr. 14, 2026

(54) TRANSMISSION CONFIGURATION INDICATOR STATE MANAGEMENT

(71) Applicant: Comcast Cable Communications, LLC, Philadelphia, PA (US)

(72) Inventors: Ali Cagatay Cirik, Chantilly, VA (US); Hua Zhou, Vienna, VA (US); Esmael Hejazi Dinan, McLean, VA (US); Kai Xu, Herndon, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 272 days.

(21) Appl. No.: 18/308,787

(22) Filed: Apr. 28, 2023

(65) Prior Publication Data
US 2023/0354332 A1 Nov. 2, 2023

Related U.S. Application Data

(60) Provisional application No. 63/336,097, filed on Apr. 28, 2022.

(51) Int. Cl.
| | |
|---|---|
| *H04W 72/12* | (2023.01) |
| *H04W 52/14* | (2009.01) |
| *H04W 72/1273* | (2023.01) |
| *H04W 72/23* | (2023.01) |

(52) U.S. Cl.
CPC ..... *H04W 72/1273* (2013.01); *H04W 52/146* (2013.01); *H04W 72/23* (2023.01)

(58) Field of Classification Search
CPC ........... H04W 72/1273; H04W 52/146; H04W 72/23; H04W 72/51; H04W 72/232;

H04B 7/06968; H04B 7/06952; H04B 7/088; H04L 5/001; H04L 5/0048; H04L 5/0051; H04L 5/0044; H04L 5/0094; H04L 5/0035

See application file for complete search history.

(56) References Cited

U.S. PATENT DOCUMENTS

| | | | |
|---|---|---|---|
| 12,328,271 B2 * | 6/2025 | Farag | H04L 5/0032 |
| 2020/0350972 A1 | 11/2020 | Yi et al. | |
| 2020/0351892 A1 | 11/2020 | Yi et al. | |
| 2021/0136802 A1 | 5/2021 | Cirik et al. | |

(Continued)

FOREIGN PATENT DOCUMENTS

| | | |
|---|---|---|
| WO | 2021011442 A1 | 1/2021 |
| WO | 2021026325 A1 | 2/2021 |

(Continued)

OTHER PUBLICATIONS

R1-2107720; 3GPP TSG-RAN WG1 Meeting #106-e; e-Meeting, Aug. 16-27, 2021; Agenda Item: 8.1.2.2; Source: Apple Inc.; Title: On Inter-Cell Multi-TRP Enhancement (Year: 2021).*

(Continued)

*Primary Examiner* — Lan-Huong Truong
(74) *Attorney, Agent, or Firm* — Banner & Witcoff, Ltd.

(57) ABSTRACT

A wireless device may use different power control sets to communicate with different transmission reception points (TRPs). The power control set for communicating with a particular TRP may be selected from at least two power control sets configured for a resource (such as a bandwidth part (BWP)), for example, based on a transmission configuration indicator (TCI) state corresponding to the particular TRP.

19 Claims, 22 Drawing Sheets

(56) References Cited

U.S. PATENT DOCUMENTS

| 2021/0314953 | A1  | 10/2021 | Park et al. | |
|---|---|---|---|---|
| 2021/0360594 | A1  | 11/2021 | Park et al. | |
| 2021/0360616 | A1  | 11/2021 | Yi et al. | |
| 2022/0022141 | A1  | 1/2022  | Cirik et al. | |
| 2022/0030620 | A1  | 1/2022  | Cirik et al. | |
| 2022/0109541 | A1  | 4/2022  | Cirik et al. | |
| 2024/0030982 | A1* | 1/2024  | Cirik | H04B 7/0626 |
| 2024/0049143 | A1* | 2/2024  | Yuan | H04W 52/325 |
| 2024/0372679 | A1* | 11/2024 | Zhu | H04L 5/0053 |

FOREIGN PATENT DOCUMENTS

| WO | 2021206990     | A1  | 10/2021 | | |
|---|---|---|---|---|---|
| WO | WO-2021203414  | A1* | 10/2021 | | H04L 5/0053 |
| WO | 2021/231117    | A1  | 11/2021 | | |
| WO | 2022/046717    | A1  | 3/2022  | | |
| WO | 2022/066740    | A1  | 3/2022  | | |
| WO | 2022047122     | A1  | 3/2022  | | |

OTHER PUBLICATIONS

3GPP TS 38.212 V17.1.0 (Mar. 2022), 3rd Generation Partnership Project; Technical Specification Group Radio Access Network; NR; Multiplexing and channel coding (Release 17).

3GPP TS 38.213 V17.1.0 (Mar. 2022), 3rd Generation Partnership Project; Technical Specification Group Radio Access Network; NR; Physical layer procedures for control (Release 17).

3GPP TS 38.214 V17.1.0 (Mar. 2022) 3rd Generation Partnership Project; Technical Specification Group Radio Access Network; NR; Physical layer procedures for data (Release 17).

3GPP TS 38.300 V17.0.0 (Mar. 2022), 3rd Generation Partnership Project; Technical Specification Group Radio Access Network;NR; NR and NG-RAN Overall Description;Stage 2 (Release 17).

3GPP TS 38.321 V17.0.0 (Mar. 2022), 3rd Generation Partnership Project; Technical Specification Group Radio Access Network;NR;Medium Access Control (MAC) protocol specification (Release 17).

3GPP TS 38.331 V17.0.0 (Mar. 2022) 3rd Generation Partnership Project; Technical Specification Group Radio Access Network; NR; Radio Resource Control (RRC) protocol specification (Release 17).

3GPP TSG RAN WG1 #107-e, e-Meeting, Nov. 11-19, 2021, Title: RAN1 Chair's Notes.

R1-2106463 3GPP TSG RAN WG1 Meeting #106-e, e-Meeting, Aug. 16-27, 2021, Source: Huawei, HiSilicon, Title: Enhancements on multi-beam operation in Rel-17.

R1-2106541 3GPP TSG RAN WG1 Meeting #106-e, e-Meeting, Aug. 16-27, 2021, Source: ZTE, Title: Enhancements on Multi-beam Operation.

R1-2106571 3GPP TSG RAN WG1 Meeting #106-e, e-Meeting, Aug. 16-27, 2021, Source: vivo, Title: Further discussion on multi beam enhancement.

R1-2106640 3GPP TSG RAN WG1 Meeting #106-e, e-Meeting, Aug. 16-27, 2021, Source: InterDigital, Inc., Title: Remaining Details on Enhancements for Multi-beam Operation.

R1-2106666 3GPP TSG RAN WG1 Meeting #106-e, e-Meeting, Aug. 16-27, 2021, Source: Lenovo, Motorola Mobility, Title: Enhancements on Multi-beam Operation.

R1-2106685 3GPP TSG RAN WG1 Meeting #106-e, e-Meeting, Aug. 16-27, 2021, Source: Spreadtrum Communications, Title: Enhancements on Multi-beam Operation.

R1-2106789 3GPP TSG RAN WG1#106e, E-meeting Aug. 16-27, 2021, Source: Sony, Title: Further enhancement on multi-beam operation.

R1-2106864 3GPP TSG RAN WG1 Meeting #106-e, e-Meeting, Aug. 16-27, 2021, Source: Moderator (Samsung), Title: Moderator summary for multi-beam enhancement.

R1-2106865 3GPP TSG RAN WG1 Meeting #106-e, e-Meeting, Aug. 16-27, 2021, Source: Samsung, Title: Multi-beam enhancements.

R1-2106935 3GPP TSG RAN WG1 Meeting #106-e, e-Meeting, Aug. 16-27, 2021, Source: CATT, Title: Discussions on enhancements on multi-beam operation.

R1-2107029 3GPP TSG RAN WG1 Meeting #106-e, e-Meeting, Aug. 16-27, 2021, Source: Fujitsu, Title: Enhancements on Multi-beam Operation.

R1-2107085 3GPP TSG RAN WG1 Meeting #106-e, e-Meeting, Aug. 16-27, 2021, Source: Futurewei, Title: Enhancement on multi-beam operation.

R1-2107143 3GPP TSG RAN WG1 Meeting #106-e, e-Meeting, Aug. 16-27, 2021, Source: NEC, Title: Discussion on multi-beam operation.

R1-2107203 3GPP TSG RAN WG1 Meeting #106-e, e-Meeting, Aug. 16-27, 2021, Source: OPPO, Title: Enhancements on Multi-Beam Operation.

R1-2107297 3GPP TSG RAN WG1 Meeting #106-e, e-Meeting, Aug. 16-27, 2021, Source: FGI, Asia Pacific Telecom, Title: Discussion of enhancements on multi-beam operation.

R1-2107323 3GPP TSG RAN WG1 Meeting #106-e, e-Meeting, Aug. 16-27, 2021, Source: Qualcomm Incorporated, Title: Enhancements on Multi-beam Operation.

R1-2107390 3GPP TSG RAN WG1 Meeting #106-e, e-Meeting, Aug. 16-27, 2021, Source: CMCC, Title: Enhancements on multi-beam operation.

R1-2107464 3GPP TSG RAN WG1 Meeting #106-e, e-Meeting, Aug. 16-27, 2021, Source: Fraunhofer IIS, Fraunhofer HHI, Title: Enhancements on multi-beam operation.

R1-2107485 3GPP TSG RAN WG1 Meeting #106-e, e-Meeting, Aug. 16-27, 2021, Source: MediaTek Inc., Title: Enhancement on multi-beam operation.

R1-2107570 3GPP TSG RAN WG1 Meeting #106-e, e-Meeting, Aug. 16-27, 2021, Source: Intel Corporation, Title: Enhancements to Multi-Beam Operation.

R1-2107628 3GPP TSG RAN WG1 Meeting #106-e, e-Meeting, Aug. 16-27, 2021, Source: Ericsson, Title: Enhancements on Multi-beam Operation.

R1-2107689 3GPP TSG RAN WG1 Meeting #106-e, e-Meeting, Aug. 16-27, 2021, Source: AT&T, Title: Enhancements on Multi-Beam Operations.

R1-2107718 3GPP TSG RAN WG1 Meeting #106-e, e-Meeting, Aug. 16-27, 2021, Source: Apple Inc., Title: On Beam Management Enhancement.

R1-2107814 3GPP TSG RAN WG1 Meeting #106-e, e-Meeting, Aug. 16-27, 2021, Source: LG Electronics, Title: Enhancements on Multi-beam Operation.

R1-2107838 3GPP TSG RAN WG1 Meeting #106-e, e-Meeting, Aug. 16-27, 2021, Source: NTT Docomo, Inc, Title: Discussion on multi-beam operation.

R1-2107893 3GPP TSG RAN WG1 Meeting #106-e, e-Meeting, Aug. 16-27, 2021, Source: Xiaomi, Title: Enhancements on multi-beam operation.

R1-2108019 3GPP TSG RAN WG1 Meeting #106-e, e-Meeting, Aug. 16-27, 2021, Source: Convida Wireless, Title: Enhancements on Multi-beam Operation.

R1-2108052 3GPP TSG RAN WG1 Meeting #106-e, e-Meeting, Aug. 16-27, 2021, Source: Nokia, Nokia Shanghai Bell, Title: Enhancements on Multi-beam Operation.

R1-2108231 3GPP TSG RAN WG1 Meeting #106-e, e-Meeting, Aug. 16-27, 2021, Source: Ericsson, Title: Enhancements on Multi-beam Operation.

R1-2108325 3GPP TSG RAN WG1 Meeting #106-e, e-Meeting, Aug. 16-27, 2021, Source: Moderator (Samsung), Title: Moderator summary#2 for multi-beam enhancement: Round 1.

R1-2108361 3GPP TSG RAN WG1 Meeting #106-e, e-Meeting, Aug. 16-27, 2021, Source: Moderator (Samsung), Title: Moderator summary#3 for multi-beam enhancement: Round 2.

R1-2108399 3GPP TSG RAN WG1 Meeting #106-e, e-Meeting, Aug. 16-27, 2021, Source: Moderator (Samsung), Title: Moderator summary#4 for multi-beam enhancement: Round 3.

R1-2108557 3GPP TSG RAN WG1 Meeting #106-e, e-Meeting, Aug. 16-27, 2021, Source: Moderator (Samsung), Title: Moderator summary#5 for multi-beam enhancement: Round 4.

(56) References Cited

OTHER PUBLICATIONS

R1-2108648 3GPP TSG RAN WG1 Meeting #106-e, e-Meeting, Aug. 16-27, 2021, Source: Moderator (Samsung), Title: Moderator summary#6 for multi-beam enhancement: Round 5.

R1-2110955 3GPP TSG RAN WG1 Meeting #107-e, e-Meeting, Nov. 11-19, 2021, Source: ZTE, Title: Further details on Multi-beam and Multi-TRP operation.

R1-2203541 3GPP TSG RAN WG1 #109-e, e-Meeting, May 9-20, 2022, Source: vivo, Title: Views on unified TCI framework extension for multi-TRP.

R1-2106864 3GPP TSG RAN WG1 Meeting #106-e, e-Meeting, Aug. 16-27, 2021, Source: Moderator (Samsung), Title: Summary of offline discussion on unified TCI and inter-cell beam management.

Sep. 29, 2023—European Search Report—EP App. No. 23170658. 1.

* cited by examiner

IP Packets

QoS Flows

SDAP
215/225

QoS Flow Handling

Radio
Bearers

PDCP
214/224

Header Comp.,
Ciphering

Header Comp.,
Ciphering

Reordering,
Retransmission

Reordering,
Retransmission

RLC
Channels

RLC
213/223

Segmentation,
ARQ

Segmentation,
ARQ

Logical
Channels

MAC
212/222

Multiplexing

HARQ

Transport
Channel

PHY
211/221

Coding, Resource Mapping

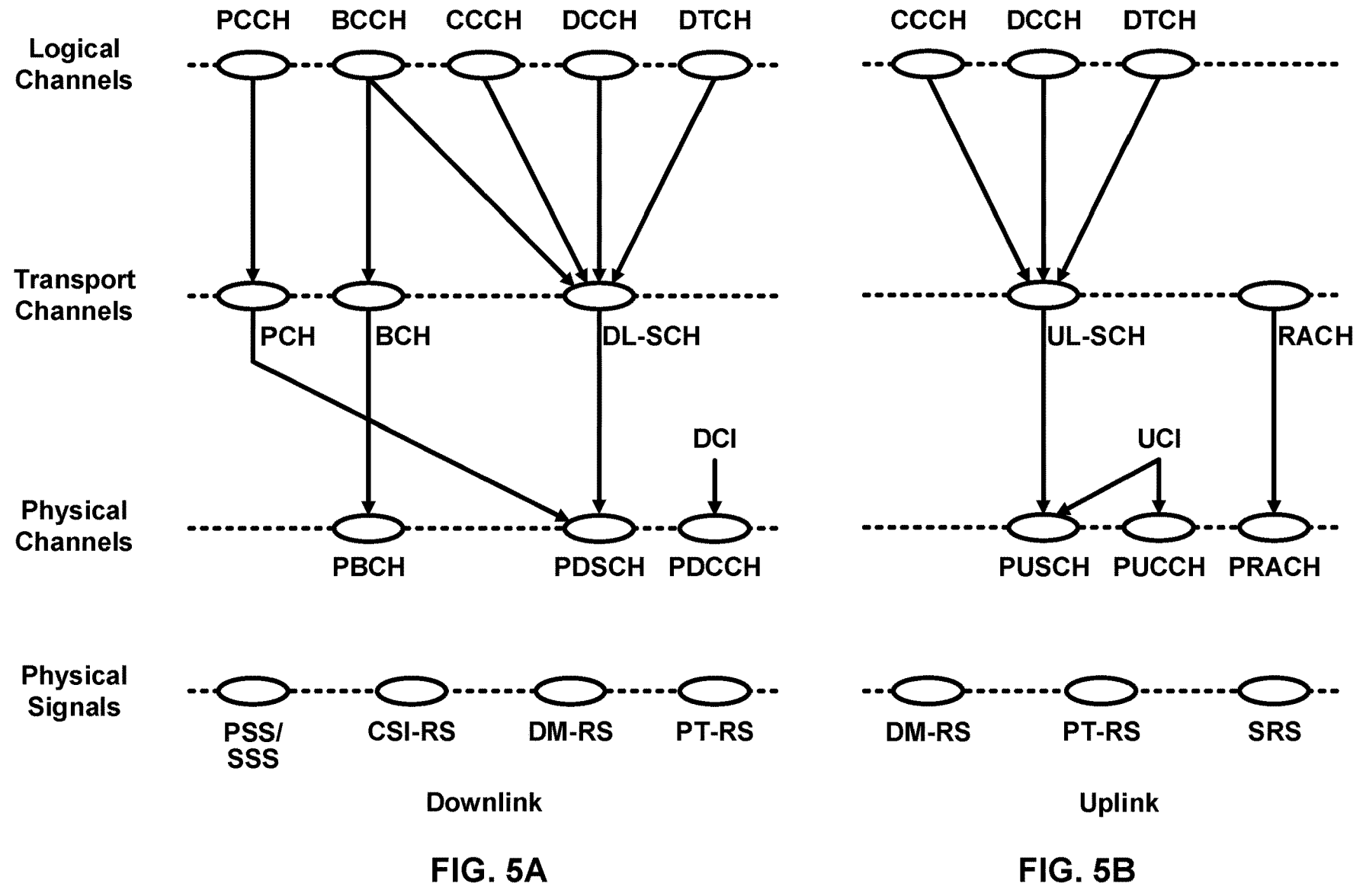

Logical Channels

Transport Channels

Physical Channels

Physical Signals

RACH

DTCH   DCCH   CCCH

UL-SCH

UCI

PRACH   PUCCH   PUSCH

SRS   PT-RS   DM-RS

Uplink

FIG. 5B

DTCH   DCCH   CCCH   BCCH   PCCH

DL-SCH   BCH   PCH

DCI

PDCCH   PDSCH   PBCH

PT-RS   DM-RS   CSI-RS   PSS/SSS

Downlink

FIG. 5A

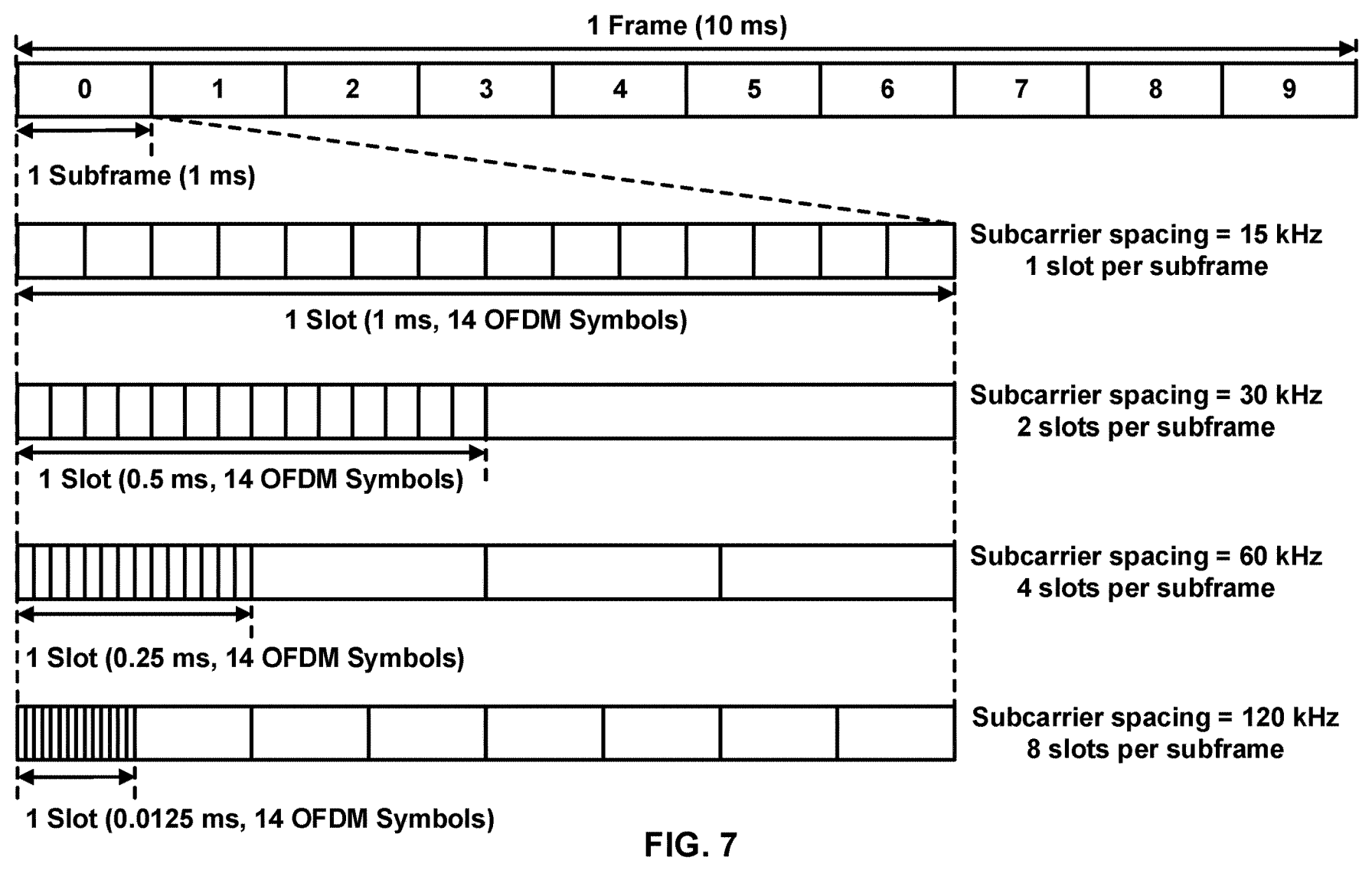

1 Frame (10 ms)

| 0 | 1 | 2 | 3 | 4 | 5 | 6 | 7 | 8 | 9 |

1 Subframe (1 ms)

Subcarrier spacing = 15 kHz
1 slot per subframe

1 Slot (1 ms, 14 OFDM Symbols)

Subcarrier spacing = 30 kHz
2 slots per subframe

1 Slot (0.5 ms, 14 OFDM Symbols)

Subcarrier spacing = 60 kHz
4 slots per subframe

1 Slot (0.25 ms, 14 OFDM Symbols)

Subcarrier spacing = 120 kHz
8 slots per subframe

1 Slot (0.0125 ms, 14 OFDM Symbols)

FIG. 7

Resource Element (RE)
1 Symbol x 1 Subcarrier

Resource Block (RB)
12 Subcarriers

One Slot (14 Symbols)

NR Carrier Bandwidth
(Up to 3300 Subcarriers)

Time

Frequency

Set of SS/ PBCH blocks

SSS

PSS

PBCH

Frequency

Time

Beam #1    Beam #2    Beam #3

Frequency

1101

1102

1103

1101

CSI-RS #1    CSI-RS #2    CSI-RS #3

Time

TRANSMISSION CONFIGURATION INDICATOR STATE MANAGEMENT

CROSS-REFERENCE TO RELATED APPLICATIONS

This application claims the benefit of U.S. Provisional Application No. 63/336,097, filed on Apr. 28, 2022. The above-referenced application is hereby incorporated by reference in its entirety.

BACKGROUND

A wireless device communicates with a base station using a transmission configuration indicator (TCI) state. The wireless device uses a transmission power that is based on a power control set for the TCI state.

SUMMARY

The following summary presents a simplified summary of certain features. The summary is not an extensive overview and is not intended to identify key or critical elements.

A wireless device may communicate with a plurality of nodes, such as, a plurality of transmission and reception points (TRPs). The wireless device may be configured with at least two power control sets for a communication resource (such as a bandwidth part (BWP)). The wireless device may select, from the at least two power control sets, a power control set to communicate with a TRP of the plurality of TRPs. The selection may be based on a transmission configuration indicator (TCI) state corresponding to the TRP, for example, to optimize communication power between the TRP and the wireless device. Additionally or alternatively, the wireless device may use a default TCI state (e.g., a TCI state associated with a physical cell identification (PCI) of a serving cell) to receive the downlink signal, if the time offset between a downlink signal and downlink control information (DCI) scheduling transmission of the downlink signal is too short.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5A shows an example mapping for downlink channels.

FIG. 5B shows an example mapping for uplink channels.

FIG. 7 shows an example configuration of a frame.

DETAILED DESCRIPTION

Figures 1A, 1B:
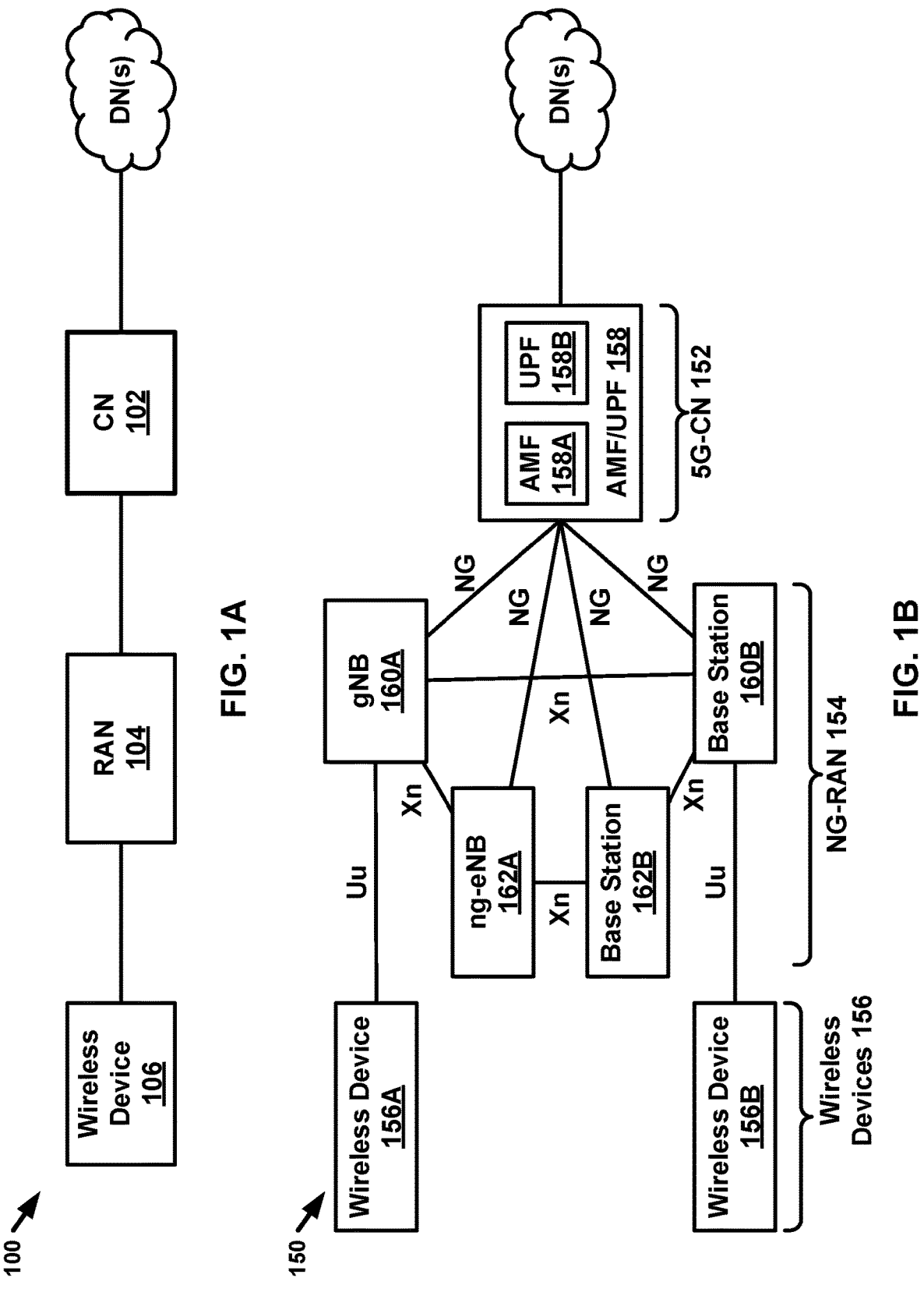
FIG. 1A and FIG. 1B show example communication networks.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to wireless communication exposure detection and/or reporting.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/ UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/ perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/ device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/ or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2A:
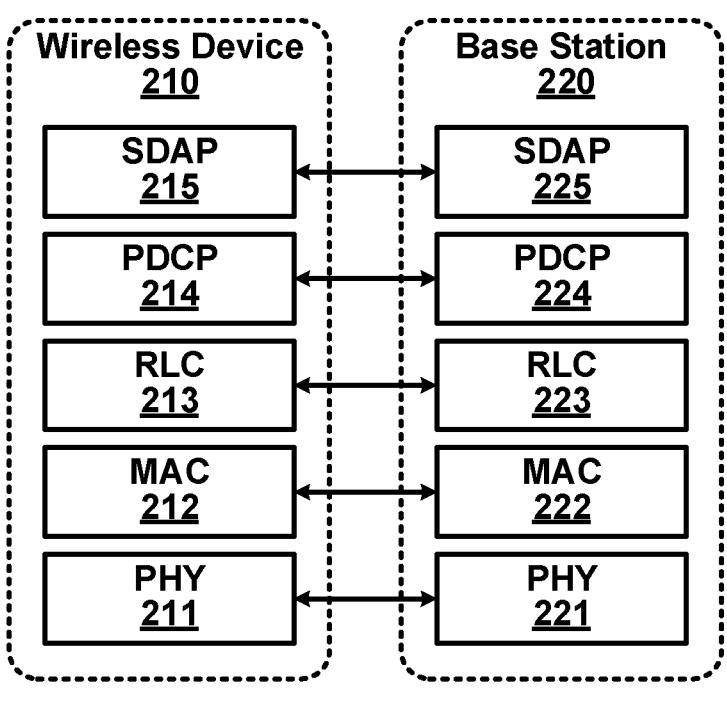
FIG. 2A shows an example user plane.
Figure 2B:
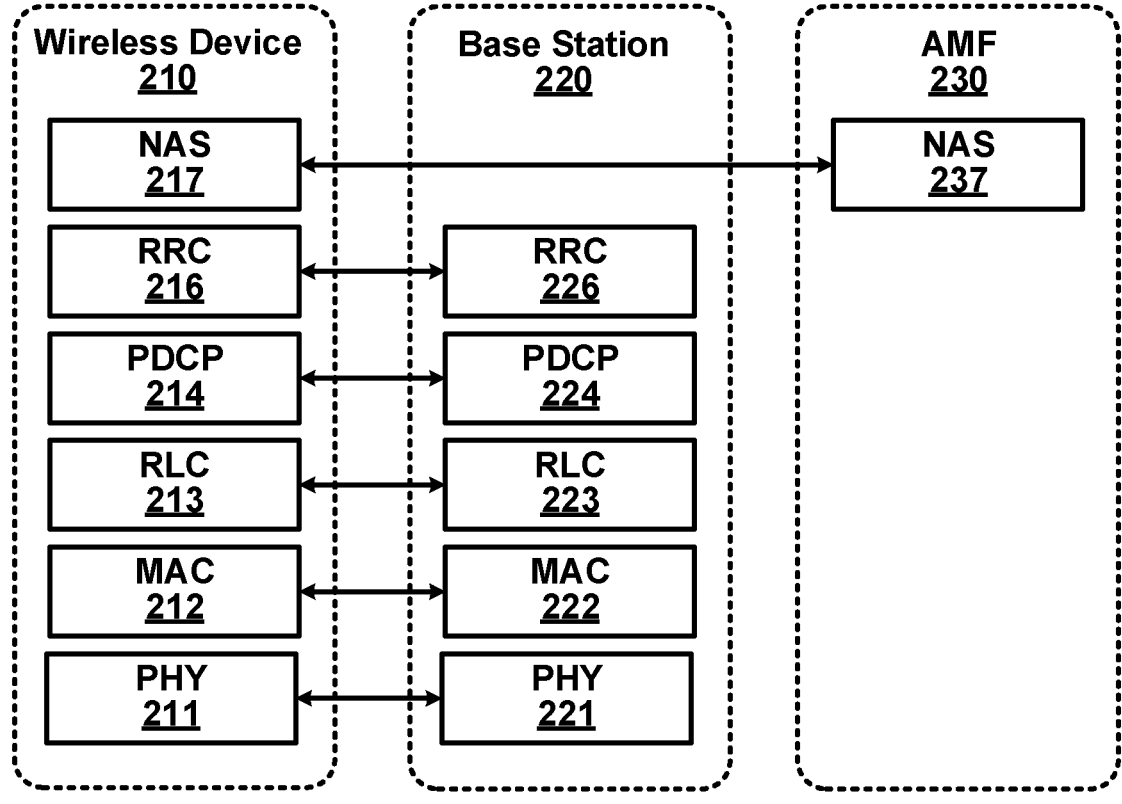
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
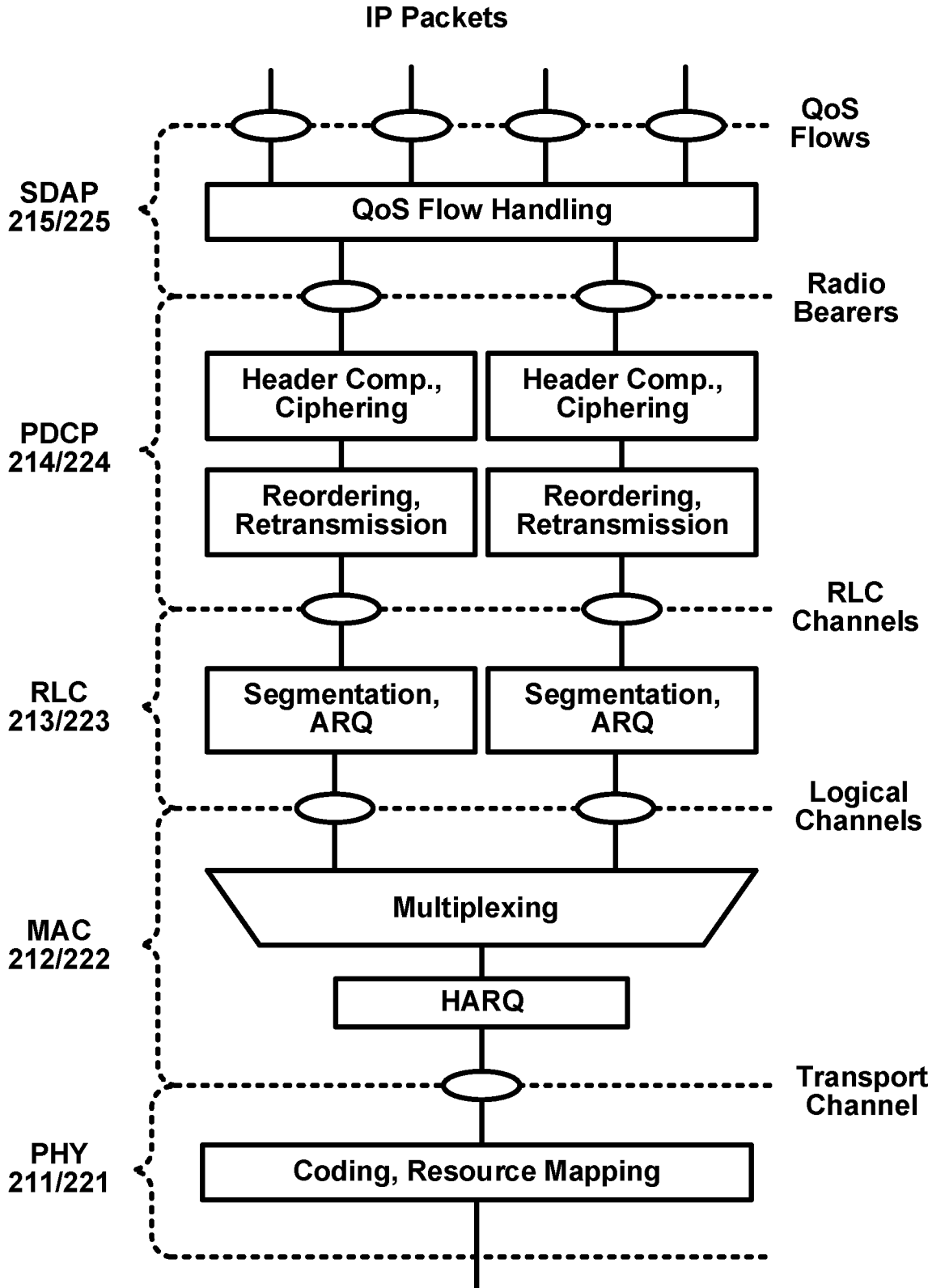
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted (e.g., sent) over the air interface, ciphering/deciphering to prevent unauthorized decoding of data transmitted (e.g., sent) over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figures 4A, 4B:
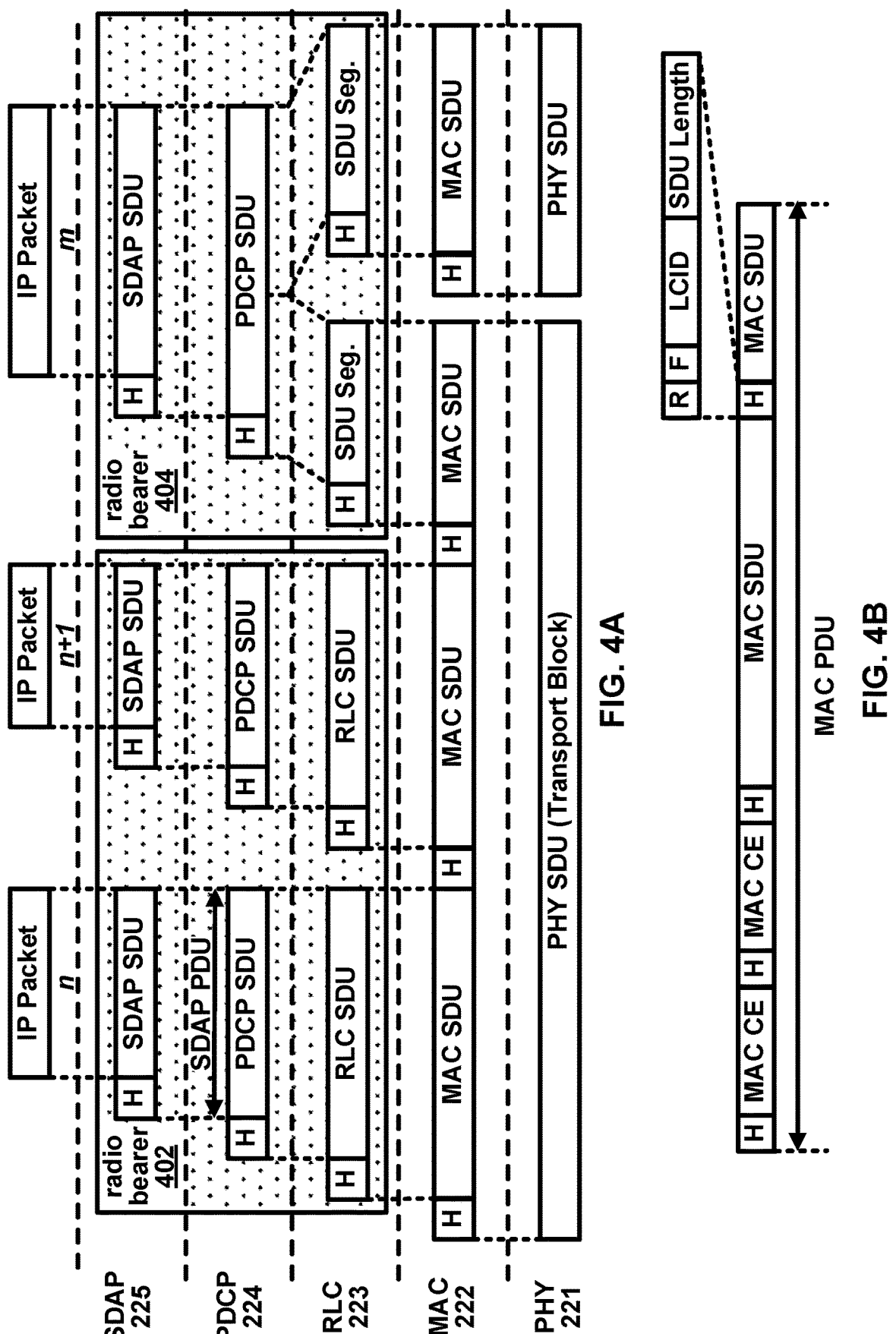
FIG. 4A shows an example downlink data flow for a user plane configuration.
FIG. 4B shows an example format of a Medium Access Control (MAC) subheader in a MAC Protocol Data Unit (PDU).

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands. A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be sent/transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
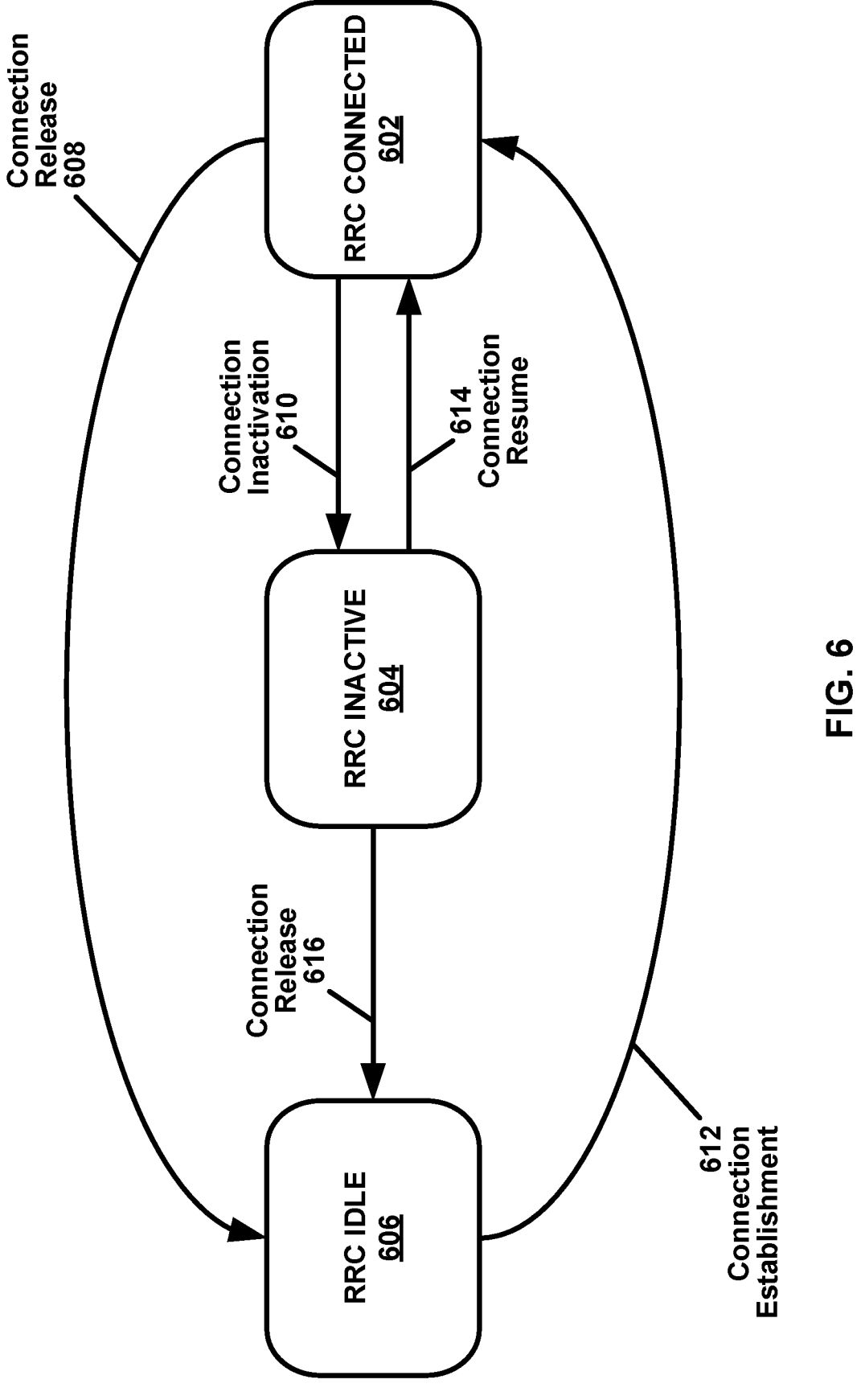
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., once in every discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g. instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that sends/transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 μs, for example, for a numerology in an NR configuration or any other radio configurations. Numerologies may be defined with the following subcarrier spacing/ cyclic prefix duration combinations: 15 kHz/4.7 μs; 30 kHz/2.3 μs; 60 kHz/1.2 μs; 120 kHz/0.59 μs; 240 kHz/0.29 μs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
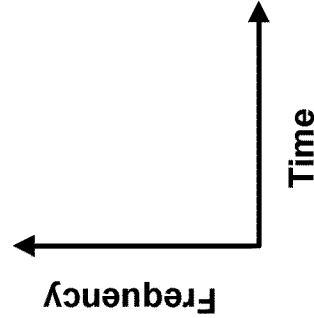
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESETS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, based on (e.g., after or in response to) receiving DCI indicating the second BWP as an active BWP. A wireless device may switch an active BWP from a first BWP to a second BWP, for example, based on (e.g., after or in response to) an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
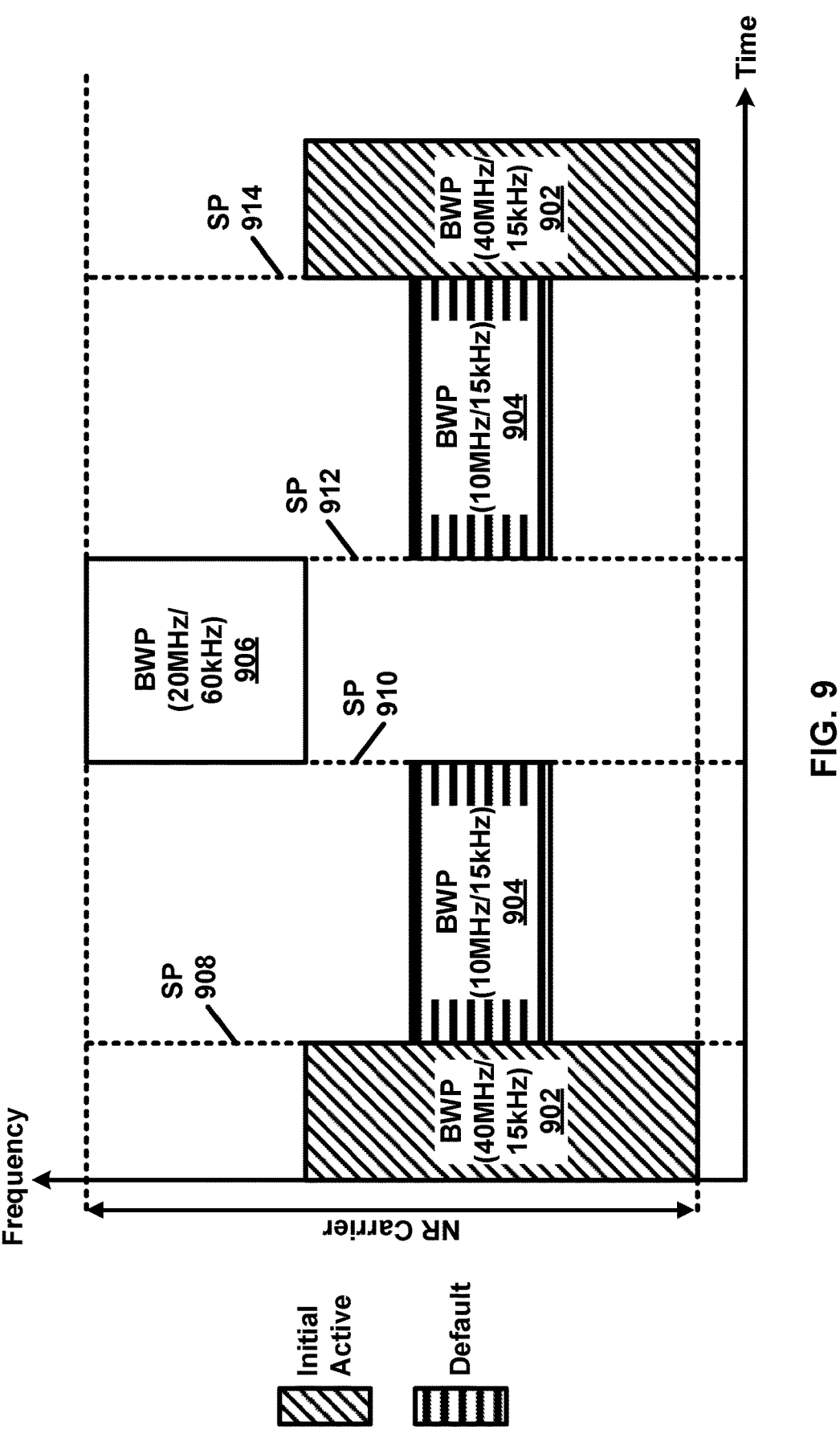
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, based on (e.g., after or in response to) an expiry of a BWP inactivity timer (e.g., indicating switching to the default BWP). The switching at the switching point 908 may occur, for example, based on (e.g., after or in response to) receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, a based on (e.g., after or in response to) an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously sent/transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
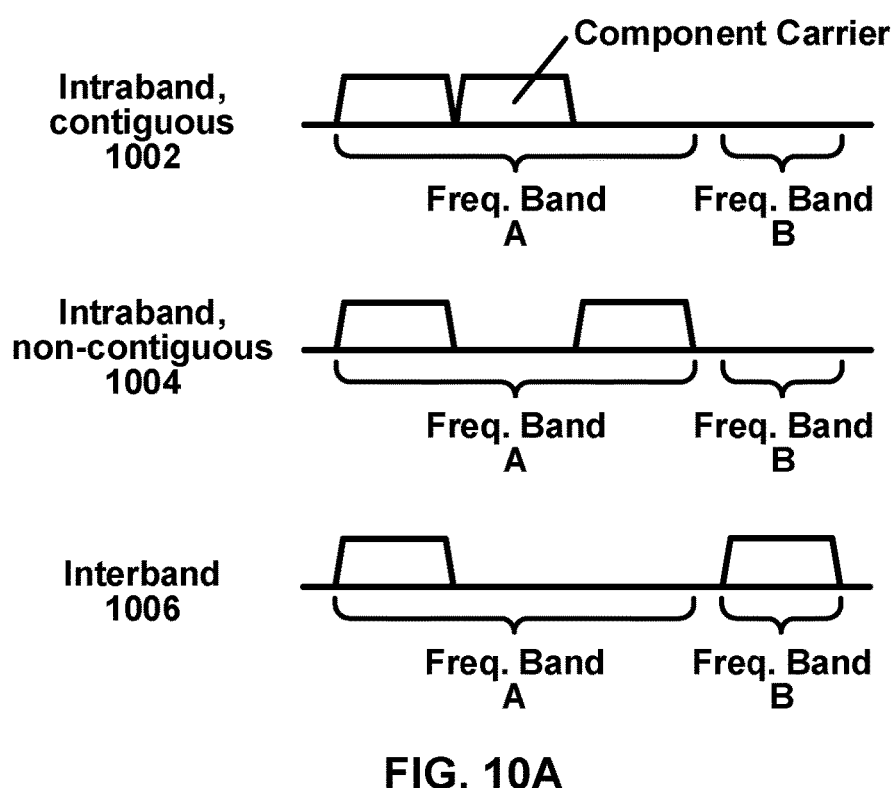
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell. Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, based on (e.g., after or in response to) an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be sent/transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
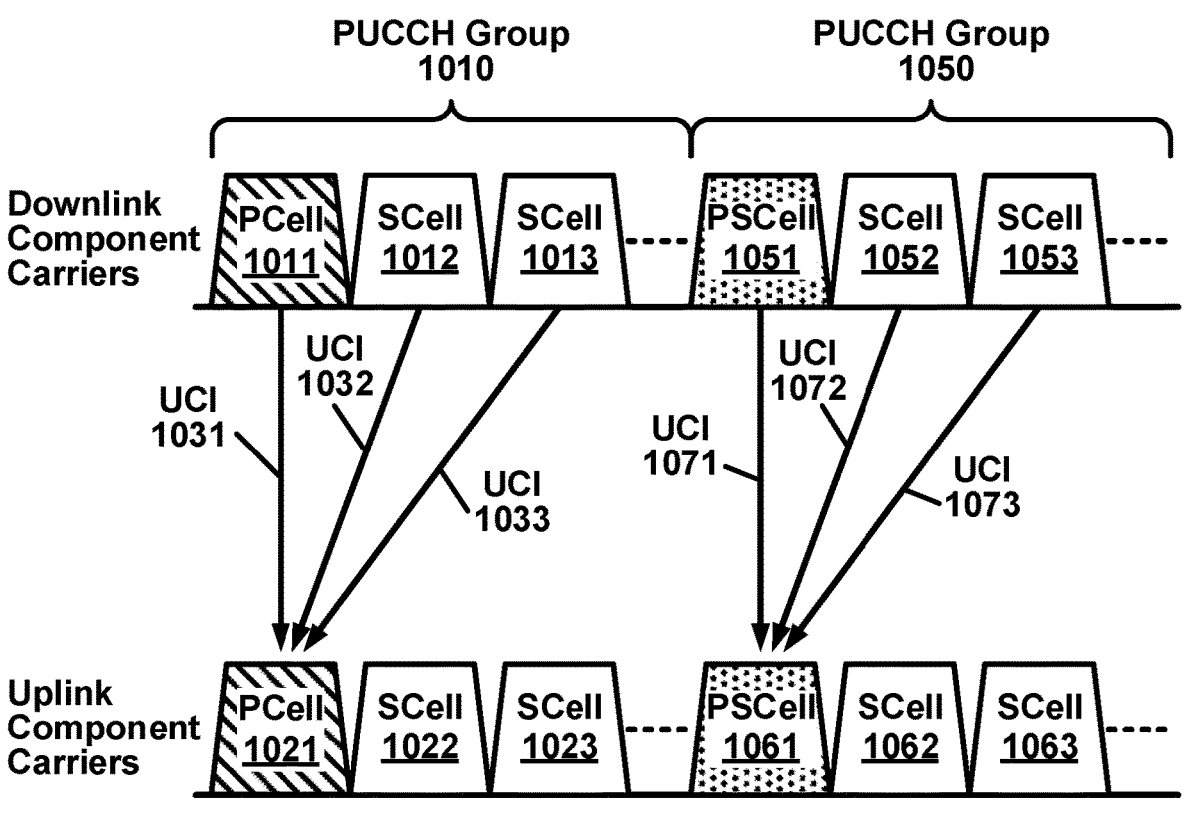
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be sent/transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) sent/transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/ indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figures 11A, 11B:
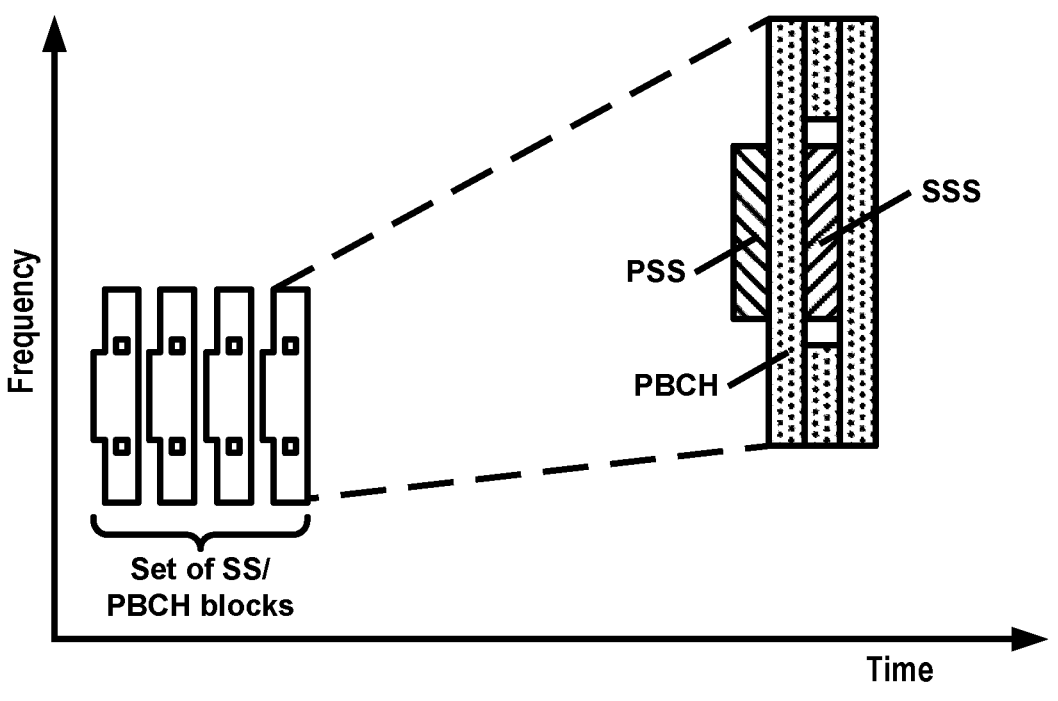
FIG. 11A shows an example mapping of one or more synchronization signal/physical broadcast channel (SS/PBCH) blocks.
FIG. 11B shows an example mapping of one or more channel state information reference signals (CSI-RSs).

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/ transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A) and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern.

An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type 1 (SIB1). The SIB1 may comprise information for the wireless device to access the cell.

The wireless device may use one or more parameters of the MIB to monitor a PDCCH, which may be used to schedule a PDSCH. The PDSCH may comprise the SIB1. The SIB1 may be decoded using parameters provided/ comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indices. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/ transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/ deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g. a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A DM-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DMRSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g., the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DMRSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

Figures 12A, 12B:
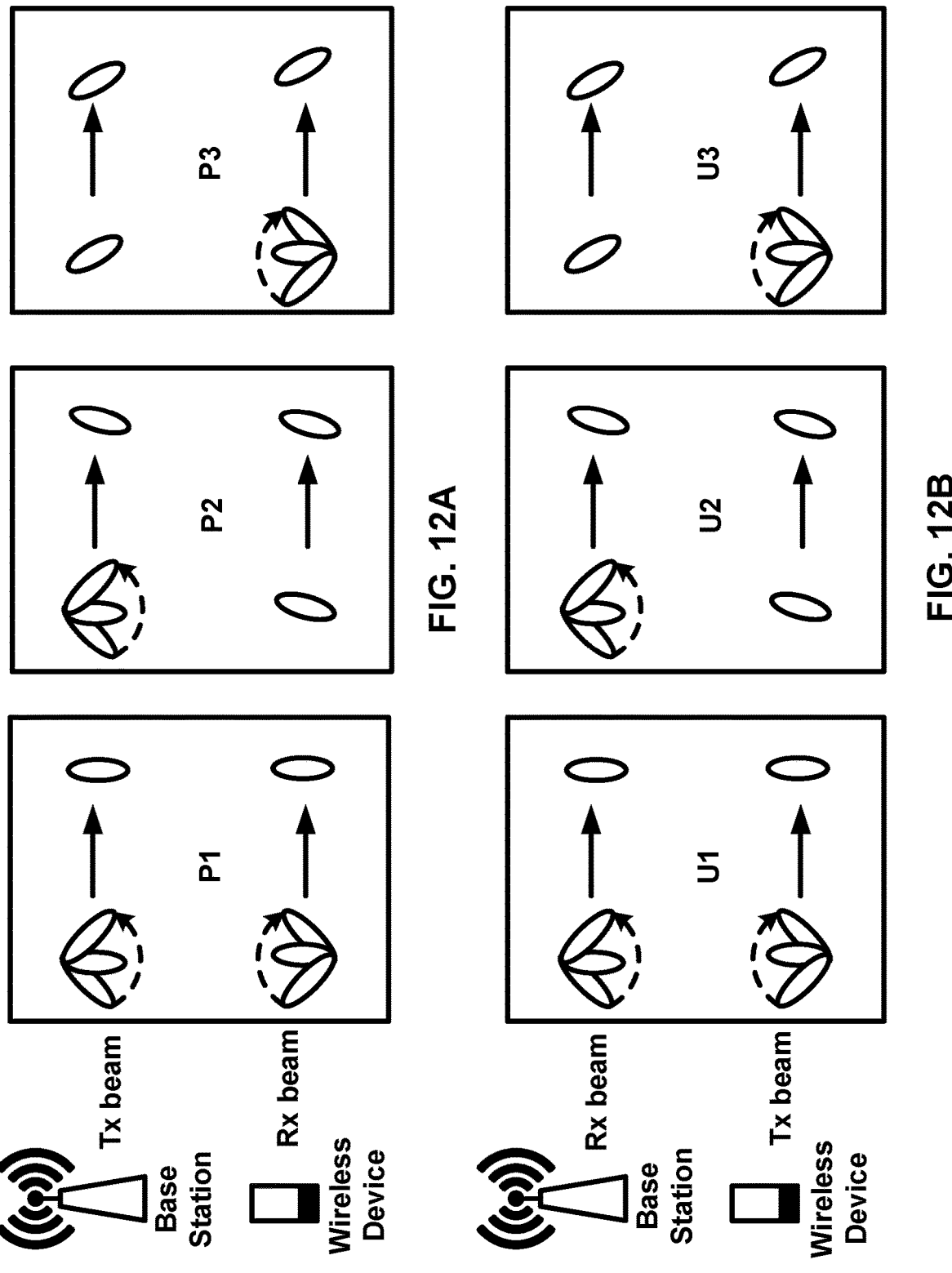
FIG. 12A shows examples of downlink beam management procedures.
FIG. 12B shows examples of uplink beam management procedures.

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement.

The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the wireless device (e.g., UE) uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/ perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/ obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/ start/perform the random access procedure for a beam failure recovery request. A network may initiate/start/perform a random access procedure, for example, for a handover and/or for establishing time alignment for an SCell addition.

Figures 13A, 13B, 13C:
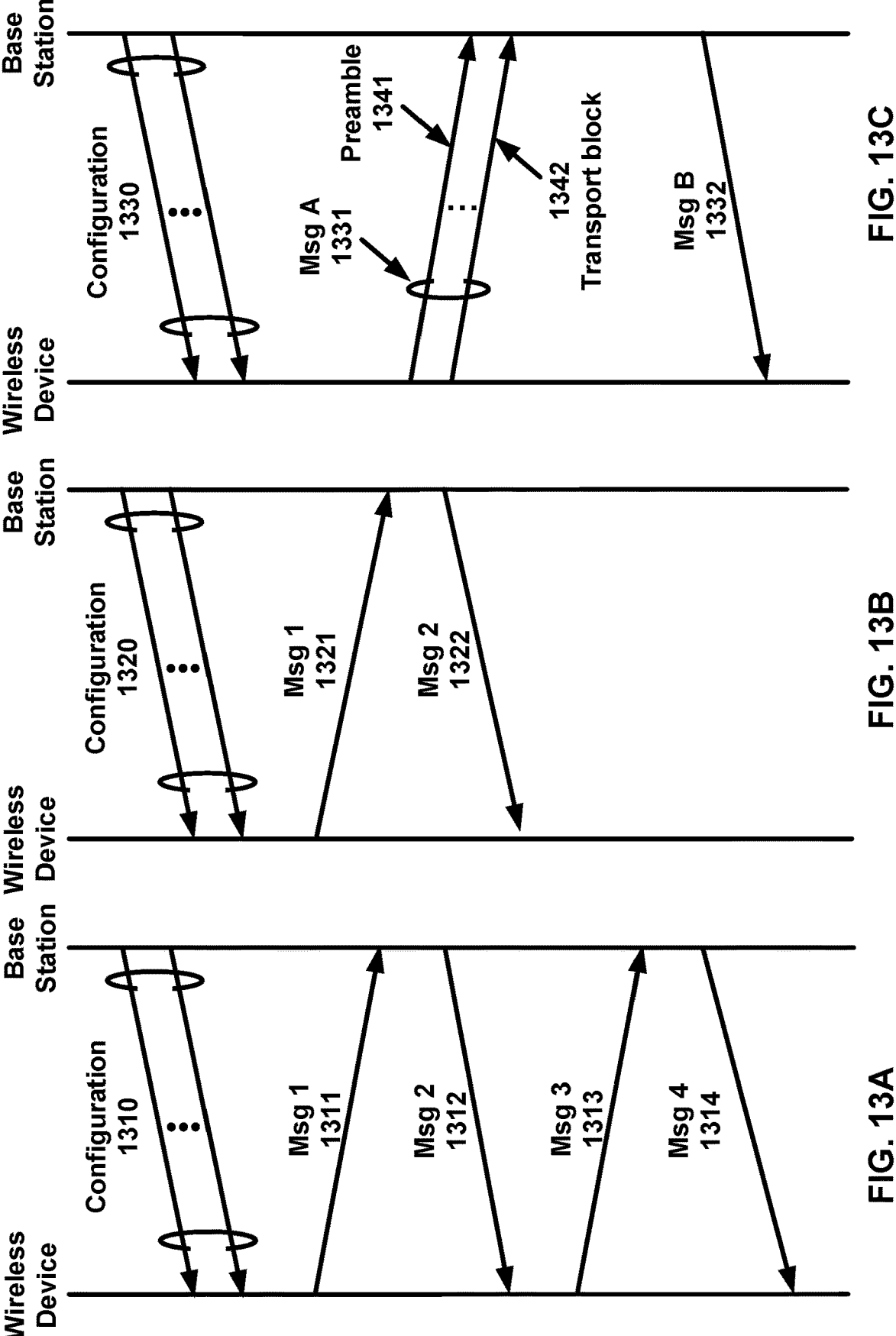
FIG. 13A shows an example four-step random access procedure.
FIG. 13B shows an example two-step random access procedure.
FIG. 13C shows an example two-step random access procedure.

FIG. 13A shows an example four-step random access procedure. The four-step random access procedure may comprise a four-step contention-based random access procedure.

A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated).

The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/ comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-Config-Index). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received based on (e.g., after or in response to) a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, based on (e.g., after or in response to) the sending/transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after sending/transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$RA\text{-}RNTI=1+s\_id+14 \times t\_id+14 \times 80 \times f\_id+14 \times 80 \times 8 \times ul\_carrier\_id$$

where s_id may be an index of a first OFDM symbol of the PRACH occasion (e.g., $0<s\_id<14$), t_id may be an index of a first slot of the PRACH occasion in a system frame (e.g., $0<t\_id<80$), f_id may be an index of the PRACH occasion in the frequency domain (e.g., $0<f\_id<8$), and ul_carrier_id may be a UL carrier used for a preamble transmission (e.g., 0 for an NUL carrier, and 1 for an SUL carrier).

The wireless device may send/transmit the third message (e.g., Msg 3 1313), for example, based on (e.g., after or in response to) a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, based on (e.g., after or in response to) the sending/transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, based on (e.g., after or in response to) sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after sending/transmitting a beam failure recovery request (e.g., the window may start any quantity of symbols and/or slots after sending/transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, based on (e.g., after or in response to) sending/transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, based on (e.g., after or in response to) sending/transmitting the first message (e.g., Msg A 1331). The second message (e.g., Msg B 1332) may comprise contents that are similar and/or equivalent to the contents of the second message (e.g., Msg 2 1312) (e.g., an RAR shown in FIGS. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 11 may be used for scheduling of a PDSCH in a cell (e.g., with more DCI payloads than DCI format 1_0). DCI format 2_0 may be used for providing a slot format indication to a group of wireless devices. DCI format 21 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figures 14A, 14B:
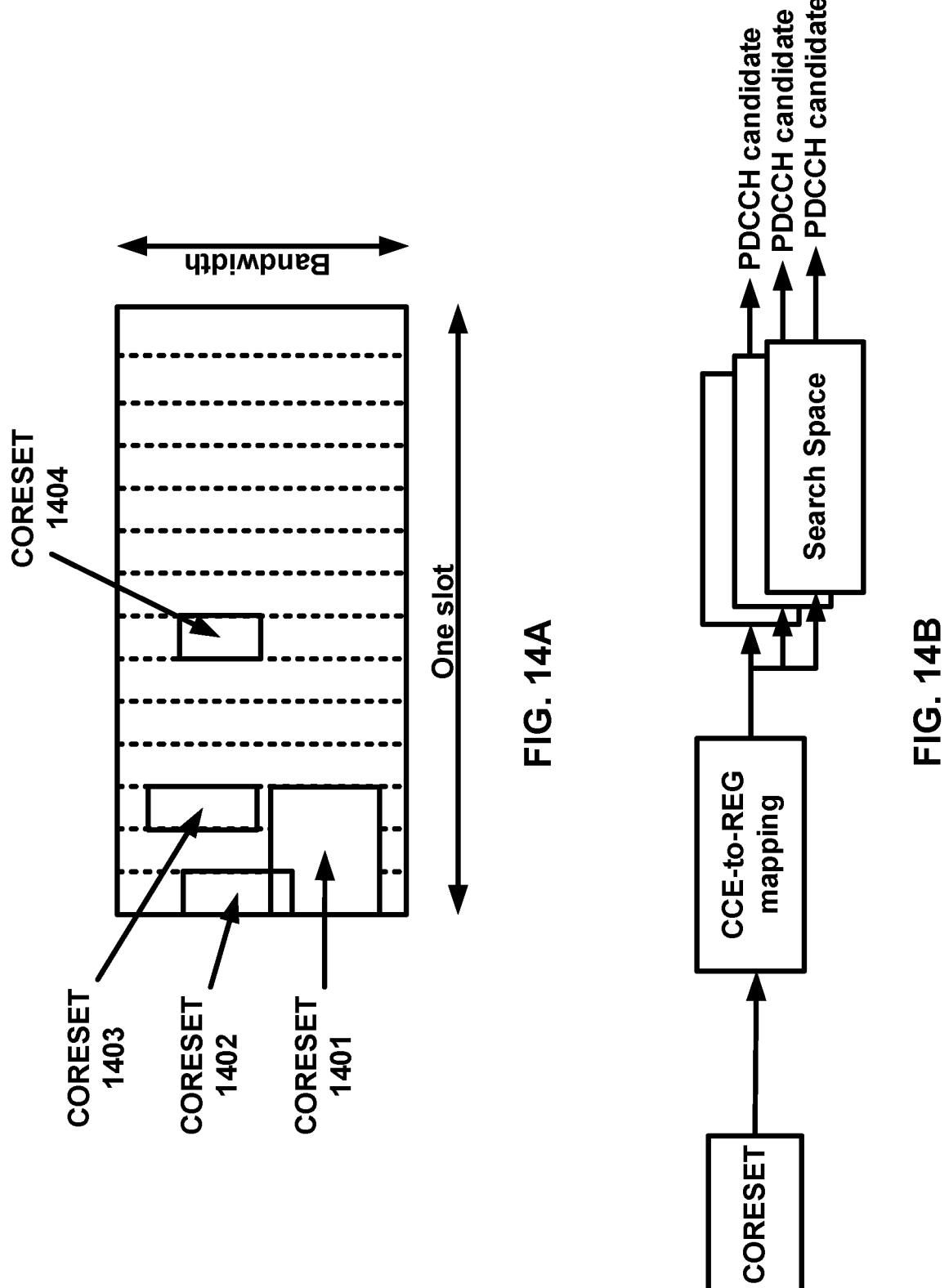
FIG. 14A shows an example of control resource set (CORESET) configurations.
FIG. 14B shows an example of a control channel element to resource element group (CCE-to-REG) mapping.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/ tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORE-SET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORE-SET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, based on (e.g., after or in response to) CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The may send/transmit uplink control signaling (e.g., UCI) to a base station. The uplink control signaling may comprise HARQ acknowledgements for received DL-SCH transport blocks. The wireless device may send/transmit the HARQ acknowledgements, for example, based on (e.g., after or in response to) receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
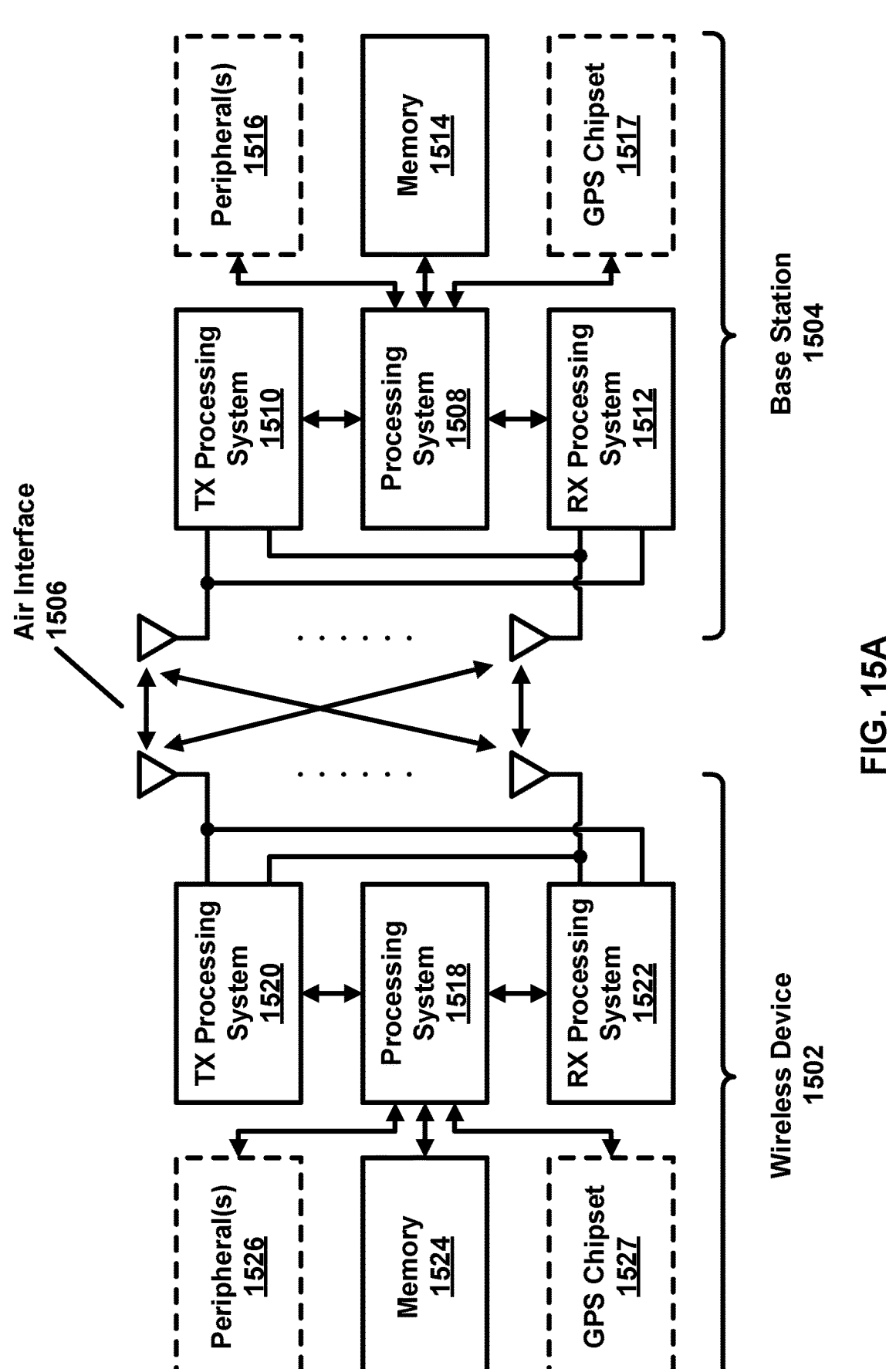
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
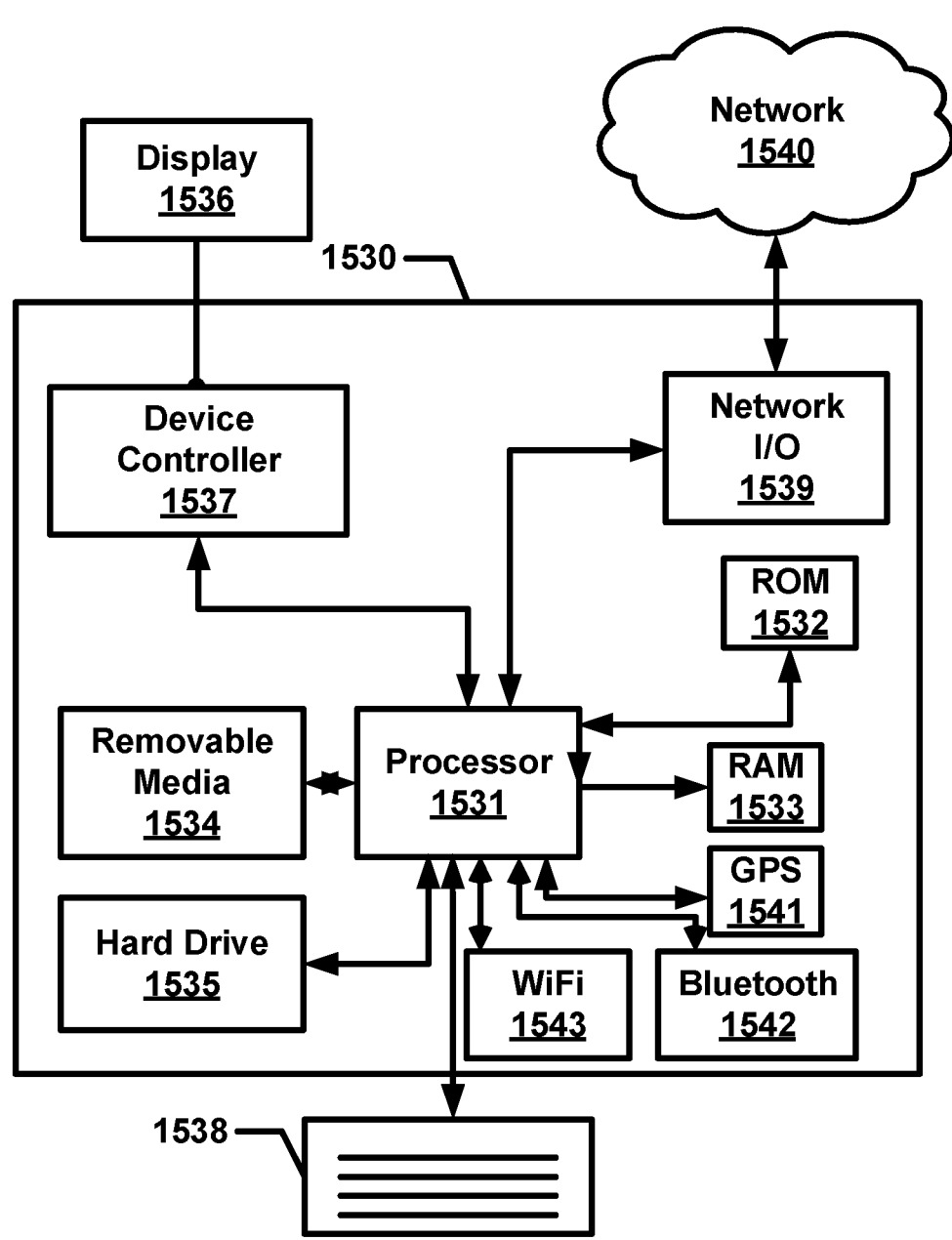
FIG. 15B shows example elements of a computing device that may be used to implement any of the various devices described herein

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc. The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

Figures 16A, 16B, 16C, 16D:
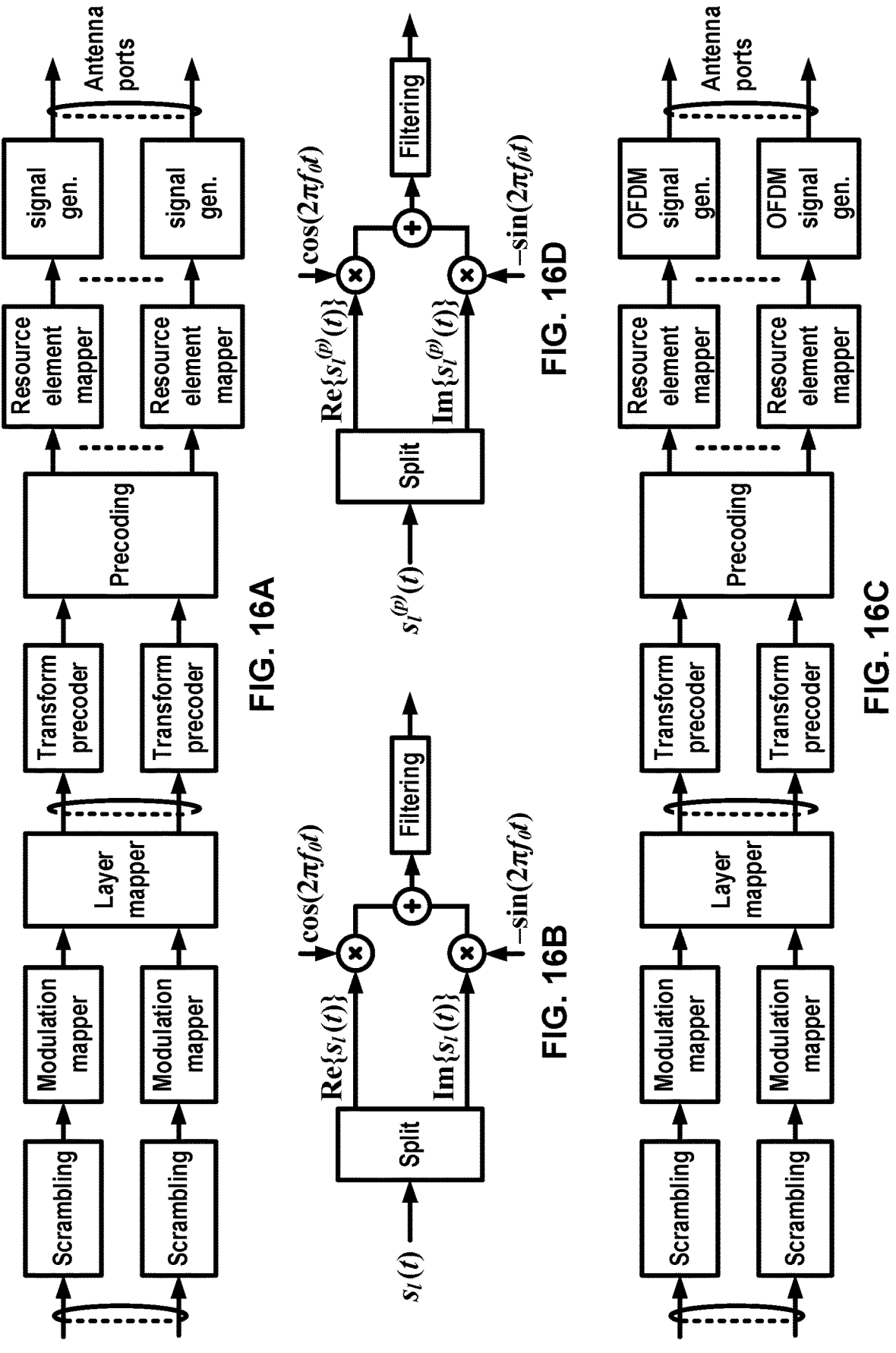
FIG. 16A, FIG. 16B, FIG. 16C, and FIG. 16D show examples of uplink and downlink signal transmission.

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g. RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g. as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, once it is started and continue running until it is stopped or until it expires. A timer may be started, for example, if it is not running or restarted if it is running. A timer may be associated with a value (e.g., the timer may be started or restarted from a value or may be started from zero and expire once it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

A wireless device may communicate with a node (e.g., a TRP) of a base station. The wireless device may active a TCI state to communicate with the TRP. The TCI state may indicate parameters applied to the communication between the wireless device and the TRP. In at least some wireless communications, a wireless device may communicate with a single TRP of a base station. The wireless device may activate a single TCI state. The wireless device may send (e.g., transmit) uplink signals (e.g., PUCCH/PUSCH/SRS transmissions), for example, based on the TCI state. The wireless device may receive downlink signals (e.g., PDCCH, PDSCH, CSI-RS receptions), for example, based on the TCI state. For convenience, discussion below may use uplink signals, uplink BWP, and/or uplink transmission power as examples. It is appreciated that a TCI state may be used for receiving downlink signals, for example, via downlink BWPs. It is appreciated that a power control set may indicate downlink reception power.

In at least some wireless communications, a wireless device may be served by multiple nodes such as multiple TRPs (e.g., a first TRP and a second TRP). At least two TCI states (e.g., a first TCI state and a second TCI state) may be activated, for example, to support multiple TRPs. The wireless device may send (e.g., transmit), to the first TRP, first uplink signals (e.g., PUCCH/PUSCH/SRS transmissions), for example, based on the first TCI state. The wireless device may receive, via/from the first TRP, first downlink signals (e.g., PDCCH, PDSCH, CSI-RS receptions), for example, based on the first TCI state. The wireless device may send (e.g., transmit), to the second TRP, second uplink signals (e.g., PUCCH/PUSCH/SRS transmissions), for example, based on the second TCI state. The wireless device may receive, via/from the second TRP, second downlink signals (e.g., PDCCH, PDSCH, CSI-RS receptions), for example, based on the second TCI state.

However, the base station may configure a large quantity of TCI states. The base station may not configure a power control set for each TCI state. Instead, the base station may configure a power control set for a communication resource (such as a BWP). The wireless device may determine transmission powers of the first uplink transmissions and the second uplink transmissions based on the single uplink power control set configured/indicated for an uplink BWP, for example, if no uplink power control set is indicated/configured for the first TCI state and/or the second TCI state. However, different TRPs may be located in different places and/or subject to different channel conditions (e.g., pathloss, obstacles, reflections, etc.). A default transmission (and/or reception) power that may be used for a first TRP may not be optimal for a second (or other) TRP. Using the same transmission power for uplink transmissions of/to/towards multiple TRPs may be inefficient and/or may increase interference to other cells and/or the wireless devices. As described herein, different transmission power of/to/towards multiple TRPs may be used for improved wireless communications.

As described herein, at least two uplink power control sets may be indicated/configured for an uplink BWP. The uplink BWP may be associated with a cell. Two uplink power control sets may be sufficient for an intra-cell multi-TRP operation. More than two uplink power control sets may be used for an inter-cell multi-TRP operation. At least two TCI states may be activated for a wireless device. An association between the at least two power control sets and the at least two TCI states may be established, based on a variety of ways as described herein. The wireless device may send a first uplink signal/transmission, to a first TRP, using a first transmission power. The first transmission power may be determined based on the first TCI state. The first transmission power may be determined based on a first power control set of the at least two power control sets, for example, if no power control set is indicated/configured for the first TCI state. As described herein, the wireless device may use the first power control set based on an association between the first power control set and the first TCI state.

A maximum quantity/number of non-serving cells (e.g., 7, 10) may be indicated (e.g., by one or more configuration parameters). A base station may dynamically (e.g., using DCI, MAC-CE) activate one or more of the non-serving cells, for example, based on a location/mobility of the wireless device. The non-serving cells may not be co-located and/or may be subject to different channel conditions. The one or more configuration parameters may indicate, for each non-serving cell of the non-serving cells, a respective (e.g., uplink) power control set. The wireless device may select/determine, based on the (active) non-serving cell, an uplink power control set to determine/calculate transmission powers for communicating with the non-serving cell. One or more TCI states, of the at least two TCI state, may be associated with one or more non-serving cells (e.g., one or more active non-serving cells). The wireless device may select/determine the uplink power control set corresponding to the non-serving cell, for example, based on no power control set is indicated for the TCI state associated with the non-serving cell. In this way, different transmission power may be used when communicating with different TRPs, if the wireless device is served by multiple-TRPs (e.g., intra-cell multi-TRP and/or inter-cell multi-TRP operation). The transmission power may be optimized to fit each TRP. Advantages may result such as reduced interference and/or improved transmission accuracy.

In at least some wireless communications, a wireless device may receive DCI indicating switching from multiple TCI states to a single TCI state. The wireless device may switch from multiple TCI states to a single TCI states, for example, if a base station switches from a multiple-TRPs mode to a single TRP mode. the base station and the wireless device may not be aligned on the uplink power control set, for example, if a power control set is not indicated/configured for the single TCI state and at least two power control sets are indicated/configured for a BWP. For example, the wireless device may send an uplink signal based on a first power control set of the at least two power control sets. The base station may receive the uplink signal based on a second power control set of the at least two power control sets. This lack of alignment may result in inaccurate uplink power control and/or may lead to increased interference.

As described herein, a base station and a wireless device may be aligned with a selection of a default uplink power control set. For example, based on an agreed rule, the wireless device may select, from the at least two uplink power control sets configured for the uplink BWP, the first power control set (e.g., as a default power control set) to send an uplink signal. Based on the agreed rule, the base station may select, from the at least two uplink power control sets, the first power control set to receive the uplink signal. This alignment may result in advantages such as accurate power control and/or reduced interference.

In at least some wireless communications, a wireless device may receive DCI scheduling reception of a downlink signal (e.g., PDSCH reception, aperiodic CSI-RS), for example, while at least two TCI states are activated. A time offset between the DCI and the downlink signal may be less than a threshold. The wireless device may use a TCI state among the at least two TCI states, to receive the downlink signal, for example, if the time offset is less than the threshold. The TCI state used by the wireless device to receive the downlink signal may be different from the one used by the base station to send the downlink signal, for example, if the TCI state used by the wireless device is not known by the base station. Beam misalignment may be caused. The wireless device may not decode the downlink signal correctly. Error rates may be increased. The wireless device may not measure a radio link quality of the downlink signal accurately, leading to inaccurate channel estimation and/or scheduling decisions.

As described herein, a wireless device may select, based on an agreed rule, the first TCI state to receive a downlink signal, if a time offset, between DCI and a downlink signal scheduled by the DCI, is less than a threshold. For example, the wireless device may select the first TCI state based on the first TCI state is associated with the PCI of a serving cell. In another example, the wireless device may select the first TCI state based on a second TCI state, among the at least two TCI states, being associated with a second PCI that is different from the PCI of the serving cell. In another example, the wireless device may buffer the downlink signal based on each of the at least two TCI states. The wireless device may select the first TCI state, based on the first TCI state is indicated by the DCI scheduling reception of the downlink signal. The wireless device may receive (e.g., decode) the buffered downlink signal based on the selected TCI state. In another example, the one or more configuration parameters may comprise a field that indicates the first (default) TCI state. The wireless device may receive the downlink signal based on the first TCI state, of the at least two TCI states, based on the value in the field indicates the first TCI.

In this way, a likelihood of beam misalignment, between the base station and the wireless device on the (default) TCI state used to receive the downlink signal, may be reduced. Advantages may result. For example, the wireless device may decode the downlink signal correctly leading to reduced error rates. In another example, the wireless device may measure an accurate radio link quality of the downlink signal leading to accurate channel estimation and/or scheduling decisions.

Figure 17:
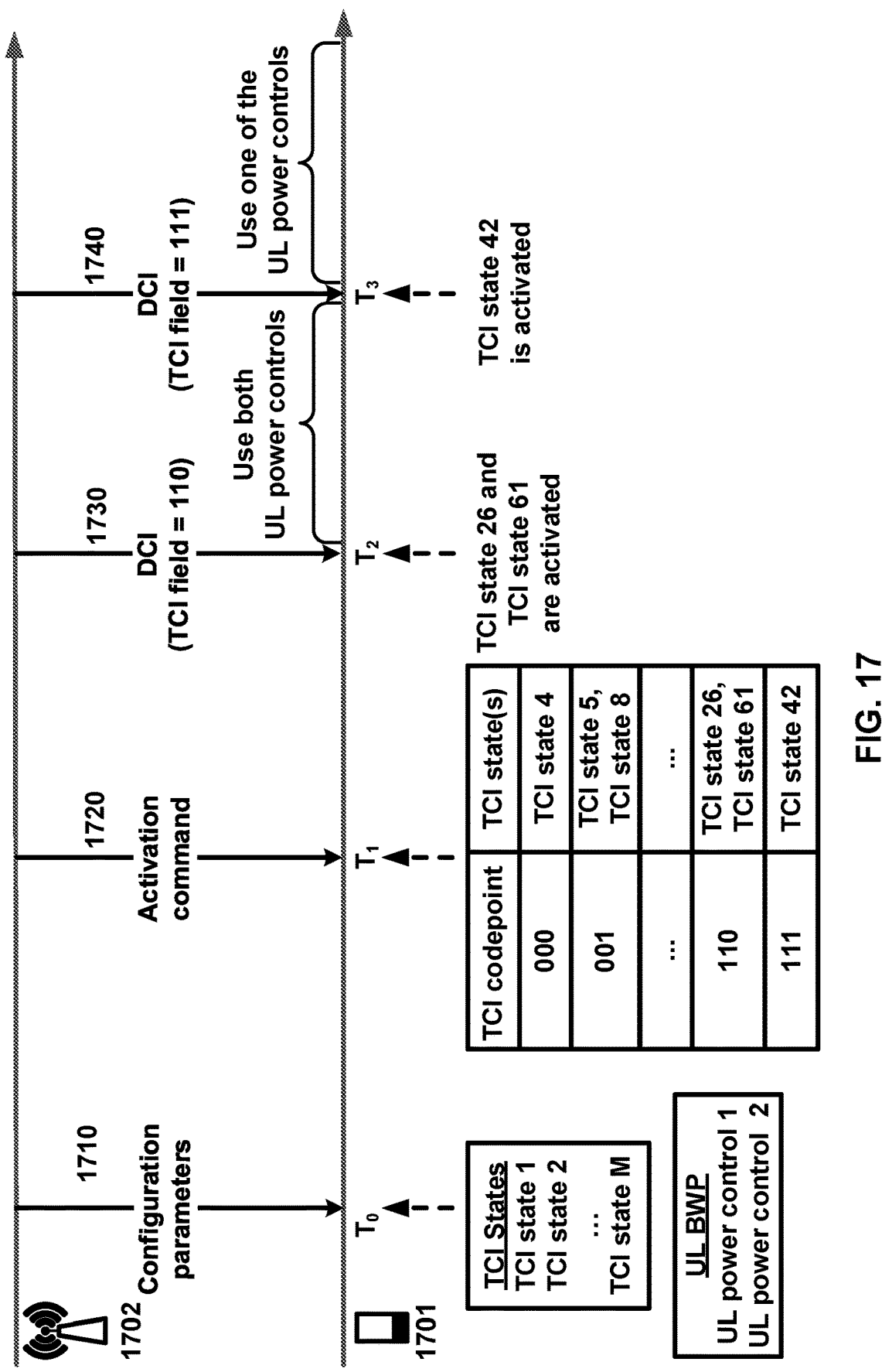
FIG. 17 shows example communications for power control.

FIG. 17 shows example communications for power control. One or more TCI states may be activated. One or more power control sets may be configured for a BWP. A wireless device may use a transmission power determined based on an activated TCI state, for example, if the wireless device communicates with the base station based on the activated TCI state. The transmission power may be determined based on a power control set of the one or more power control set configured for the BWP, for example, if power control sets are not configured for the activated TCI state. Each of the one or more TCI states may be associated with a power control set configured for the BWP, for example, based on a variety of rules as described herein.

A wireless device 1701 may receive one or more messages 1710 (e.g., at time TO). The wireless device 1701 may receive the one or more messages 1710 from a computing device 1702, which may comprise any computing device described herein (e.g., base station, relay node, wireless device, etc.). For example, the wireless device 1701 may receive the one or more messages 1710 from a base station. The wireless device 1701 may receive the one or more messages 1710 from a relay node. The wireless device 1701 may receive the one or more messages 1710 from another wireless device (e.g., TRP, vehicle, remote radio head, and the like). The one or more messages 1710 may comprise one or more configuration parameters (e.g., Configuration parameters at time TO in FIG. 17). The one or more configuration parameters may comprise RRC configuration parameter(s). The one or more configuration parameters may comprise RRC reconfiguration parameter(s).

One or more configuration parameters may be for one or more cells. The one or more cells may comprise a cell. The cell may be, for example, a serving cell. At least one configuration parameter of the one or more configuration parameters may be for the cell. The cell may be a primary cell (PCell). The cell may be a secondary cell (SCell). The cell may be a secondary cell configured for/with a PUCCH (e.g., PUCCH SCell). The cell may be an unlicensed cell, for example, operating in an unlicensed band. The cell may be a licensed cell, for example, operating in a licensed band. The cell may operate in a first frequency range (FR1). The FR1 may comprise, for example, frequency bands below 6 GHz (or any other frequency or range of frequencies). The cell may operate in a second frequency range (FR2). The FR2 may comprise, for example, frequency bands from 24 GHz to 52.6 GHz (or any other frequency or range of frequencies). The cell may operate in a third frequency range (FR3). The FR3 may comprise, for example, frequency bands from 52.6 GHz to 71 GHz (or any other frequency or range of frequencies). The FR3 may comprise, for example, frequency bands starting from (or above) 52.6 GHz (or any other frequency).

A wireless device may perform uplink transmissions (e.g., PUSCH, PUCCH, SRS) via/of the cell in a first time and in a first frequency. The wireless device may perform downlink receptions (e.g., PDCCH, PDSCH) via/of the cell in a second time and in a second frequency. The cell may operate in a time-division duplex (TDD) mode. The first frequency and the second frequency may be the same, for example, in the TDD mode. The first time and the second time may be different, for example, in the TDD mode. The cell may operate in a frequency-division duplex (FDD) mode. The first frequency and the second frequency may be different, for example, in the FDD mode. The first time and the second time may be the same, for example, in the FDD mode. The cell may operate in a code-division multiplex (CDM) mode, for example, in which the first frequency and the second frequency may be the same or different, and or in which the first time and the second time may be the same or different. The cell may operate in a spatial-domain multiplex (SDM) mode, for example, in which the first frequency and the second frequency may be the same or different, and or in which the first time and the second time may be the same or different. The cell may operation in one or more of a TDD mode, an FDD mode, a CDM mode, and/or an SDM mode.

A wireless device may be an RRC mode of a plurality of RRC modes. For example, the wireless device may be in an RRC connected mode. The wireless device may be in an RRC idle mode. The wireless device may be in an RRC inactive mode.

A cell may comprise a plurality of BWPs. The plurality of BWPs may comprise one or more uplink BWPs comprising an uplink BWP of the cell. The plurality of BWPs may comprise one or more downlink BWPs comprising a downlink BWP of the cell.

A BWP of the plurality of BWPs may be in one of an active state and an inactive state. In the active state of a downlink BWP of the one or more downlink BWPs, the wireless device may monitor a downlink channel/signal (e.g., PDCCH, DCI, CSI-RS, PDSCH) on/for/via the downlink BWP. In the active state of a downlink BWP of the one or more downlink BWPs, the wireless device may receive a PDSCH on/via/for the downlink BWP. In the inactive state of a downlink BWP of the one or more downlink BWPs, the wireless device may not monitor a downlink channel/signal (e.g., PDCCH, DCI, CSI-RS, PDSCH) on/via/for the downlink BWP. In the inactive state of a downlink BWP of the one or more downlink BWPs, the wireless device may stop monitoring (or receiving) a downlink channel/signal (e.g., PDCCH, DCI, CSI-RS, PDSCH) on/via/for the downlink BWP. In the inactive state of a downlink BWP of the one or more downlink BWPs, the wireless device may not receive a PDSCH on/via/for the downlink BWP. In the inactive state of a downlink BWP of the one or more downlink BWPs, the wireless device may stop receiving a PDSCH on/via/for the downlink BWP.

In the active state of an uplink BWP of the one or more uplink BWPs, the wireless device may send (e.g., transmit) an uplink signal/channel (e.g., PUCCH, preamble, PUSCH, PRACH, SRS, etc.) on/via the uplink BWP. In the inactive state of an uplink BWP of the one or more uplink BWPs, the wireless device may not send (e.g., transmit) an uplink signal/channel (e.g., PUCCH, preamble, PUSCH, PRACH, SRS, etc.) on/via the uplink BWP.

A wireless device may activate the downlink BWP of the one or more downlink BWPs of the cell. Activating the downlink BWP may comprise setting (or switching to) the downlink BWP as an active downlink BWP of the cell. Activating the downlink BWP may comprise setting the downlink BWP in the active state. Activating the downlink BWP may comprise switching the downlink BWP from the inactive state to the active state.

A wireless device may activate the uplink BWP of the one or more uplink BWPs of the cell. Activating the uplink BWP may comprise that the wireless device sets (or switches to) the uplink BWP as an active uplink BWP of the cell. Activating the uplink BWP may comprise setting the uplink BWP in the active state. Activating the uplink BWP may comprise switching the uplink BWP from the inactive state to the active state.

One or more configuration parameters may be for the (active) downlink BWP of the cell. At least one configuration parameter of the one or more configuration parameters may be for the downlink BWP of the cell.

One or more configuration parameters may be for the (active) uplink BWP of the cell. At least one configuration parameter of the one or more configuration parameters may be for the uplink BWP of the cell. The one or more configuration parameters may indicate a subcarrier spacing (or a numerology) for the downlink BWP. The one or more configuration parameters may indicate a subcarrier spacing (or a numerology) for the uplink BWP.

A value of the subcarrier spacing (of the downlink BWP and/or the uplink BWP) may be/indicate, for example, 15 kHz ($\mu=0$), or any other frequency or range of frequencies. A value of the subcarrier spacing may be/indicate, for example, 30 kHz ($\mu=1$). A value of the subcarrier spacing may be/indicate, for example, 60 kHz ($\mu=2$). A value of the subcarrier spacing may be/indicate, for example, 120 kHz ($\mu=3$). A value of the subcarrier spacing may be/indicate, for example, 240 kHz ($\mu=4$). A value of the subcarrier spacing may be/indicate, for example, 480 kHz ($\mu=5$). A value of the subcarrier spacing may be/indicate, for example, 960 kHz ($\mu=6$). For example, 480 kHz may be valid/applicable in FR3. For example, 960 kHz may be valid/applicable in FR3. For example, 240 kHz may be valid/applicable in FR3. For example, 120 kHz may be valid/applicable in FR3. Any frequency or range of frequencies may be valid/applicable to any FR(n) (e.g., $\mu$ may be equal to any value).

One or more configuration parameters may indicate a plurality of control resource sets (CORESETS). The one or more configuration parameters may indicate the plurality of CORESETS for the (active) downlink BWP of the cell. The (active) downlink BWP may comprise the plurality of CORESETS.

One or more configuration parameters may indicate a plurality of CORESET indexes/identifiers/indicators (e.g., provided by a higher layer parameter ControlResourceSetId) for the plurality of CORESETS. Each CORESET of the plurality of CORESETS may be identified/indicated by a respective CORESET index of the plurality of CORESET indexes. A first CORESET of the plurality of CORESETS may be identified by a first CORESET index of the plurality of CORESET indexes. A second CORESET of the plurality of CORESETS may be identified by a second CORESET index of the plurality of CORESET indexes.

The one or more configuration parameters may indicate one or more CORESET pool indexes (e.g., provided by a higher layer parameter CoresetPoolIndex) for the plurality of CORESETS. Each CORESET of the plurality of CORESETS may comprise (or be configured/indicated by the one or more configuration parameters) by a respective CORESET pool index of the one or more CORESET pool indexes (e.g., 0, 1). The one or more configuration parameters may indicate, for each CORESET of the plurality of CORESETS, a respective CORESET pool index of the one or more CORESET pool indexes. For example, the one or more configuration parameters may indicate, for a first CORESET of the plurality of CORESETS, a first CORESET pool index (CoresetPoolIndex=0). The one or more configuration parameters may indicate, for a second CORESET of the plurality of CORESETS, a second CORESET pool index (CoresetPoolIndex=1). The one or more CORESET pool indexes may comprise the first CORESET pool index and the second CORESET pool index.

The one or more configuration parameters may not indicate, for a CORESET of the plurality of CORESETS, a CORESET pool index. The higher layer parameter CoresetPoolIndex may be absent in configuration parameter(s) of the CORESET. The wireless device may determine a value (or a default value) of/for a CORESET pool index of the CORESET as the first CORESET pool index (CoresetPoolIndex=0). The wireless device may determine the value (or the default value) of/for the CORESET pool index of the CORESET as the first CORESET pool index, for example, based on the one or more configuration parameters not indicating, for the CORESET, a CORESET pool index. The first CORESET pool index (CoresetPoolIndex=0) may be the CORESET pool index of the CORESET, for example, based on the one or more configuration parameters not indicating, for the CORESET, a CORESET pool index.

A first CORESET pool (e.g., CORESET pool 0) may comprise one or more first CORESETS with a CORESET pool index that is equal to a first CORESET pool index (e.g., CoresetPoolIndex=0). The one or more configuration parameters may indicate the first CORESET pool index for each CORESET of the one or more first CORESETS in the first CORESET pool. The plurality of CORESETS may comprise the one or more first CORESETS.

A second CORESET pool (e.g., CORESET pool 1) may comprise one or more second CORESETS with a CORESET pool index that is equal to a second CORESET pool index (e.g., CoresetPoolIndex=1). The one or more configuration parameters may indicate the second CORESET pool index for each CORESET of the one or more second CORESETS in the second CORESET pool. The plurality of CORESETS may comprise the one or more second CORESETS.

The one or more configuration parameters may not indicate a CORESET pool index for a CORESET of the plurality of CORESETS. The wireless device may determine a default value for the CORESET pool index of the CORESET, for example, based on the one or more configuration parameters not indicating the CORESET pool index for the CORESET. The default value may be equal to zero (CoresetPoolIndex=0). The default value may be equal to the first CORESET pool index (e.g., zero). The first CORESET pool may comprise the CORESET based on the one or more configuration parameters not indicating, for the CORESET, the CORESET pool index. The first CORESET pool may comprise the CORESET based on the default value of/for the CORESET pool index of the CORESET being equal to the first CORESET pool index.

A first CORESET pool index of a first CORESET and a second CORESET pool index of a second CORESET may be the same. For example, the one or more configuration parameters may indicate the same CORESET pool index for the first CORESET and the second CORESET. The plurality of CORESETS may comprise the first CORESET and the second CORESET. The one or more CORESET pool indexes may comprise the first CORESET pool index and the second CORESET pool index. Based on the first CORESET pool index of the first CORESET and the second CORESET pool index of the second CORESET being the same, the wireless device may group the first CORESET and the second CORESET in a same CORESET pool (e.g., CoresetPoolIndex=0 or CoresetPoolIndex=1). A first CORESET pool comprising the first CORESET and a second CORESET pool comprising the second CORESET may be the same, for example, based on the first CORESET pool index of the first CORESET and the second CORESET pool index of the second CORESET being the same.

A first CORESET pool index of a first CORESET and a second CORESET pool index of a second CORESET may be different. The plurality of CORESETS may comprise the first CORESET and the second CORESET. The one or more CORESET pool indexes may comprise the first CORESET pool index and the second CORESET pool index. The wireless device may group the first CORESET and the second CORESET in different CORESET pools, for example, based on the first CORESET pool index of the first CORESET and the second CORESET pool index of the second CORESET being different. The wireless device may group the first CORESET in a first CORESET pool (e.g., CoresetPoolIndex=0). The wireless device may group the second CORESET in a second CORESET pool (e.g., CoresetPoolIndex=1) that is different from the first CORESET pool, for example, based on the first CORESET pool index and the second CORESET pool index being different. The first CORESET pool and the second CORESET pool may be different, for example, based on the first CORESET pool index of the first CORESET and the second CORESET pool index of the second CORESET being different.

The one or more configuration parameters may indicate at least two CORESET pool indexes (e.g., 0 and 1) for a higher layer parameter CORESETPoolIndex. The one or more configuration parameters may comprise the higher layer parameter CORESETPoolIndex with (or set to) the at least two CORESET pool indexes. The at least two CORESET pool indexes may comprise a first CORESET pool index (e.g., 0) for/of one or more first CORESETS of the plurality of CORESETS. The at least two CORESET pool indexes may comprise a second CORESET pool index (e.g., 1), different from the first CORESET pool index, for/of one or more second CORESETS of the plurality of CORESETS. The one or more first CORESETS may comprise one or more third CORESETS, of the plurality of CORESETS, for example, without a value for a higher layer parameter CORESETPoolIndex. The one or more configuration parameters may not comprise the higher layer parameter CORESETPoolIndex for the one or more third CORESETS.

The cell may comprise a plurality of transmission and reception points (TRPs). The plurality of TRPs may serve the cell (or may serve the wireless device in/via/of the cell). The plurality of TRPs may comprise a first TRP and a second TRP.

The first TRP may send (e.g., transmit) a downlink signal/transmission (e.g., PDSCH, PDCCH, DCI) via the first CORESET pool. Sending (e.g., transmitting) the downlink signal/transmission (e.g., PDCCH, DCI) via the first CORESET pool may comprise that the first TRP sends (e.g., transmits) the downlink signal/transmission via a first CORESET with (e.g., configured with or associated with) the first CORESET pool index. The first TRP may not send (e.g., transmit) a downlink signal/transmission (e.g., PDSCH, PDCCH, DCI) via the second CORESET pool. Not sending (e.g., transmitting) the downlink signal/transmission (e.g., PDSCH, PDCCH, DCI) via the second CORESET pool may comprise that the first TRP does not send (e.g., transmit) the downlink signal/transmission via a second CORESET with (e.g., configured with or associated with) the second CORESET pool index.

The second TRP may send (e.g., transmit) a downlink signal/transmission (e.g., PDSCH, PDCCH, DCI) via the second CORESET pool. Sending (e.g., transmitting) the downlink signal/transmission (e.g., PDCCH, DCI) via the second CORESET pool may comprise that the second TRP sends (e.g., transmits) the downlink signal/transmission via a second CORESET with (e.g., configured with or associated with) the second CORESET pool index. The second TRP may not send (e.g., transmit) a downlink signal/transmission (e.g., PDCCH, DCI) via the first CORESET pool. Not sending (e.g., transmitting) the downlink signal/transmission (e.g., PDCCH, DCI) via the first CORESET pool may comprise that the second TRP does not send (e.g., transmit) the downlink signal/transmission via a first CORESET with (e.g., configured with or associated with) the first CORESET pool index.

The one or more configuration parameters may indicate a plurality of uplink resources (e.g., PUCCH-Resource, SRS-Resource, and the like). The one or more configuration parameters may indicate the plurality of uplink resources for the (active) uplink BWP of the cell. The (active) uplink BWP may comprise the plurality of uplink resources. The (active) uplink BWP of an uplink carrier (e.g., NUL, SUL) of the cell may comprise the plurality of uplink resources.

The plurality of uplink resources may comprise/be a plurality of PUCCH resources. The plurality of uplink resources may comprise/be a plurality of SRS resources. The plurality of uplink resources may comprise/be a plurality of PUSCH resources.

The one or more configuration parameters may indicate one or more uplink resource groups/sets (e.g., PUCCH-ResourceGroup, SRS-ResourceSet). The one or more uplink resource groups/sets may comprise the plurality of uplink resources. Each uplink resource group/set of the one or more uplink resource groups/sets may comprise respective uplink resource(s) of the plurality of uplink resources. For example, a first uplink resource group/set of the one or more uplink resource groups/sets may comprise one or more first uplink resources of the plurality of uplink resources. A second uplink resource group/set of the one or more uplink resource groups/sets may comprise one or more second uplink resources of the plurality of uplink resources. The first uplink resource group/set and the second uplink resource group/set may not share/comprise a common/shared/same uplink resource of the plurality of uplink resources. A first uplink resource in (or belonging to) the first uplink resource group/set may not be in (or belong to) the second uplink resource group/set.

example, the one or more configuration parameters may indicate a plurality of uplink resource indexes/identifiers/indicators (e.g., provided by a higher layer parameter PUCCH-ResourceId, SRS-ResourceId) for the plurality of uplink resources. In an example, each uplink resource of the plurality of uplink resources may be identified/indicated by a respective uplink resource index of the plurality of uplink resource indexes. In an example, a first uplink resource of the plurality of uplink resources may be identified by a first uplink resource index of the plurality of uplink resource indexes. A second uplink resource of the plurality of uplink resources may be identified by a second uplink resource index of the plurality of uplink resource indexes.

The one or more configuration parameters may indicate one or more uplink resource group/set indexes/identifiers/indicators (e.g., provided by a higher layer parameter PUCCH-ResourceGroupId, SRS-ResourceSetId) for the one or more uplink resource groups/sets. Each uplink resource group/set of the one or more uplink resource groups/sets may be identified/indicated by a respective uplink resource group/set index of the one or more uplink resource group/set indexes. A first uplink resource group/set of the one or more uplink resource groups/sets may be identified by a first uplink resource group/set index of the one or more uplink resource group/set indexes. A second uplink resource group/set of the one or more uplink resource groups/sets may be identified by a second uplink resource group/set index of the one or more uplink resource group/set indexes.

The one or more configuration parameters may indicate one or more CORESET pool indexes (e.g., provided by a higher layer parameter CoresetPoolIndex) for the plurality of uplink resources. Each uplink resource of the plurality of uplink resources may comprise (or be configured/indicated by the one or more configuration parameters) by a respective CORESET pool index of the one or more CORESET pool indexes (e.g., 0, 1). The one or more configuration parameters may indicate, for each uplink resource of the plurality of uplink resources, a respective CORESET pool index of the one or more CORESET pool indexes. The one or more configuration parameters may indicate, for a first uplink resource of the plurality of uplink resources, a first CORE- SET pool index (CoresetPoolIndex=0). The one or more configuration parameters may indicate, for a second uplink resource of the plurality of uplink resources, a second CORESET pool index (CoresetPoolIndex=1). The one or more CORESET pool indexes may comprise the first CORESET pool index and the second CORESET pool index.

The one or more configuration parameters may not indicate, for an uplink resource of the plurality of uplink resources, a CORESET pool index. The higher layer parameter CoresetPoolIndex may be absent in configuration parameter(s) of the uplink resource. The wireless device may determine a value (or a default value) of/for a CORESET pool index of the uplink resource as the first CORESET pool index (CoresetPoolIndex=0). The wireless device may determine the value (or the default value) of/for the CORESET pool index of the uplink resource as the first CORESET pool index, for example, based on the one or more configuration parameters not indicating, for the uplink resource, a CORESET pool index. The first CORESET pool index (CoresetPoolIndex=0) may be the CORESET pool index of the uplink resource, for example, based on the one or more configuration parameters not indicating, for the uplink resource, a CORESET pool index.

The one or more configuration parameters may indicate at least two CORESET pool indexes (e.g., 0 and 1) for a higher layer parameter CORESETPoolIndex. The one or more configuration parameters may comprise the higher layer parameter CORESETPoolIndex with (or set to) the at least two CORESET pool indexes. The at least two CORESET pool indexes may comprise a first CORESET pool index (e.g., 0) for/of one or more first uplink resources of the plurality of uplink resources. The at least two CORESET pool indexes may comprise a second CORESET pool index (e.g., 1), different from the first CORESET pool index, for/of one or more second uplink resources of the plurality of uplink resources. The one or more first uplink resources may comprise one or more third uplink resources, of the plurality of uplink resources, without a value for a higher layer parameter CORESETPoolIndex. The one or more configuration parameters may not comprise the higher layer parameter CORESETPoolIndex for the one or more third uplink resources.

In an example, the cell may comprise a plurality of transmission and reception points (TRPs). The plurality of TRPs may serve the cell (or may serve the wireless device in/via/of the cell). The plurality of TRPs may comprise a first TRP and a second TRP.

The first TRP, of the plurality of TRPs, may receive an uplink signal/transmission (e.g., PUSCH, PUCCH, SRS, UCI, PRACH) via a first uplink resource, of the plurality of uplink resources, with (e.g., configured with or associated with) the first CORESET pool index. The first TRP may not receive an uplink signal/transmission (e.g., PUSCH, PUCCH, SRS, UCI, PRACH) via a second uplink resource, of the plurality of uplink resources, with (e.g., configured with or associated with) the second CORESET pool index.

The second TRP, of the plurality of TRPs, may receive an uplink signal/transmission (e.g., PUSCH, PUCCH, SRS, UCI, PRACH) via a second uplink resource, of the plurality of uplink resources, with (e.g., configured with or associated with) the second CORESET pool index. The second TRP may not receive an uplink signal/transmission (e.g., PUSCH, PUCCH, SRS, UCI, PRACH) via a first uplink resource, of the plurality of uplink resources, with (e.g., configured with or associated with) the first CORESET pool index.

The one or more configuration parameters may indicate one or more CORESET pool indexes (e.g., provided by a higher layer parameter CoresetPoolIndex) for the one or more uplink resource groups/sets. Each uplink resource group/set of one or more uplink resource groups/sets may comprise (or be configured/indicated by the one or more configuration parameters) by a respective CORESET pool index of the one or more CORESET pool indexes (e.g., 0, 1). The one or more configuration parameters may indicate, for each uplink resource group/set of the one or more uplink resource groups/sets, a respective CORESET pool index of the one or more CORESET pool indexes. The one or more configuration parameters may indicate, for a first uplink resource group/set of the one or more uplink resource groups/sets, a first CORESET pool index (CoresetPoolIndex=0). The one or more configuration parameters may indicate, for a second uplink resource group/set of the one or more uplink resource groups/sets, a second CORESET pool index (CoresetPoolIndex=1). The one or more CORESET pool indexes may comprise the first CORESET pool index and the second CORESET pool index.

The one or more configuration parameters may not indicate, for an uplink resource group/set of the one or more uplink resource groups/sets, a CORESET pool index. The higher layer parameter CoresetPoolIndex may be absent in configuration parameter(s) of the uplink resource group/set. The wireless device may determine a value (or a default value) of/for a CORESET pool index of the uplink resource group/set as the first CORESET pool index (CoresetPoolIndex=0). The wireless device may determine the value (or the default value) of/for the CORESET pool index of the uplink resource group/set as the first CORESET pool index, for example, based on the one or more configuration parameters not indicating, for the uplink resource group/set, a CORESET pool index. The first CORESET pool index (CoresetPoolIndex=0) may be the CORESET pool index of the uplink resource group/set, for example, based on the one or more configuration parameters not indicating, for the uplink resource group/set, a CORESET pool index.

The one or more configuration parameters may indicate at least two CORESET pool indexes (e.g., 0 and 1) for a higher layer parameter CORESETPoolIndex. The one or more configuration parameters may comprise the higher layer parameter CORESETPoolIndex with (or set to) the at least two CORESET pool indexes. The at least two CORESET pool indexes may comprise a first CORESET pool index (e.g., 0) for/of one or more first uplink resource groups/sets of the one or more uplink resource groups/sets. The at least two CORESET pool indexes may comprise a second CORESET pool index (e.g., 1), different from the first CORESET pool index, for/of one or more second uplink resource groups/sets of the one or more uplink resource groups/sets. The one or more first uplink resource groups/sets may comprise one or more third uplink resource groups/sets, of the one or more uplink resource groups/sets, without a value for a higher layer parameter CORESETPoolIndex. The one or more configuration parameters may not comprise the higher layer parameter CORESETPoolIndex for the one or more third uplink resource groups/sets.

In an example, the cell may comprise a plurality of transmission and reception points (TRPs). The plurality of TRPs may serve the cell (or may serve the wireless device in/via/of the cell). The plurality of TRPs may comprise a first TRP and a second TRP.

The first TRP, of the plurality of TRPs, may receive an uplink signal/transmission (e.g., PUSCH, PUCCH, SRS, UCI, PRACH) via an uplink resource of/in a first uplink resource group/set, of the one or more uplink resource groups/sets, with (e.g., configured with or associated with) the first CORESET pool index. The first TRP may not receive an uplink signal/transmission (e.g., PUSCH, PUCCH, SRS, UCI, PRACH) via an uplink resource in/of a second uplink resource group/set, of the one or more uplink resource groups/sets, with (e.g., configured with or associated with) the second CORESET pool index.

The second TRP, of the plurality of TRPs, may receive an uplink signal/transmission (e.g., PUSCH, PUCCH, SRS, UCI, PRACH) via an uplink resource in/of a second uplink resource group/set, of the one or more uplink resource groups/sets, with (e.g., configured with or associated with) the second CORESET pool index. The second TRP may not receive an uplink signal/transmission (e.g., PUSCH, PUCCH, SRS, UCI, PRACH) via an uplink resource in/of a first uplink resource group/set, of the one or more uplink resource groups/sets, with (e.g., configured with or associated with) the first CORESET pool index.

The wireless device may send (e.g., transmit), via an uplink resource, an uplink signal/transmission (e.g., PUSCH/PUCCH/SRS transmission). The plurality of uplink resources may comprise the uplink resource. An uplink resource group/set of the one or more uplink resource groups/sets may comprise the uplink resource.

The wireless device may receive, via a CORESET of the plurality of CORESETS, DCI scheduling/triggering/indicating transmission of the uplink signal/transmission. The DCI may schedule/trigger/indicate transmission of the uplink signal/transmission via the uplink resource. The DCI may indicate the uplink resource. The DCI may comprise a field indicating the uplink resource.

The uplink signal/transmission may be a PUSCH transmission (e.g., transport block). The uplink resource may be a PUSCH resource. The DCI may schedule transmission of the PUSCH transmission.

The uplink signal/transmission may be a PUCCH transmission (e.g., HARQ-ACK information feedback). The uplink resource may be a PUCCH resource. The DCI may schedule reception of a transport block (or a PDSCH reception). The uplink signal/transmission may be a HARQ-ACK information feedback of the transport block.

The uplink signal/transmission may be an SRS. The uplink resource may be an SRS resource. The DCI may schedule transmission of the SRS. The SRS may be, for example, an aperiodic SRS.

The CORESET that the wireless device receives the DCI may be associated with a CORESET pool index. The one or more CORESET pool indexes may comprise the CORESET pool index. The one or more configuration parameters may indicate, for the CORESET, the CORESET pool index. The one or more configuration parameters may not indicate, for the CORESET, the CORESET pool index (CoresetPoolIndex=0 or CoresetPoolIndex=1). A value (or a default value) of the CORESET pool index of the CORESET may be equal to the first CORESET pool index (CoresetPoolIndex=0), for example, based on the one or more configuration parameters not indicating, for the CORESET, a CORESET pool index.

The uplink resource may be associated with the CORESET pool index. The uplink resource may be associated with the CORESET pool index, for example, based on receiving, via the CORESET associated with the CORESET pool index, the DCI scheduling/triggering/indicating transmission of the uplink signal/transmission via the uplink resource.

The uplink resource group/set comprising the uplink resource may be associated with the CORESET pool index.

The uplink resource group/set may be associated with the CORESET pool index, for example, based on receiving, via the CORESET associated with the CORESET pool index, the DCI scheduling/triggering/indicating transmission of the uplink signal/transmission via the uplink resource in (that belongs to) the uplink resource group/set. The uplink resource group/set may comprise one or more uplink resources that comprise the uplink resource. The one or more uplink resources may be associated with the CORE-SET pool index, for example, based on the uplink resource group/set comprising the one or more uplink resources being associated with the CORESET pool index. Each uplink resource of the one or more uplink resources may be associated with the CORESET pool index, for example, based on the uplink resource group/set being associated with the CORESET pool index.

The uplink signal/transmission may be associated with the CORESET pool index. The uplink signal/transmission may be associated with the CORESET pool index, for example, based on receiving, via the CORESET associated with the CORESET pool index, the DCI scheduling/triggering/indicating transmission of the uplink signal/transmission.

The one or more configuration parameters may indicate a plurality of TCI states (e.g., DL-orJoint-TCIState). The plurality of TCI states may be unified/common/joint TCI states. The one or more configuration parameters may comprise one or more PDSCH configuration parameters. The one or more PDSCH configuration parameters may indicate the plurality of TCI states. As shown in FIG. 17, the plurality of TCI states may comprise TCI state 1, TCI state 2, . . . , and TCI state M.

The one or more configuration parameters may comprise the one or more PDSCH configuration parameters, for example, for the downlink BWP of the cell. The one or more configuration parameters may indicate the plurality of TCI states for the downlink BWP of the cell.

The one or more configuration parameters may comprise the one or more PDSCH configuration parameters, for example, for a second downlink BWP of a second cell. The one or more configuration parameters may indicate the plurality of TCI states for the second downlink BWP of the second cell. The one or more cells may comprise the second cell. The one or more configuration parameters may comprise, for the downlink BWP of the cell, a reference unified TCI state list parameter (e.g., refUnifiedTCIStateList) indicating the second downlink BWP of the second cell. The reference unified TCI state list parameter may comprise a BWP index (e.g., BWP-Id) identifying/indicating the second downlink BWP. The reference unified TCI state list parameter may comprise a cell index (e.g., ServCellIndex) identifying/indicating the second cell.

The one or more configuration parameters may comprise a unified-TCI-state-type parameter (e.g., unifiedtci-State-Type). The one or more configuration parameters may comprise one or more serving cell parameters (e.g., Serv-ingCellConfig) comprising the unified-TCI-state-type parameter. The unified-TCI-state-type parameter may indicate the unified TCI state type of the cell.

For example, unified-TCI-state-type parameter may be set to "JointULDL". The wireless device may use/apply the plurality of TCI states for both uplink transmissions (e.g., PUSCH/PUCCH/SRS transmissions) of the cell and downlink receptions (e.g., PDCCH/PDSCH/CSI-RS receptions) of the cell, for example, based on the one or more configuration parameters comprising the unified-TCI-state-type parameter set to "JointULDL".

For example, unified-TCI-state-type parameter may be set to "SeparateULDL". The wireless device may use/apply the plurality of TCI states for downlink receptions (e.g., PDCCH/PDSCH/CSI-RS receptions) of the cell, for example, based on the one or more configuration parameters comprising the unified-TCI-state-type parameter set to "SeparateULDL". The wireless device may not use/apply the plurality of TCI states for uplink transmissions (e.g., PUSCH/PUCCH/SRS transmissions) of the cell, for example, based on the one or more configuration parameters comprising the unified-TCI-state-type parameter set to "SeparateULDL".

The one or more configuration parameters may indicate a second plurality of TCI states (e.g., UL-TCIState). The one or more configuration parameters may comprise one or more uplink BWP configuration parameters. The one or more configuration parameters may indicate the second plurality of TCI states. For example, as shown in FIG. 17, the second plurality of TCI states may comprise TCI state 1, TCI state 2, . . . , and TCI state M.

The one or more configuration parameters may comprise the one or more uplink BWP configuration parameters, for example, for the uplink BWP of the cell. The one or more configuration parameters may indicate the second plurality of TCI states for the uplink BWP of the cell.

The one or more configuration parameters may comprise the one or more uplink BWP configuration parameters, for example, for a second uplink BWP of a second cell. The one or more configuration parameters may indicate the second plurality of TCI states for the second uplink BWP of the second cell. The one or more cells may comprise the second cell. The one or more configuration parameters may comprise, for the uplink BWP of the cell, a reference unified TCI state list parameter (e.g., refUnifiedTCIStateList) indicating the second uplink BWP of the second cell. The reference unified TCI state list parameter may comprise a BWP index (e.g., BWP-Id) identifying/indicating the second uplink BWP. The reference unified TCI state list parameter may comprise a cell index (e.g., ServCellIndex) identifying/indicating the second cell.

The wireless device may use/apply the second plurality of TCI states for uplink transmissions (e.g., PUSCH/PUCCH/SRS transmissions) of the cell, for example, based on the one or more configuration parameters comprising the uni-fied-TCI-state-type parameter set to "SeparateULDL". The wireless device may not use/apply the second plurality of TCI states for downlink receptions (e.g., PDCCH/PDSCH/CSI-RS receptions) of the cell, for example, based on the one or more configuration parameters comprising the uni-fied-TCI-state-type parameter set to "SeparateULDL".

The wireless device may use, for downlink receptions via the downlink BWP of the cell, the plurality of TCI states, for example, based on the one or more configuration parameters indicating the plurality of TCI states for the downlink BWP of the cell. The wireless device may use, for uplink trans-missions receptions via the uplink BWP of the cell, the plurality of TCI states, for example, based on the one or more configuration parameters indicating the plurality of TCI states for the downlink BWP of the cell.

The wireless device may use, for downlink receptions via the downlink BWP of the cell, the plurality of TCI states of the second downlink BWP of the second cell. The wireless device may use the plurality of TCI states of the second downlink BWP of the second cell, for example, based on the reference unified TCI state list parameter indicating, for the downlink BWP of the cell, the second downlink BWP of the second cell. The wireless device may use, for uplink transmissions receptions via the uplink BWP of the cell, the plurality of TCI states of the second downlink BWP of the second cell. The wireless device may use the plurality of TCI states of the second downlink BWP of the second cell, for example, based on the reference unified TCI state list parameter indicating, for the downlink BWP of the cell, the second downlink BWP of the second cell.

The wireless device may use, for uplink transmissions receptions via the uplink BWP of the cell, the second plurality of TCI states of the second uplink BWP of the second cell. The wireless device may use the second plurality of TCI states of the second uplink BWP of the second cell, for example, based on the one or more configuration parameters indicating the second plurality of TCI states for the uplink BWP of the cell. The wireless device may use, for uplink transmissions receptions via the uplink BWP of the cell, the second plurality of TCI states of the second uplink BWP of the second cell. The wireless device may use the second plurality of TCI states of the second uplink BWP of the second cell, for example, based on the reference unified TCI state list parameter indicating, for the uplink BWP of the cell, the second uplink BWP of the second cell.

The one or more configuration parameters may indicate, for the cell, a PCI. The one or more configuration parameters may indicate, for the one or more cells, one or more PCIs. The one or more PCIs may comprise the PCI of the cell. The one or more configuration parameters may comprise a higher layer (or RRC) parameter physCellId indicating the one or more PCIs for the one or more cells. The one or more configuration parameters may indicate, for each cell of the one or more cells, a respective PCI of the one or more PCIs. The one or more configuration parameters may comprise the higher layer (or RRC) parameter physCellId indicating a respective PCI of the one or more PCIs for each cell of the one or more cells. For example, the one or more configuration parameters may indicate, for a first cell of the one or more cells, a first PCI of the one or more PCIs. The first PCI may identify a physical cell identity of the first cell. The one or more configuration parameters may indicate, for a second cell of the one or more cells, a second PCI of the one or more PCIs. The second PCI may identify a physical cell identity of the second cell.

The one or more configuration parameters may indicate a list of PCI sets (e.g., indicated by a RRC parameter additionalPCIList). The one or more configuration parameters may comprise one or more serving cell parameters (e.g., ServingCellConfig) indicating the list of PCI sets. The list of PCI sets may comprise at least one PCI set.

The list of PCI sets (or the at least one PCI set) may comprise/indicate at least one PCI (e.g., additionalPCI) of the one or more PCIs. Each PCI set of the list of PCI sets may comprise/indicate a respective PCI of the at least one PCI. The one or more configuration parameters may indicate, for each PCI set of the list of PCI sets, a respective PCI of the at least one PCI. The at least one PCI may not comprise the PCI of the cell. Each PCI of the at least one PCI may be different from the PCI of the cell. The one or more PCIs may comprise the at least one PCI and the PCI of the cell. The at least one PCI may indicate/identify at least one cell of the one or more cells. Each PCI of the at least one PCI may indicate/identify a respective cell of the at least one cell. For example, a first PCI set of the list of PCI sets may comprise a first PCI of the at least one PCI. The first PCI may indicate/identify a first cell of the at least one cell. A second PCI set of the list of PCI sets may comprise a second PCI of the at least one PCI. The second PCI may indicate/identify a second cell of the at least one cell. The at least one cell may not comprise the cell. Each cell of the at least one cell may be different from the cell. The one or more cells may comprise the at least one cell and the cell.

The at least one cell may be/comprise, for example, at least one non-serving cell. The at least one cell may be/comprise, for example, at least one neighboring cell. The at least one cell may be/comprise, for example, at least one candidate/assisting cell.

A maximum size/length of the list of PCI sets may be equal to a value (e.g., 7). A maximum number of PCI sets in the list of PCI sets may be equal to a value (e.g., 7).

The list of PCI sets (or the at least one PCI set) may comprise/indicate at least one additional PCI index (e.g., additionalPCIIndex). Each PCI set of the list of PCI sets may comprise/indicate a respective additional PCI index of the at least one additional PCI index. The one or more configuration parameters may indicate the at least one additional PCI index for the list of PCI sets. The one or more configuration parameters may indicate, for each PCI set of the list of PCI sets, a respective additional PCI index of the at least one additional PCI index. Each PCI set of the list of PCI sets may be identified/indicated by a respective additional PCI index of the at least one additional PCI index. For example, a first PCI set of the list of PCI sets may be identified/indicated by a first additional PCI index of the at least one additional PCI index. A second PCI set of the list of PCI sets may be identified/indicated by a second additional PCI index of the at least one additional PCI index.

The one or more configuration parameters may indicate the list of PCI sets, for example, for inter-cell beam management. The one or more configuration parameters may indicate the list of PCI sets, for example, for inter-cell multi-TRP operation/mode.

For example, the list of PCI sets=[{0, PCI 5}, {1, PCI 2}, {2, PCI 4}, {3, PCI 10}, {4, PCI 21}]. The PCI of the cell may be different from PCI 5, PCI 2, PCI 4, PCI 10, and PCI 21. {0, PCI 5) may be a first PCI set of the list of PCI sets. '0' may be a first additional PCI index of the first PCI set. PCI 5 may be a first PCI indicating/identifying/of a first cell. {1, PCI 2) may be a second PCI set of the list of PCI sets. '1' may be a second additional PCI index of the second PCI set. PCI 2 may be a second PCI indicating/identifying/of a second cell. {2, PCI 4) may be a third PCI set of the list of PCI sets. '2' may be a third additional PCI index of the third PCI set. PCI 4 may be a third PCI indicating/identifying/of a third cell. {3, PCI 10) may be a fourth PCI set of the list of PCI sets. '3' may be a fourth additional PCI index of the fourth PCI set. PCI 10 may be a fourth PCI indicating/identifying/of a fourth cell. {4, PCI 21) may be a fifth PCI set of the list of PCI sets. '4' may be a fifth additional PCI index of the fifth PCI set. PCI 21 may be a fifth PCI indicating/identifying/of a fifth cell. The at least one additional PCI index may comprise the first additional PCI index (0), the second additional PCI index (1), the third additional PCI index (2), the fourth additional PCI index (3), and the fifth additional PCI index (4).

The one or more configuration parameters may indicate, for one or more TCI states of the plurality of TCI states (or the second plurality of TCI states), the at least one additional PCI index. The one or more configuration parameters may indicate, for each TCI state of the one or more TCI states, a respective additional PCI index (e.g., additionalPCI, AdditionalPCIIndex) of the at least one additional PCI index. For example, the one or more configuration parameters may indicate, for a first TCI state of the one or more TCI states, a first additional PCI index (e.g., 0) of the at least one additional PCI index. The first additional PCI index may indicate/identify a first PCI set of the list of PCI sets. The one or more configuration parameters may indicate, for a second TCI state of the one or more TCI states, a second additional PCI index (e.g., 1) of the at least one additional PCI index. The second additional PCI index may indicate/identify a second PCI set of the list of PCI sets. The one or more configuration parameters may indicate, for a third TCI state of the one or more TCI states, a third additional PCI index (e.g., 2) of the at least one additional PCI index, and so on. The third additional PCI index may indicate/identify a third PCI set of the list of PCI sets.

A TCI state of the one or more TCI states may be associated with an additional PCI index of the at least one additional PCI index. The association may be, for example, based on the one or more configuration parameters indicating, for the TCI state, the additional PCI index. The TCI state may comprise/have the additional PCI index. The additional PCI index may indicate/identify a PCI set of the list of PCI sets (or the at least one PCI set). The PCI set may comprise/indicate/have a second PCI of the at least one PCI. The second PCI may indicate/identify a second cell of the at least one cell. The TCI state may be associated with the second PCI (or the second cell), for example, based on the one or more configuration parameters indicating, for the TCI state, the additional PCI index indicating the second PCI (or the second cell). The second PCI of the second cell may be, for example, different from the PCI of the cell.

The one or more configuration parameters may not indicate, for one or more TCI states of the plurality of TCI states, an additional PCI index of the at least one additional PCI index. An additional PCI index may be absent (or may not be present) in configuration parameter(s) of the one or more TCI states. The one or more configuration parameters may comprise the configuration parameter(s) of the one or more TCI states. The one or more TCI states of the plurality of TCI states may not be associated with an additional PCI index. The one or more TCI states may not comprise/have an additional PCI index. Each TCI state of the one or more TCI states may not comprise/have an additional PCI index. The one or more TCI states may be associated with the cell (or the PCI of the cell), for example, based on the one or more configuration parameters not indicating, for the one or more TCI states of the plurality of TCI states, an additional PCI index. The one or more TCI states may be associated with the cell (or the PCI of the cell), for example, based on the one or more configuration parameters not indicating, for each TCI state of the one or more TCI states, an additional PCI index. The one or more TCI states may be associated with the cell (or the PCI of the cell), for example, based on the one or more configuration parameters not indicating, for each TCI state of the one or more TCI states, an additional PCI index of the at least one additional PCI index.

The wireless device may receive a control command (e.g., MAC-CE, DCI, downlink control command, Unified TCI States Activation/Deactivation MAC CE, Activation command 1720, etc.). As shown in FIG. 17, the control command (e.g., activation command 1720) may be received at time T1. The control command may indicate activation of a subset of TCI states of the plurality of TCI states (e.g., DLorJoint-TCIState). For example, the control command may indicate activation of a subset of TCI states of the second plurality of TCI states (e.g., UL-TCIState).

The wireless device may map the subset of TCI states to one or more TCI codepoints. The wireless device may map respective TCI state(s) of the subset of TCI states to a respective TCI codepoint of the one or more TCI codepoints. The one or more TCI codepoints may indicate/comprise the subset of TCI states. Each TCI codepoint of the one or more TCI codepoints may indicate respective TCI state(s) of the subset of TCI states. Each TCI codepoint of the one or more TCI codepoints may indicate/comprise one or more TCI states.

For example, as shown in FIG. 17, the subset of TCI states may comprise TCI state 4, TCI state 5, TCI state 8, TCI state 26, TCI state 61, and TCI state 42. The one or more TCI codepoints may comprise a first TCI codepoint (e.g., TCI codepoint 000), a second TCI codepoint (e.g., TCI codepoint 001), a third TCI codepoint (e.g., TCI codepoint 110), and a fourth TCI codepoint (e.g., TCI codepoint 111). The first TCI codepoint (e.g., TCI codepoint 000) may comprise/indicate the TCI state 4. The second TCI codepoint (e.g., TCI codepoint 001) may comprise/indicate the TCI state 5 and the TCI state 8. The third TCI codepoint (e.g., TCI codepoint 110) may comprise/indicate the TCI state 26 and TCI state 61. The fourth TCI codepoint (e.g., TCI codepoint 111) may comprise/indicate the TCI state 42. As shown in FIG. 17, the first TCI codepoint (e.g., TCI codepoint 000) and the fourth TCI codepoint (e.g., TCI codepoint 111) may each indicate a single TCI state. The second TCI codepoint (e.g., TCI codepoint 001) and the third TCI codepoint (e.g., TCI codepoint 110) may each indicate two TCI states.

The wireless device may receive DCI 1730. As shown in FIG. 17, DCI 1730 may be received at time T2. The DCI 1730 may indicate/select at least two TCI states. For example, the DCI 1730 may indicate/select at least two TCI states among the subset of the TCI states. The DCI may comprise a TCI field. The TCI field may indicate a TCI codepoint of the one or more TCI codepoints. A value of the TCI field may indicate (or be equal to) the TCI codepoint. For example, as shown in FIG. 17, the value of the TCI field of DCI 1730 may be 110.

The TCI codepoint may comprise/indicate at least two TCI states. The at least two TCI states may comprise TCI state 26 and TCI state 61. The DCI 1730 may indicate activation or selection of the at least two TCI states. The TCI codepoint may or may not be a lowest TCI codepoint among the one or more TCI codepoints.

The first TCI state (e.g., TCI state 26 as shown in FIG. 17) may comprise/indicate a first reference signal (e.g., CSI-RS, SSB/PBCH block, DM-RS, SRS, and the like). The first TCI state may comprise/indicate a first quasi co-location type (e.g., QCL TypeA, QCL TypeB, QCL TypeC, QCL TypeD).

The first TCI state may be associated with the PCI of the cell. The first TCI state may not comprise/have an additional PCI index of the at least one additional PCI index. An additional PCI index may be absent in configuration parameter(s) of the first TCI state. The one or more configuration parameters may comprise the configuration parameter(s) of the first TCI state. The first TCI state may be associated with the PCI of the cell, for example, based on the first TCI state not comprising/having an additional PCI index of the at least one additional PCI index. The first reference signal may be quasi co-located with a first SS/PBCH block. The first reference signal may be a first SS/PBCH block. The first SS/PBCH block may be associated with the cell. The first SS/PBCH block may be associated with the PCI of the cell. The one or more configuration parameters may indicate, for the cell, the first SS/PBCH block.

The first TCI state may be associated with a second PCI of a second cell. The at least one cell of the one or more cells may comprise the second cell. The at least one PCI in (or indicated by) the list of PCI sets may comprise the second PCI. The second PCI may indicate/identify the second cell. The first TCI state may comprise/have an additional PCI index of the at least one additional PCI index. The one or more configuration parameters may indicate, for the first TCI state, the additional PCI index. The additional PCI index may indicate a PCI set of the list of PCI sets. The PCI set may comprise/indicate the second PCI of the second cell. The first TCI state may be associated with the second PCI of the second cell, for example, based on the first TCI state comprising/having the additional PCI index indicating the second PCI of the second cell. The first TCI state may be associated with the second PCI of the second cell, for example, based on the one or more configuration parameters indicating, for the first TCI state, the additional PCI index that indicates the second PCI of the second cell. The first reference signal may be quasi co-located with a first SS/PBCH block. The first reference signal may be a first SS/PBCH block. The first SS/PBCH block may be associated with the second cell. The first SS/PBCH block may be associated with the second PCI of the second cell. The one or more configuration parameters may indicate, for the second cell, the first SS/PBCH block.

The second TCI state (e.g., TCI state 61 as shown in FIG. 17) may comprise/indicate a second reference signal (e.g., CSI-RS, SSB/PBCH block, DM-RS, SRS, and the like). The second TCI state may comprise/indicate a second quasi co-location type (e.g., QCL TypeA, QCL TypeB, QCL TypeC, QCL TypeD).

The second TCI state may be associated with a second PCI of a second cell. The at least one cell of the one or more cells may comprise the second cell. The at least one PCI in (or indicated by) the list of PCI sets may comprise the second PCI. The second PCI may indicate/identify the second cell. The second TCI state may comprise/have an additional PCI index of the at least one additional PCI index. The one or more configuration parameters may indicate, for the second TCI state, the additional PCI index. The additional PCI index may indicate a PCI set of the list of PCI sets. The PCI set may comprise/indicate the second PCI of the second cell. The second TCI state may be associated with the second PCI of the second cell, for example, based on the second TCI state comprising/having the additional PCI index indicating the second PCI of the second cell. The second TCI state may be associated with the second PCI of the second cell, for example, based on the one or more configuration parameters indicating, for the second TCI state, the additional PCI index that indicates the second PCI of the second cell. The second reference signal may be quasi co-located with a second SS/PBCH block. The second reference signal may be a second SS/PBCH block. The second SS/PBCH block may be associated with the second cell. The second SS/PBCH block may be associated with the second PCI of the second cell. The one or more configuration parameters may indicate, for the second cell, the second SS/PBCH block.

The second TCI state may be associated with the PCI of the cell. The second TCI state may not comprise/have an additional PCI index of the at least one additional PCI index. An additional PCI index may be absent in configuration parameter(s) of the second TCI state. The one or more configuration parameters may comprise the configuration parameter(s) of the second TCI state. The second TCI state may be associated with the PCI of the cell, for example, based on the second TCI state not comprising/having an additional PCI index of the at least one additional PCI index. The second reference signal may be quasi co-located with a second SS/PBCH block. The second reference signal may be a second SS/PBCH block. The second SS/PBCH block may be associated with the cell. The second SS/PBCH block may be associated with the PCI of the cell. The one or more configuration parameters may indicate, for the cell, the second SS/PBCH block.

The second cell with (or identified/indicated by) the second PCI may be a non-serving cell. The second cell with (or identified/indicated by) the second PCI may be a neighboring cell. The second cell with (or identified/indicated by) the second PCI may be a candidate/assisting cell.

The one or more configuration parameters may indicate, for the first TCI state, a first TCI state index (e.g., tci-StateId). The one or more configuration parameters may indicate, for the second TCI state, a second TCI state index. The first TCI state index may be lower/less than the second TCI state index.

The control command indicating activation of the subset of TCI states may comprise a plurality of fields. A first field of the plurality of fields may indicate the first TCI state. For example, the first field may comprise the first TCI state index indicating/identifying the first TCI state. The first field may occur/be (or be located) in a first octet of the control command. A second field of the plurality of fields may indicate the second TCI state. For example, the second field may comprise the second TCI state index indicating/identifying the second TCI state. The second field may occur/be (or be located) in a second octet of the control command. The first octet may be lower/less than the second octet. For example, the first octet may be Octet 5, and the second octet may be Octet 6. For example, the first octet may be Octet 1, and the second octet may be Octet 2. For example, the first octet may be Octet 8, and the second octet may be Octet 10.

The control command (e.g., activation command 1720) may indicate/map/activate a list/set/vector of the at least two TCI states in/to/for the TCI codepoint. The control command may indicate mapping/association/activation of the list/set/vector of the at least two TCI states to/for the TCI codepoint. The at least two TCI states may comprise the first TCI state and the second TCI state. The first TCI state may occur first in the list/set/vector of the at least two TCI states. The first TCI state may be a first/starting/earliest/initial TCI state in the list/set/vector of the at least two TCI states. The second TCI state may occur second in the list/set/vector of the at least two TCI states. The second TCI state may be a last/latest/ending TCI state in the list/set/vector of the at least two TCI states.

The one or more configuration parameters may indicate a plurality of uplink power control sets (e.g., Uplink-power-Control). The one or more configuration parameters may comprise one or more serving cell parameters (e.g., ServingCellConfig) indicating, for example, the plurality of uplink power control sets. The one or more configuration parameters may indicate, for the plurality of uplink power control sets, a plurality of uplink power control set indexes/identifiers/identities (e.g., Uplink-powerControlId). The one or more configuration parameters may indicate, for each uplink power control set of the plurality of uplink power control sets, a respective uplink power control set index of the plurality of uplink power control set indexes/identifiers/identities. Each uplink power control set of the plurality of uplink power control sets may comprise/indicate respective power control parameters (e.g., target received power, closed-loop index, pathloss compensation factor, alpha, pathloss reference signal, and the like). For example, the plurality of uplink power control sets may comprise a first uplink power control set. The first uplink power control set may comprise/indicate one or more first power control parameters (e.g., target received power, closed-loop index, pathloss compensation factor, alpha, pathloss reference signal, and the like). The first uplink power control set may be indicated/identified by a first uplink power control set index of the plurality of uplink power control set indexes/identifiers/identities. For example, the plurality of uplink power control sets may comprise a second uplink power control set. The second uplink power control set may comprise/indicate one or more second power control parameters (e.g., target received power, closed-loop index, pathloss compensation factor, alpha, pathloss reference signal, and the like). The second uplink power control set may be indicated/identified by a second uplink power control set index of the plurality of uplink power control set indexes/identifiers/identities.

The one or more configuration parameters may not indicate, for the plurality of TCI states (or the second plurality of TCI states), an uplink power control set index of the plurality of uplink power control set indexes. The one or more configuration parameters may not indicate, for each TCI state of the plurality of TCI states (or of the second plurality of TCI states), an uplink power control set index of the plurality of uplink power control set indexes. The plurality of TCI states (or the second plurality of TCI states) may not comprise/have/indicate an uplink power control set index of the plurality of uplink power control set indexes. Each TCI state of the plurality of TCI states (or of the second plurality of TCI states) may not comprise/have/indicate an uplink power control set index of the plurality of uplink power control set indexes.

The one or more configuration parameters may not indicate, for the subset of TCI states, an uplink power control set index of the plurality of uplink power control set indexes. The one or more configuration parameters may not indicate, for each TCI state of the subset of TCI states, an uplink power control set index of the plurality of uplink power control set indexes. The subset of TCI states may not comprise/have/indicate an uplink power control set index of the plurality of uplink power control set indexes. Each TCI state of the subset of TCI states may not comprise/have/indicate an uplink power control set index of the plurality of uplink power control set indexes.

The one or more configuration parameters may not indicate, for the first TCI state, an uplink power control set index of the plurality of uplink power control set indexes. The first TCI state may not comprise/have/indicate an uplink power control set index of the plurality of uplink power control set indexes.

The one or more configuration parameters may not indicate, for the second TCI state, an uplink power control set index of the plurality of uplink power control set indexes. The second TCI state may not comprise/have/indicate an uplink power control set index of the plurality of uplink power control set indexes.

The one or more configuration parameters may indicate/comprise, for the (active) uplink BWP of the cell, at least two uplink power control set indexes. The plurality of uplink power control set indexes may comprise the at least two uplink power control set indexes. The one or more configuration parameters may comprise dedicated uplink BWP configuration parameters (e.g., IE BWP-UplinkDedicated, UL BWP in FIG. 17) comprising/indicating the at least two uplink power control set indexes. The at least two uplink power control set indexes may indicate/identify at least two uplink power control sets of/among the plurality of uplink power control sets. Each uplink power control set index of the at least two uplink power control set indexes may indicate/identify a respective uplink power control set of the at least two uplink power control set indexes may indicate/identify a respective uplink power control set of the plurality of uplink power control sets.

The at least two uplink power control set indexes may comprise a first uplink power control set index (e.g., Uplink-powerControlId, ul-powerControl) and a second uplink power control set index (e.g., Uplink-powerControlId, ul-powerControl2). The first uplink power control set index may indicate/identify a first uplink power control set (e.g., UL power control 1 in FIG. 17). The plurality of uplink power control sets may comprise the first uplink power control set. The at least two uplink power control sets may comprise the first uplink power control set. The second uplink power control set index may indicate/identify a second uplink power control set (e.g., UL power control 2 in FIG. 17). The plurality of uplink power control sets may comprise the second uplink power control set. The at least two uplink power control sets may comprise the second uplink power control set. The first uplink power control set index indicating/identifying the first uplink power control set (e.g., UL power control 1 in FIG. 17) may be lower/less than the second uplink power control set index indicating/identifying the second uplink power control set (e.g., UL power control 2 in FIG. 17).

The one or more configuration parameters may indicate/comprise, for the (active) uplink BWP of the cell, a list/vector/sequence of the at least two uplink power control set indexes. The first uplink power control set index indicating/identifying the first uplink power control set (e.g., UL power control 1 in FIG. 17) may occur first in the list/vector/sequence of the at least two uplink power control set indexes. The first uplink power control set index may be a starting/earliest/initial/first uplink power control set index in the list/vector/sequence of the at least two uplink power control set indexes. The first uplink power control set index may be the UL power control 8, for example, if the list/vector/sequence of the at least two uplink power control set indexes is equal to [UL power control 8, UL power control 15]. The first uplink power control set index may be the UL power control 15, for example, if the list/vector/sequence of the at least two uplink power control set indexes is equal to [UL power control 15, UL power control 8].

The second uplink power control set index indicating/identifying the second uplink power control set (e.g., UL power control 2 in FIG. 17) may occur second in the list/vector/sequence of the at least two uplink power control set indexes. The second uplink power control set index indicating/identifying the second uplink power control set (e.g., UL power control 2 in FIG. 17) may occur last in the list/vector/sequence of the at least two uplink power control set indexes. The second uplink power control set index may be a latest/last/ending/second uplink power control set index in the list/vector/sequence of the at least two uplink power control set indexes. The second uplink power control set index may be the UL power control 15, for example, if the list/vector/sequence of the at least two uplink power control set indexes is equal to [UL power control 8, UL power control 15]. The second uplink power control set index may be the UL power control 8, for example, if the list/vector/sequence of the at least two uplink power control set indexes is equal to [UL power control 15, UL power control 8].

The first uplink power control set (e.g., UL power control 1 in FIG. 17) may be associated with the PCI of the cell. The first uplink power control set may be associated with the PCI of the cell, for example, based on the one or more configuration parameters not indicating, for the first uplink power control set, an additional PCI index of the at least one additional PCI index. An additional PCI index may be absent (or may not be present) in configuration parameter(s) of the first uplink power control set. The one or more configuration parameters may comprise the configuration parameter(s). The first uplink power control set may not be associated with an additional PCI index. The first uplink power control set may not comprise/have an additional PCI index.

The second uplink power control set (e.g., UL power control 2 in FIG. 17) may be associated with a second PCI. The second PCI may be different from the PCI of the cell. The second uplink power control set may be associated with the second PCI, for example, based on the one or more configuration parameters indicating, for the second uplink power control set, an additional PCI index of the at least one additional PCI index. The additional PCI index may indicate/identify a PCI set of the list of PCI sets (or the at least one PCI set). The PCI set may comprise/indicate/have the second PCI. The second PCI may indicate/identify a second cell of the at least one cell. The second uplink power control set may be associated with the second PCI (or the second cell), for example, based on the one or more configuration parameters indicating, for the second uplink power control set, the additional PCI index indicating the second PCI (or the second cell). The second PCI of the second cell may be, for example, different from the PCI of the cell.

The one or more configuration parameters may indicate, for one or more uplink power control sets of the plurality of uplink power control sets, the at least one additional PCI index. The one or more configuration parameters may indicate, for each uplink power control set of the one or more uplink power control sets, a respective additional PCI index of the at least one additional PCI index.

The one or more configuration parameters may indicate, for a first uplink power control set of the one or more uplink power control sets, a first additional PCI index of the at least one additional PCI index. The first uplink power control set may comprise/have/indicate the first additional PCI index. The first additional PCI index may indicate/identify a first PCI set of the list of PCI sets. The first PCI set may comprise/indicate/have a first PCI of the at least one PCI. The first PCI may indicate/identify a first cell of the at least one cell. The first uplink power control set may be associated with the first PCI. The wireless device may determine, for transmission of an uplink signal, a transmission power. The transmission power may be determined based on the first uplink power control set, for example, if the transmission of the uplink signal is associated with a TCI state associated with the first PCI. The transmission power may be determined based on the first uplink power control set, for example, if the wireless device sends (e.g., transmits) the uplink signal based on a TCI state associated with the first PCI. The transmission power may be determined based on the first uplink power control set, for example, if the wireless device is configured/indicated to send (e.g., transmit) the uplink signal based on a TCI state associated with the first PCI.

The one or more configuration parameters may indicate, for a second uplink power control set of the one or more uplink power control sets, a second additional PCI index of the at least one additional PCI index. The second uplink power control set may comprise/have/indicate the second additional PCI index. The second additional PCI index may indicate/identify a second PCI set of the list of PCI sets. The second PCI set may comprise/indicate/have a second PCI of the at least one PCI. The second PCI may indicate/identify a second cell of the at least one cell. The second uplink power control set may be associated with the second PCI. The wireless device may determine, for transmission of an uplink signal, a transmission power. The transmission power may be determined based on the second uplink power control set, for example, if the transmission of the uplink signal is associated with a TCI state associated with the second PCI. The transmission power may be determined based on the second uplink power control set, for example, if the wireless device sends (e.g., transmits) the uplink signal based on a TCI state associated with the second PCI. The transmission power may be determined based on the second uplink power control set, for example, if the wireless device is configured/indicated to send (e.g., transmit) the uplink signal based on a TCI state associated with the second PCI.

The wireless device may send (e.g., transmit) the uplink signal/transmission based on at least one of the first TCI state (e.g., TCI state 26) and the second TCI state (e.g., TCI state 61), for example, after the first TCI state and the second TCI state is activated. As shown in FIG. 17, the wireless device may send (e.g., transmit) the uplink signal/transmission based on at least one of the first TCI state and the second TCI state, for example, after receiving DCI 1730 at time T2.

The wireless device may send (e.g., transmit) a first uplink signal/transmission (e.g., PUSCH/PUCCH/SRS transmission, transport block, UCI, and the like) based on the first TCI state. The wireless device may send (e.g., transmit) the first uplink signal/transmission, for example, with/using a first spatial domain transmitting/transmission filter/beam determined based on the first TCI state. The first spatial domain transmission filter/beam may be determined, for example, based on the first reference signal indicated by the first TCI state.

The first spatial domain transmitting/transmission filter/beam may be, for example, same as (or substantially same as, x degrees apart, x=0, 1, 5, 10, and the like) a spatial domain reception/receiving filter/beam used to receive the first reference signal. The first spatial domain transmitting/transmission filter/beam may be, for example, same as (or substantially same as, x degrees apart, x=0, 1, 5, 10, and the like) a spatial domain transmission/transmitting filter/beam used to send (e.g., transmit) the first reference signal.

At least one DMRS antenna port of the first uplink signal/transmission may be quasi co-located with the first reference signal indicated by the first TCI state. The at least one DMRS antenna port of the first uplink signal/transmission may be quasi co-located with the first reference signal with respect to the first quasi co-location type (e.g., QCL TypeA, QCL Type B, QCL type C, QCL TypeD) indicated by the first TCI state.

The wireless device may send (e.g., transmit) the first uplink signal/transmission, for example, with/using a first transmission power.

The wireless device may transmit the first uplink signal/transmission with/using the first transmission power, for example, determined based on the first TCI state. As described herein, the first TCI state may be mapped to (or be associated with) the first uplink power control set. The wireless device may determine, for the first uplink signal/transmission, the first transmission power based on the one or more first power control parameters indicated by the first uplink power control set, for example, based on (e.g., in response to) the first TCI state being mapped to (or being associated with) the first uplink power control set.

The first uplink power control set (e.g., UL power control 1) may comprise/indicate one or more first power control parameters (e.g., target received power, closed-loop index, pathloss compensation factor, alpha, pathloss reference signal, and the like). The wireless device may determine, for the first uplink signal/transmission, the first transmission power based on the one or more first power control parameters indicated by (or included in or associated with) the first uplink power control set. The wireless device may determine, for the first uplink signal/transmission, the first transmission power based on the one or more first power control parameters indicated by the first uplink power control set, for example, based on (e.g., in response to) the one or more configuration parameters not indicating, for the first TCI state, an uplink power control set index of the plurality of uplink power control set indexes. The wireless device may determine, for the first uplink signal/transmission, the first transmission power based on the one or more first power control parameters indicated by (or included in or associated with) the first uplink power control set, for example, based on (e.g., in response to) the first uplink signal/transmission being associated with a first CORESET pool index (e.g., CoresetPoolIndex=0).

The first TCI state may be mapped to (or be associated with) the first uplink power control set, for example, based on the first TCI state index of the first TCI state being lower/less than the second TCI state index of the second TCI state.

The first TCI state may be mapped to (or be associated with) the first uplink power control set, for example, based on the first octet indicating the first TCI state being lower/less than the second octet indicating the second TCI state. The control command indicating activation of the subset of TCI states may comprise the first octet and the second octet.

The first TCI state may be mapped to (or be associated with) the first uplink power control set, for example, based on the first TCI state occurring first in the list/set/vector of the at least two TCI states (or in the TCI codepoint). The first TCI state may be mapped to (or be associated with) the first uplink power control set, for example, based on the first TCI state being the first/starting/earliest/initial TCI state in the list/set/vector of the at least two TCI states (or in the TCI codepoint).

The first TCI state may be mapped to (or be associated with) the first uplink power control set, for example, based on the first TCI state and the first uplink power control set being associated with the PCI of the cell. The first TCI state may be mapped to (or be associated with) the first uplink power control set, for example, based on the first TCI state and the first uplink power control set being associated with the same PCI.

The first TCI state may be mapped to (or be associated with) the first uplink power control set, for example, based on the first uplink power control set index indicating/identifying the first uplink power control set being lower/less than the second uplink power control set index indicating/identifying the second uplink power control set.

The first TCI state may be mapped to (or be associated with) the first uplink power control set, for example, based on the first uplink power control set index indicating/identifying the first uplink power control set occurring first in the list/vector/sequence of the at least two uplink power control set indexes. The first TCI state may be mapped to (or be associated with) the first uplink power control set, for example, based on the first uplink power control set index being the starting/earliest/initial/first uplink power control set index in the list/vector/sequence of the at least two uplink power control set indexes.

The one or more configuration parameters may indicate, for the first TCI state, a first pathloss reference signal index (e.g., pathlossReferenceRS-Id) indicating/identifying a first pathloss reference signal. The first TCI state may comprise/ have/indicate the first pathloss reference signal index indicating/identifying the first pathloss reference signal. The one or more configuration parameters may indicate, for the first pathloss reference signal, the first pathloss reference signal index. The first TCI state may indicate (or comprise or be mapped to or be associated with) the first pathloss reference signal. The wireless device may determine, for the first uplink signal/transmission, the first transmission power based on the first pathloss reference signal indicated by (or associated with) the first TCI state.

The wireless device may send (e.g., transmit) a second uplink signal/transmission (e.g., PUSCH/PUCCH/SRS transmission, transport block, UCI, and the like) based on the second TCI state. The wireless device may send (e.g., transmit) the second uplink signal/transmission, for example, with/using a second spatial domain transmitting/transmission filter/beam determined based on the second TCI state. The wireless device may determine the second spatial domain transmission filter/beam. The second domain transmission filter/beam may be determined based on the second reference signal indicated by the second TCI state.

The second spatial domain transmitting/transmission filter/beam may be, for example, same as (or substantially same as, x degrees apart, x=0, 1, 5, 10, and the like) a spatial domain reception/receiving filter/beam used to receive the second reference signal. The second spatial domain transmitting/transmission filter/beam may be, for example, same as (or substantially same as, x degrees apart, x=0, 1, 5, 10, and the like) a spatial domain transmission/transmitting filter/beam used to send (e.g., transmit) the second reference signal.

At least one DMRS antenna port of the second uplink signal/transmission may be quasi co-located with the second reference signal indicated by the second TCI state. The at least one DMRS antenna port of the second uplink signal/transmission may be quasi co-located with the second reference signal with respect to the second quasi co-location type (e.g., QCL TypeA, QCL Type B, QCL type C, QCL TypeD) indicated by the second TCI state.

The wireless device may send (e.g., transmit) the second uplink signal/transmission, for example, with/using a second transmission power. The second transmission power may be determined, for example, based on the second TCI state. The second TCI state may be mapped to (or be associated with) the second uplink power control set. The wireless device may determine, for the second uplink signal/transmission, the second transmission power based on the one or more second power control parameters indicated by the second uplink power control set, for example, based on (e.g., in response to) the second TCI state being mapped to (or being associated with) the second uplink power control set.

The second uplink power control set (e.g., UL power control 2 in FIG. 17) may comprise/indicate one or more second power control parameters (e.g., target received power, closed-loop index, pathloss compensation factor, alpha, pathloss reference signal, and the like). The wireless device may determine, for the second uplink signal/transmission, the second transmission power based on the one or more second power control parameters indicated by (or included in or associated with) the second uplink power control set. The wireless device may determine, for the second uplink signal/transmission, the second transmission power based on the one or more second power control parameters indicated by the second uplink power control set, for example, based on (e.g., in response to) the one or more configuration parameters not indicating, for the second TCI state, an uplink power control set index of the plurality of uplink power control set indexes.

The wireless device may determine, for the second uplink signal/transmission, the second transmission power based on the one or more second power control parameters indicated by (or included in or associated with) the second uplink power control set, for example, based on (e.g., in response to) the second uplink signal/transmission being associated with a second CORESET pool index (e.g., CoresetPoolIndex=1).

The second TCI state may be mapped to (or be associated with) the second uplink power control set, for example, based on the first TCI state index of the first TCI state being lower/less than the second TCI state index of the second TCI state. The second TCI state may be mapped to (or be associated with) the second uplink power control set, for example, based on the second TCI state index of the second TCI state being higher/greater than the second TCI state index of the second TCI state.

The second TCI state may be mapped to (or be associated with) the second uplink power control set, for example, based on the first octet indicating the first TCI state being lower/less than the second octet indicating the second TCI state. The second TCI state may be mapped to (or be associated with) the second uplink power control set, for example, based on the second octet indicating the second TCI state being higher/greater than the first octet indicating the first TCI state. The control command indicating activation of the subset of TCI states may comprise the first octet and the second octet.

The second TCI state may be mapped to (or be associated with) the second uplink power control set, for example, based on the second TCI state occurring last in the list/set/vector of the at least two TCI states (or in the TCI codepoint). The second TCI state may be mapped to (or be associated with) the second uplink power control set, for example, based on the second TCI state occurring second in the list/set/vector of the at least two TCI states (or in the TCI codepoint). The second TCI state may be mapped to (or be associated with) the second uplink power control set, for example, based on the second TCI state being the second/last/ending/latest TCI state in the list/set/vector of the at least two TCI states (or in the TCI codepoint).

The second TCI state may be mapped to (or be associated with) the second uplink power control set, for example, based on the second TCI state and the second uplink power control set being associated with the second PCI. The second PCI may be different from the PCI of the cell. The second TCI state may be mapped to (or be associated with) the second uplink power control set, for example, based on the second TCI state and the second uplink power control set being associated with the same PCI.

The second TCI state may be mapped to (or be associated with) the second uplink power control set, for example, based on the first uplink power control set index indicating/identifying the first uplink power control set being lower/less than the second uplink power control set index indicating/identifying the second uplink power control set. The second TCI state may be mapped to (or be associated with) the second uplink power control set, for example, based on the second uplink power control set index indicating/identifying the second uplink power control set being higher/greater than the first uplink power control set index indicating/identifying the first uplink power control set.

The second TCI state may be mapped to (or be associated with) the second uplink power control set, for example, based on the second uplink power control set index indicating/identifying the second uplink power control set occurring second in the list/vector/sequence of the at least two uplink power control set indexes. The second TCI state may be mapped to (or be associated with) the second uplink power control set, for example, based on the second uplink power control set index indicating/identifying the second uplink power control set occurring last in the list/vector/sequence of the at least two uplink power control set indexes. The second TCI state may be mapped to (or be associated with) the second uplink power control set, for example, based on the second uplink power control set index being the last/latest/ending/second uplink power control set index in the list/vector/sequence of the at least two uplink power control set indexes.

The one or more configuration parameters may indicate, for the second TCI state, a second pathloss reference signal index (e.g., pathlossReferenceRS-Id) indicating/identifying a second pathloss reference signal. The second TCI state may comprise/have/indicate the second pathloss reference signal index indicating/identifying the second pathloss reference signal. The one or more configuration parameters may indicate, for the second pathloss reference signal, the second pathloss reference signal index. The second TCI state may indicate (or comprise or be mapped to or be associated with) the second pathloss reference signal. The wireless device may determine, for the second uplink signal/transmission, the second transmission power based on the second pathloss reference signal indicated by (or associated with) the second TCI state.

The first uplink signal/transmission and the second uplink signal/transmission may be different. The first uplink signal/transmission may be transmission of a first portion (e.g., first data layer(s)/streams) of an uplink signal. The second uplink signal/transmission may be transmission of a second portion (e.g., second data layer(s)/streams) of the uplink signal.

The first uplink signal/transmission and the second uplink signal/transmission may be the same. The first uplink signal/transmission and the second uplink signal/transmission may be repetitions of an uplink transmission (e.g., PUSCH/PUCCH repetition, repetition of a transport block, etc.). The repetitions may be, for example, in frequency domain (e.g., FDM). The repetitions may be, for example, in time domain (e.g., TDM). The repetitions may be, for example, in spatial domain (e.g., SDM, SFN).

The wireless device may send (e.g., transmit) the first uplink signal/transmission, for example, between time T2 and time T3 in FIG. 17. The wireless device may send (e.g., transmit) the second uplink signal/transmission, for example, between time T2 and time T3 in FIG. 17.

The wireless device may receive DCI 1740 as shown in FIG. 17. For example, the wireless device may receive DCI 1740 at time T3. The DCI 1740 may comprise a TCI field. The TCI field may indicate a TCI codepoint of the one or more TCI codepoints.

A value of the TCI field may indicate (or be equal to) the TCI codepoint. The TCI codepoint may comprise/indicate a TCI state. For example, as shown in FIG. 17, the TCI codepoint 111 in DCI 1740 may comprise/indicate TCI state 42. The subset of TCI states may comprise the TCI state of/in the TCI codepoint. The DCI 1740 may indicate activation of the TCI state. The TCI codepoint may comprise/indicate a single TCI state. The TCI state may be a single TCI state in the TCI codepoint.

The TCI state may comprise/indicate a reference signal (e.g., CSI-RS, SSB/PBCH block, DM-RS, SRS, and the like). The TCI state may comprise/indicate a quasi co-location type (e.g., QCL TypeA, QCL TypeB, QCL TypeC, QCL TypeD).

The one or more configuration parameters may not indicate, for the TCI state, an uplink power control set index of the plurality of uplink power control set indexes. The TCI state may not comprise/have/indicate an uplink power control set index of the plurality of uplink power control set indexes.

The wireless device may send (e.g., transmit) an uplink signal/transmission (e.g., PUSCH/PUCCH/SRS transmission, transport block, UCI, and the like) based on the TCI state. The wireless device may send (e.g., transmit) the uplink signal/transmission, for example, with/using a spatial domain transmitting/transmission filter/beam determined based on the TCI state. The wireless device may determine the spatial domain transmission filter/beam determined based on the reference signal indicated by the TCI state.

The wireless device may send (e.g., transmit) the uplink signal/transmission, for example, for a configured uplink grant. The configured uplink grant may be, for example, a Type 1 configured uplink grant. The configured uplink grant may be, for example, a Type 2 configured uplink grant.

At least one DMRS antenna port of the uplink signal/transmission may be quasi co-located with the reference signal indicated by the TCI state. The at least one DMRS antenna port of the uplink signal/transmission may be quasi co-located with the reference signal with respect to the quasi co-location type (e.g., QCL TypeA, QCL Type B, QCL type C, QCL TypeD) indicated by the TCI state.

The wireless device may send (e.g., transmit) the uplink signal/transmission, for example, with/using a transmission power. The wireless device may determine/calculate/compute the transmission power, for example, based on an uplink power control set (e.g., the first uplink power control set, the second uplink power control set, a default power control set, etc.) among the at least two uplink power control sets (e.g., UL power control 1 and UL power control 2 in FIG. 17).

The wireless device may determine/calculate/compute the transmission power based on the uplink power control set, for example, based on (e.g., in response to) the DCI (e.g., DCI 1740 in FIG. 17) indicating activation of a single TCI state. The wireless device may send (e.g., transmit) the uplink signal/transmission with/using the transmission power determined based on the uplink power control set.

The wireless device may determine/calculate/compute the transmission power based on the uplink power control set among the at least two uplink power control sets. The wireless device may determine the at least two uplink power control sets, for example, based on (e.g., in response to) the one or more configuration parameters indicating, for the active uplink BWP of the cell, the at least two uplink power control set indexes. The wireless device may send (e.g., transmit) the uplink signal/transmission with/using the transmission power determined based on the uplink power control set, for example, based on (e.g., in response to) the one or more configuration parameters indicating, for the active uplink BWP of the cell, the at least two uplink power control set indexes.

The wireless device may determine/select, for transmission of the uplink signal/transmission, the uplink power control set among the at least two uplink power control sets. The wireless device may determine/select, for transmission of the uplink signal/transmission, the uplink power control set among the at least two uplink power control sets, for example, based on the DCI (e.g., DCI 1740 in FIG. 17)

indicating activation of a single TCI state. The wireless device may determine/select, for transmission of the uplink signal/transmission, the uplink power control set among the at least two uplink power control sets, for example, based on the one or more configuration parameters indicating, for the active uplink BWP of the cell, the at least two uplink power control set indexes.

The wireless device may send (e.g., transmit) the uplink signal/transmission with/using the transmission power determined based on the uplink power control set, for example, after time T3 in FIG. 17. The wireless device may not send (e.g., transmit) a second uplink signal/transmission with/using a second transmission power determined based on a second uplink power control set, of the at least two uplink power control sets, different from the uplink power control set, for example, after time T3 in FIG. 17.

For example, the wireless device may send (e.g., transmit) the uplink signal/transmission with/using a first transmission power determined based on the one or more first power control parameters indicated by (or included in or associated with) the first uplink power control set, for example, if the uplink power control set is the first uplink power control set (e.g., UL power control 1 in FIG. 17). The wireless device may not send (e.g., transmit) a second uplink signal/transmission with/using a second transmission power determined based on the one or more second power control parameters indicated by (or included in or associated with) the second uplink power control set (e.g., UL power control 2 in FIG. 17).

The wireless device may send (e.g., transmit) the uplink signal/transmission with/using a second transmission power determined based on the one or more second power control parameters indicated by (or included in or associated with) the second uplink power control set, for example, if the uplink power control set is the second uplink power control set (e.g., UL power control 2). The wireless device may not send (e.g., transmit) a first uplink signal/transmission with/using a first transmission power determined based on the one or more first power control parameters indicated by (or included in or associated with) the first uplink power control set (e.g., UL power control 1).

The uplink power control set may be a default/reference uplink power control set among the at least two uplink power control sets. The uplink power control set may be a default/reference uplink power control set among the at least two uplink power control sets, for example, if the wireless device receives DCI 1740 indicating activation of a single TCI state.

The uplink power control set may be an uplink power control set, among the at least two uplink power control sets, with a lowest uplink power control set index among the at least two uplink power control set indexes of the at least two uplink power control sets. The one or more configuration parameters may indicate, for the uplink power control set among the at least two uplink power control sets, an uplink power control set index that is lowest among the at least two uplink power control set indexes. The wireless device may send (e.g., transmit) the uplink signal/transmission with/using the transmission power determined based on the uplink power control set, for example, based on (e.g., in response to) the one or more configuration parameters indicating, for the uplink power control set, the uplink power control set index that is lowest among the at least two uplink power control set indexes. The wireless device may determine, for the uplink signal/transmission, the transmission power based on the uplink power control set, for example, based on (e.g., in response to) the one or more configuration parameters indicating, for the uplink power control set, the uplink power control set index that is lowest among the at least two uplink power control set indexes.

The uplink power control set may be an uplink power control set, among the first uplink power control set and the second uplink power control set, with a lowest uplink power control set index among the first uplink power control set index of the first uplink power control set and the second uplink power control set index of the second uplink power control set. The one or more configuration parameters may indicate, for the uplink power control set among the first uplink power control set and the second uplink power control set, an uplink power control set index that is lowest among the first uplink power control set index and the second uplink power control set index. For example, the first uplink power control set index of the first uplink power control set may be lower/less than the second uplink power control set index of the second uplink power control set. The uplink power control set may be determined as the first uplink power control set, for example, based on the first uplink power control set index of the first uplink power control set being lower/less than the second uplink power control set index of the second uplink power control set. The wireless device may determine, for transmission of the uplink signal/transmission, the transmission power based on the first uplink power control set, for example, based on (e.g., in response to) the first uplink power control set index of the first uplink power control set being lower/less than the second uplink power control set index of the second uplink power control set. The wireless device may send (e.g., transmit) the uplink signal/transmission with/using the transmission power determined based on the first uplink power control set, for example, based on (e.g., in response to) the first uplink power control set index of the first uplink power control set being lower/less than the second uplink power control set index of the second uplink power control set.

The uplink power control set may be identified by an uplink power control set index that occurs first among/in the list/vector/sequence of the at least two uplink power control set indexes. The at least two uplink power control set indexes may comprise the uplink power control set index of the uplink power control set. The uplink power control set index of the uplink power control set may be a starting/earliest/initial/first uplink power control set index in the list/vector/sequence of the at least two uplink power control set indexes. The wireless device may send (e.g., transmit) the uplink signal/transmission with/using the transmission power determined based on the identified uplink power control set, for example, based on (e.g., in response to) the uplink power control set index of the uplink power control set occurring first among/in the list/vector/sequence of the at least two uplink power control set indexes. The wireless device may determine, for the uplink signal/transmission, the transmission power based on the uplink power control set, for example, based on (e.g., in response to) the uplink power control set index of the uplink power control set occurring first among/in the list/vector/sequence of the at least two uplink power control set indexes. For example, the first uplink power control set index indicating/identifying the first uplink power control set may occur first in the list/vector/sequence of the at least two uplink power control set indexes. The first uplink power control set index may be a starting/earliest/initial/first uplink power control set index in the list/vector/sequence of the at least two uplink power control set indexes. The uplink power control set may be determined as the first uplink power control set, for example, based on the first uplink power control set index occurring first in the list/set/vector of the at least two uplink power control set indexes. The uplink power control set may be determined as the first uplink power control set, for example, based on the first uplink power control set index being the starting/earliest/initial/first uplink power control set index in the list/vector/sequence of the at least two uplink power control set indexes.

The wireless device may determine, for transmission of the uplink signal/transmission, the transmission power based on the first uplink power control set, for example, based on (e.g., in response to) the first uplink power control set index being the starting/earliest/initial/first uplink power control set index in the list/vector/sequence of the at least two uplink power control set indexes. The wireless device may send (e.g., transmit) the uplink signal/transmission with/using the transmission power determined based on the first uplink power control set, for example, based on (e.g., in response to) the first uplink power control set index being the starting/earliest/initial/first uplink power control set index in the list/vector/sequence of the at least two uplink power control set indexes.

The TCI state (e.g., TCI state 42 in FIG. 17) may be associated with the PCI of the cell. The one or more configuration parameters may not indicate, for the TCI state, an additional PCI index of the at least one additional PCI index. The TCI state may not comprise/have an additional PCI index of the at least one additional PCI index. An additional PCI index may be absent in configuration parameter(s) of the TCI state. The one or more configuration parameters may comprise the configuration parameter(s) of the TCI state. The TCI state may be associated with the PCI of the cell, for example, based on the TCI state not comprising/having an additional PCI index of the at least one additional PCI index. The TCI state may be associated with the PCI of the cell, for example, based on the one or more configuration parameters not indicating, for the TCI state, an additional PCI index of the at least one additional PCI index.

The uplink power control set may be determined as the first uplink power control set, for example, based on the TCI state being associated with the PCI of the cell. The uplink power control set may be determined as the first uplink power control set, for example, based on the first uplink power control set being associated with the PCI of the cell. The uplink power control set may be determined as the first uplink power control set, for example, based on both the TCI state and the first uplink power control set being associated with the PCI of the cell.

The wireless device may determine, for transmission of the uplink signal/transmission, the transmission power based on the first uplink power control set, for example, based on (e.g., in response to) the TCI state being associated with the PCI of the cell. The wireless device may determine, for transmission of the uplink signal/transmission, the transmission power based on the first uplink power control set, for example, based on (e.g., in response to) the first uplink power control set being associated with the PCI of the cell. The wireless device may determine, for transmission of the uplink signal/transmission, the transmission power based on the first uplink power control set, for example, based on (e.g., in response to) both the TCI state and the first uplink power control set being associated with the PCI of the cell.

The wireless device may send (e.g., transmit) the uplink signal/transmission with/using the transmission power determined based on the first uplink power control set, for example, based on (e.g., in response to) the TCI state being associated with the PCI of the cell. The wireless device may send (e.g., transmit) the uplink signal/transmission with/using the transmission power determined based on the first uplink power control set, for example, based on (e.g., in response to) the first uplink power control set being associated with the PCI of the cell. The wireless device may send (e.g., transmit) the uplink signal/transmission with/using the transmission power determined based on the first uplink power control set, for example, based on (e.g., in response to) both the TCI state and the first uplink power control set being associated with the PCI of the cell.

The TCI state may be associated with a second PCI. The second PCI may indicate/identify a second cell. The at least one cell of the one or more cells may comprise the second cell. The at least one PCI in (or indicated by) the list of PCI sets may comprise the second PCI. The TCI state may comprise/have an additional PCI index of the at least one additional PCI index. The one or more configuration parameters may indicate, for the TCI state, the additional PCI index. The additional PCI index may indicate a PCI set of the list of PCI sets. The PCI set may comprise/indicate/have the second PCI. The TCI state may be associated with the second PCI, for example, based on the TCI state comprising/having the additional PCI index indicating the second PCI of the second cell. The TCI state may be associated with the second PCI, for example, based on the one or more configuration parameters indicating, for the TCI state, the additional PCI index that indicates the second PCI. The second PCI may be different from the PCI of the cell.

The uplink power control set may be, for example, the second uplink power control set based on the TCI state being associated with the second PCI different from the PCI of the cell. The uplink power control set may be determined as the second uplink power control set, for example, based on the second uplink power control set being associated with the second PCI different from the PCI of the cell. The uplink power control set may be determined as the second uplink power control set, for example, based on both the TCI state and the second uplink power control set being associated with the same PCI (e.g., the second PCI). The second PCI associated with the second uplink power control set may be same as the second PCI associated with the TCI state. The second cell identified/indicated by the second PCI associated with the second uplink power control set may be same as the second cell identified/indicated by the second PCI associated with the TCI state.

The wireless device may determine, for transmission of the uplink signal/transmission, the transmission power based on the second uplink power control set, for example, based on (e.g., in response to) the TCI state being associated with the second PCI different from the PCI of the cell. The wireless device may determine, for transmission of the uplink signal/transmission, the transmission power based on the second uplink power control set, for example, based on (e.g., in response to) the second uplink power control set being associated with the second PCI different from the PCI of the cell. The wireless device may determine, for transmission of the uplink signal/transmission, the transmission power based on the second uplink power control set, for example, based on (e.g., in response to) both the TCI state and the second uplink power control set being associated with the same PCI (e.g., the second PCI of the second cell).

The wireless device may send (e.g., transmit) the uplink signal/transmission with/using the transmission power determined based on the second uplink power control set, for example, based on (e.g., in response to) the TCI state being associated with the second PCI different from the PCI of the cell. The wireless device may send (e.g., transmit) the uplink signal/transmission with/using the transmission power determined based on the second uplink power control set, for example, based on (e.g., in response to) the second uplink power control set being associated with the second PCI different from the PCI of the cell. The wireless device may send (e.g., transmit) the uplink signal/transmission with/using the transmission power determined based on the second uplink power control set, for example, based on (e.g., in response to) both the TCI state and the second uplink power control set being associated with the same PCI (e.g., the second PCI of the second cell).

The one or more configuration parameters may indicate, for the (active) uplink BWP of the cell, a list of additional PCI indexes. The at least one additional PCI index may comprise each additional PCI index in/of the list of additional PCI indexes. For example, the at least one additional PCI index may comprise the list of additional PCI indexes. The list of additional PCI indexes may comprise one or more additional PCI indexes in/of the at least one additional PCI index. For example, the at least one additional PCI index may be [0, 1, 2, 3, 4] and the list of additional PCI indexes may be [1 0 4 3 3 1 2 0 2].

A size/length of the list of additional PCI indexes may be based on a quantity of uplink power sets in the plurality of uplink power control sets. The size/length of the list of additional PCI indexes may be same as the number/quantity of uplink power sets in the plurality of uplink power control sets. Each additional PCI index in the list of additional PCI indexes may be associated with a respective uplink power control set of the plurality of uplink power control sets. A first additional PCI index in the list of additional PCI indexes may be associated with a first uplink power control set of the plurality of uplink power control sets. The first additional PCI index may be one-to-one associated with (or mapped to) the first uplink power control set. The first additional PCI index may not be associated with (or mapped to) a second uplink power control set of the plurality of uplink power control sets. Association between the list of additional PCI indexes and the plurality of uplink power control sets may be based on positions. For example, the list of additional PCI indexes may be [1 0 4 3 2] and the plurality of uplink power control sets may be [UL power control 1, UL power control 2, UL power control 3, UL power control 4, UL power control 5]. UL power control 1 may be associated with (or mapped to) 1. UL power control 2 may be associated with (or mapped to) 0. UL power control 3 may be associated with (or mapped to) 4. UL power control 4 may be associated with (or mapped to) 3. UL power control 5 may be associated with (or mapped to) 2.

The at least two uplink power control sets may be associated with the list of PCI sets. A number/quantity of uplink power control sets in the at least two uplink power control sets may be based on a number/quantity of PCI sets in the list of PCI sets. For example, the number/quantity of the at least two uplink power control sets may be equal to the quantity/number of PCI sets in the list of PCI set. For example, the number/quantity of the at least two uplink power control sets may be equal to the number/quantity of PCI sets in the list of PCI set plus one.

A starting/earliest/first uplink power control set of the at least two uplink power control sets may be associated with the PCI of the cell (e.g., the serving cell). A second/second starting/second earliest uplink power control set of the at least two uplink power control sets may be associated with a starting/earliest/first PCI set in the list of PCI sets. One or more of the PCI sets in the list of PCI sets may correspond to one or more non-serving cells. A third/third starting/third earliest uplink power control set of the at least two uplink power control sets may be associated with a second/second starting/second earliest PCI set in the list of PCI sets.

For example, the list of PCI sets=[{0, PCI 5}, {1, PCI 2}, {2, PCI 41}, {3, PCI 10}] and the at least two uplink power control sets=[UL power control 1, UL power control 2, UL power control 3, UL power control 4, UL power control 5]. UL power control 1 may be associated with the PCI of the cell. UL power control 2 may be associated with PCI 5 (e.g., indicated by a first PCI set identified by additional PCI index equal to 0). UL power control 3 may be associated with PCI 2 (e.g., indicated by a second PCI set identified by additional PCI index equal to 1). UL power control 4 may be associated with PCI 4 (e.g., indicated by a third PCI set identified by additional PCI index equal to 2). UL power control 5 may be associated with PCI 10 (e.g., indicated by a fourth PCI set identified by additional PCI index equal to 3).

The wireless device may determine the transmission power based on UL power control 1, for example, if the TCI state (e.g., TCI state 42) is associated with the PCI of the cell. The TCI state (e.g., TCI state 42) may be associated with the second PCI. Consistent with the example where the list of PCI sets=[{0, PCI 5}, {1, PCI 2}, {2, PCI 4}, {3, PCI 10}] and the at least two uplink power control sets=[UL power control 1, UL power control 2, UL power control 3, UL power control 4, UL power control 5] described in the above paragraph, the wireless device may determine the transmission power based on UL power control 3, for example, if the second PCI is equal to PCI 2. The wireless device may determine the transmission power based on UL power control 5, for example, if the second PCI is equal to PCI 10.

A starting/earliest/first uplink power control set of the at least two uplink power control sets may be associated with a starting/earliest/first PCI set in the list of PCI sets. A second/second starting/second earliest uplink power control set of the at least two uplink power control sets may be associated with a second/second starting/second earliest PCI set in the list of PCI sets; and so on.

For example, the list of PCI sets=[{0, PCI 5}, {1, PCI 2}, {2, PCI 4}, {3, PCI 10}] and the at least two uplink power control sets=[UL power control 1, UL power control 2, UL power control 3, UL power control 4]. UL power control 1 may be associated with PCI 5 (e.g., indicated by a first PCI set identified by additional PCI index equal to 0). UL power control 2 may be associated with PCI 2 (e.g., indicated by a second PCI set identified by additional PCI index equal to 1). UL power control 3 may be associated with PCI 4 (e.g., indicated by a third PCI set identified by additional PCI index equal to 2). UL power control 4 may be associated with PCI 10 (e.g., indicated by a fourth PCI set identified by additional PCI index equal to 3).

The TCI state (e.g., TCI state 42) may be associated with the second PCI. Consistent with the example where the list of PCI sets=[{0, PCI 5}, {1, PCI 2}, {2, PCI 4}, {3, PCI 10}] and the at least two uplink power control sets=[UL power control 1, UL power control 2, UL power control 3, UL power control 4] in the above paragraph, the wireless device may determine the transmission power based on UL power control 2, for example, if the second PCI is equal to PCI 2. The wireless device may determine the transmission power based on UL power control 4, for example, if the second PCI is equal to PCI 10.

Figure 18:
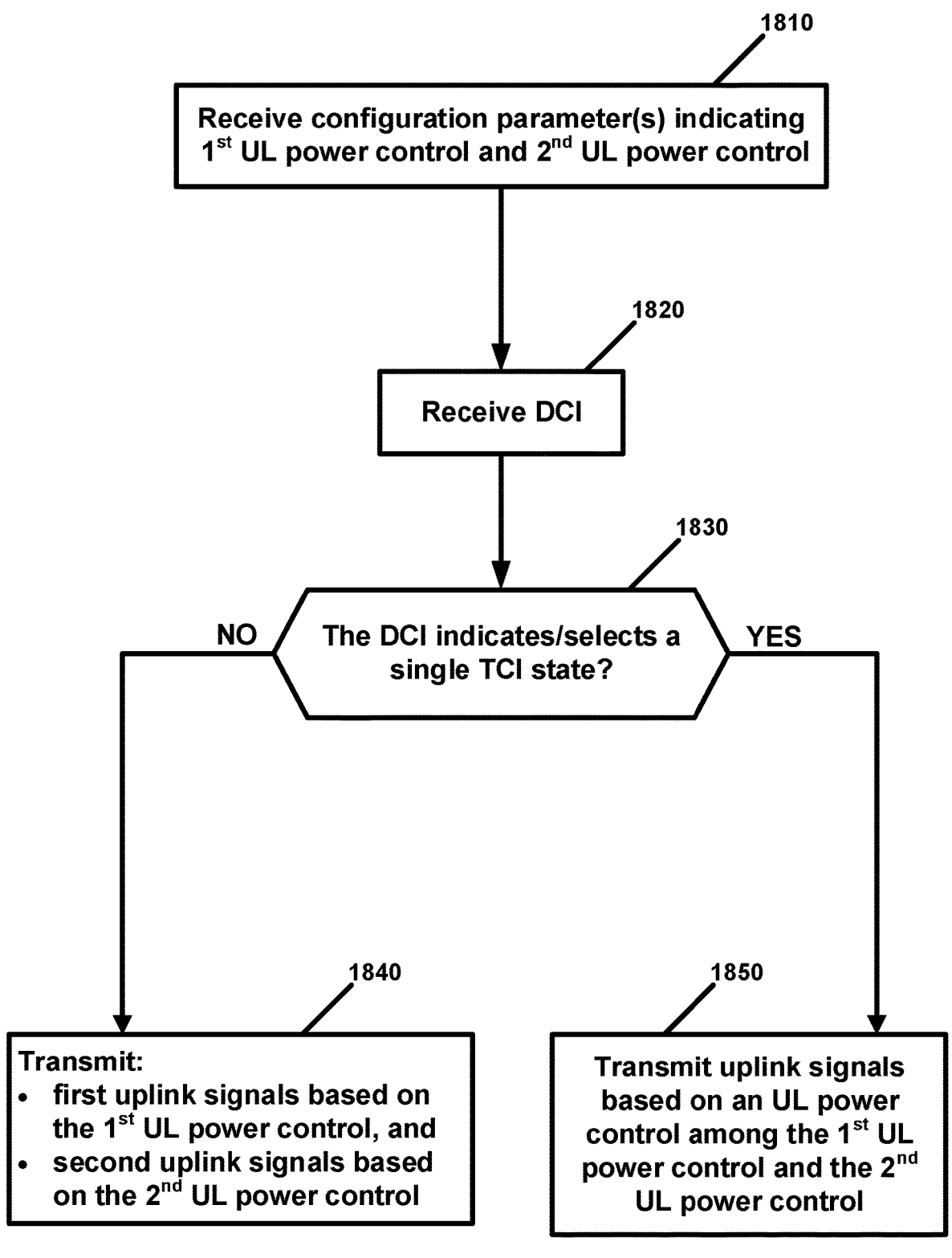
FIG. 18 shows an example method for power control.

FIG. 18 shows an example method for power control. The method for power control may be implemented in connection with FIG. 17. At step 1810, a wireless device may receive one or more messages comprising one or more configuration parameters. A base station may send (e.g., transmit) the one or more messages comprising the one or more configuration parameters. For example, the one or more configuration parameters may be the one or more configuration parameters in FIG. 17.

The one or more configuration parameters may indicate at least two uplink power control sets. For example, the at least two uplink power control sets may be the at least two uplink power control sets in FIG. 17. The at least two uplink power control sets may comprise a first uplink power control set and a second uplink power control set. The one or more configuration parameters may indicate a plurality of TCI states. For example, the plurality of TCI states may be the plurality of TCI states in FIG. 17.

At step 1820, the wireless device may receive a control command (e.g., DCI 1720, MAC-CE). The base station may send (e.g., transmit) the control command. The control command may indicate activation of at least two TCI states. The plurality of TCI states may comprise the at least two TCI states. The at least two TCI states may comprise a first TCI state and a second TCI state.

At step 1830, the wireless device may determine a DCI indicates/selects a single TCI state or at least two TCI states. If the wireless device determines at least two TCI states are indicated/selected, the method may proceed to step 1840. If the wireless device determines that a single TCI state is indicated/selected, the method may proceed to step 1850.

At step 1840, the wireless device may send (e.g., transmit) a first uplink signal/transmission (e.g., PUCCH/PUSCH/SRS transmission). The base station may receive the first uplink signal/transmission. The wireless device may send (e.g., transmit) the first uplink signal/transmission based on the first TCI state (e.g., TCI state 26 in FIG. 17). The base station may receive the first uplink signal/transmission based on the first TCI state. The wireless device may send (e.g., transmit) the first uplink signal/transmission with a first transmission power. The wireless device may determine/calculate/compute, for the first uplink signal/transmission, the first transmission power based on the first uplink power control set. The first TCI state may be associated with (or mapped to) the first uplink power control set. The association (or the mapping) between the first TCI state and the first uplink power control set may be described in connection with FIG. 17.

The wireless device may send (e.g., transmit) a second uplink signal/transmission (e.g., PUCCH/PUSCH/SRS transmission). The base station may receive the second uplink signal/transmission. The wireless device may send (e.g., transmit) the second uplink signal/transmission based on the second TCI state (e.g., TCI state 61 in FIG. 17). The base station may receive the second uplink signal/transmission based on the second TCI state. The wireless device may send (e.g., transmit) the second uplink signal/transmission with a second transmission power. The wireless device may determine/calculate/compute, for the second uplink signal/transmission, the second transmission power based on the second uplink power control set. The second TCI state may be associated with (or mapped to) the second uplink power control set. The association (or the mapping) between the second TCI state and the second uplink power control set may be described in connection with FIG. 17.

At step 1850, the wireless device may send (e.g., transmit) an uplink signal/transmission (e.g., PUCCH/PUSCH/SRS transmission). The base station may receive the uplink signal/transmission. The wireless device may send (e.g., transmit) the uplink signal/transmission based on the TCI state (e.g., the TCI state 42 in FIG. 17). The base station may receive the uplink signal/transmission based on the TCI state. The wireless device may send (e.g., transmit) the uplink signal/transmission with a transmission power. The wireless device may determine/calculate/compute, for the uplink signal/transmission, the transmission power based on an uplink power control set among the first uplink power control set and the second uplink power control set. The wireless device may send (e.g., transmit) the uplink signal/transmission with/using the transmission power determined based on the uplink power control set among the first uplink power control set and the second uplink power control set. The wireless device may select/determine, for determination/calculation/computation of the transmission power of the uplink signal/transmission, the uplink power control set among the first uplink power control set and the second uplink power control set. The wireless device may select/determine the uplink power control set among the first uplink power control set and the second uplink power control set, for example, as described in connection with FIG. 17. The base station may select/determine the uplink power control set among the first uplink power control set and the second uplink power control set, for example, as described in connection with FIG. 17. The TCI state may be associated with (or mapped to) the uplink power control set among the first uplink power control set and the second uplink power control set. The association (or the mapping) between the TCI state and the uplink power control set may be described in connection with FIG. 17.

Figure 19A:
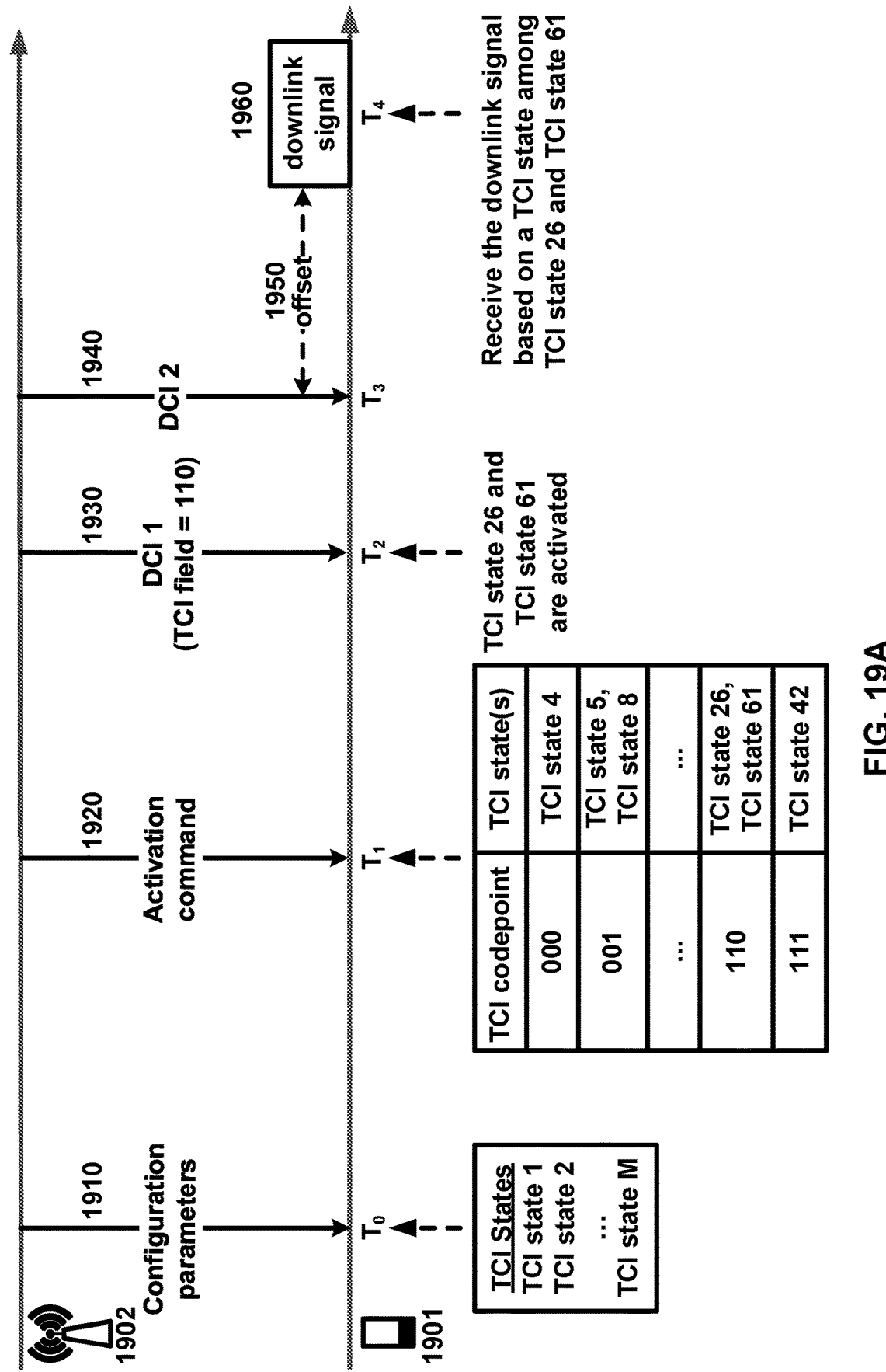
FIG. 19A shows example communications for downlink reception.
Figure 19B:
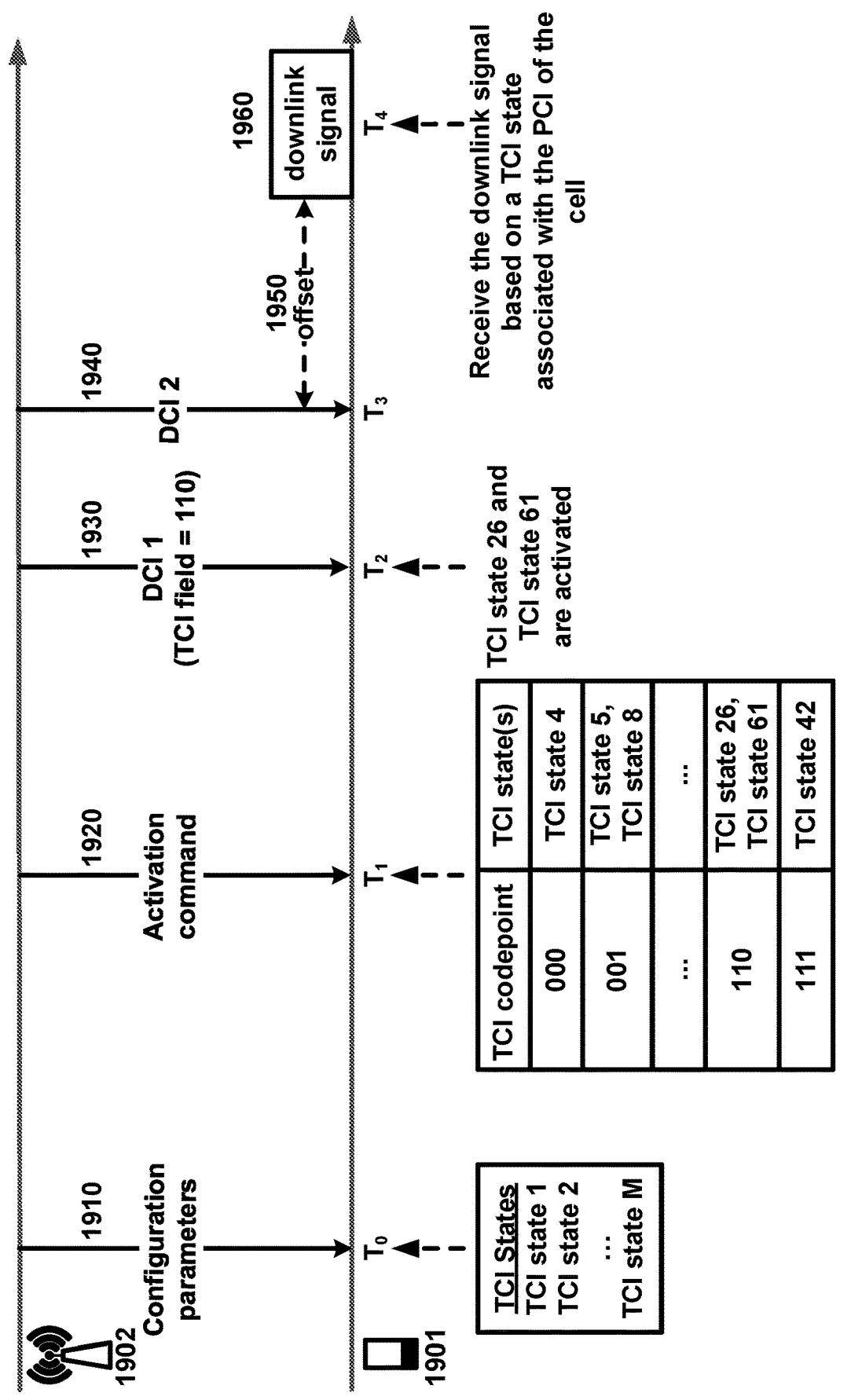
FIG. 19B shows example communications for downlink reception.
Figure 19C:
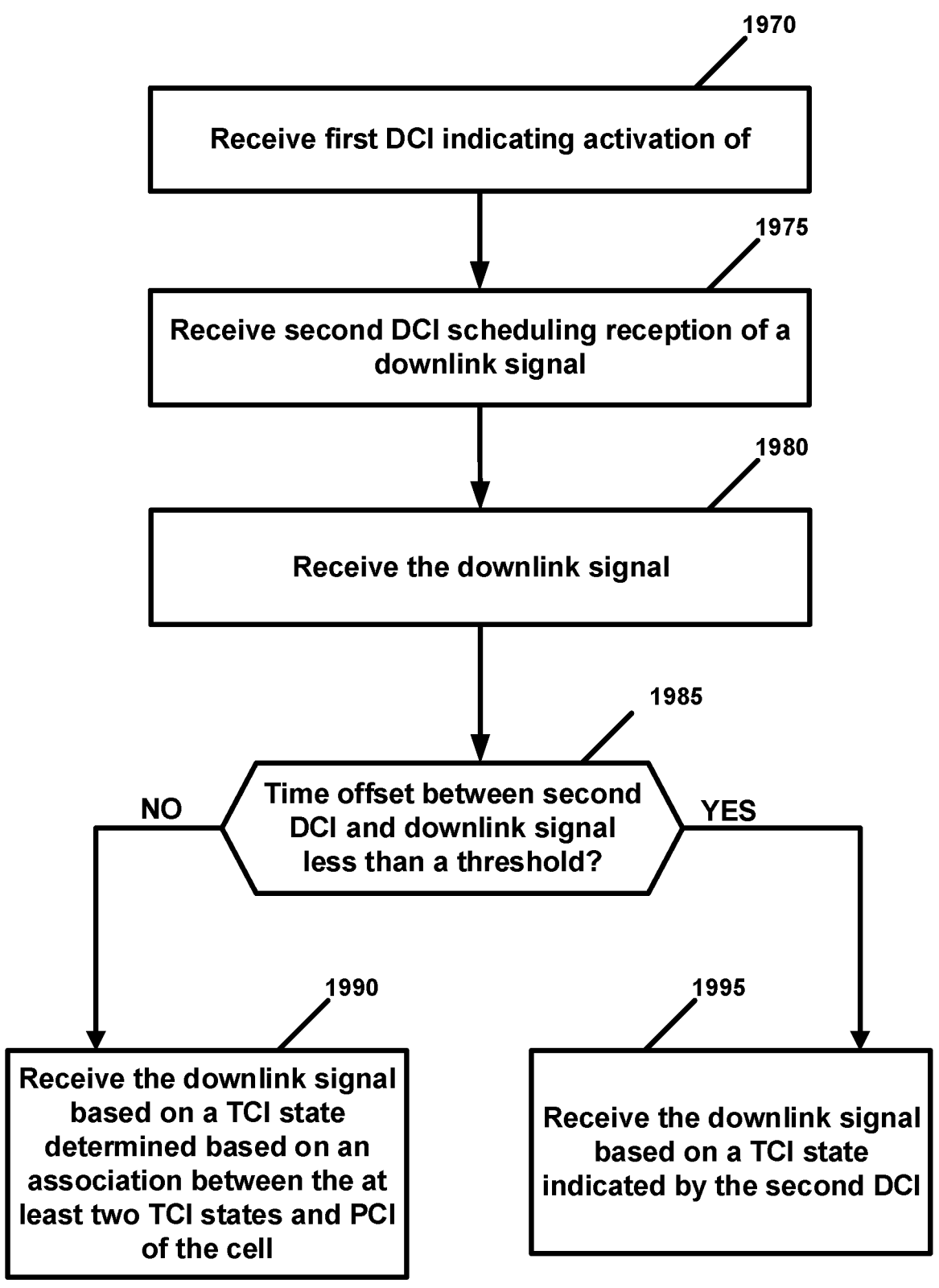
FIG. 19C shows an example method using TCI state selection.

FIG. 19A shows example communications for downlink reception. FIG. 19B shows example communications for downlink reception. FIG. 19C shows an example method using TCI state selection. A wireless device may receive DCI scheduling reception of a downlink signal. The wireless device may not have enough time to obtain information from the DCI, for example, if the time offset between the DCI and the downlink signal is less than a threshold. A default TCI state may be selected, for example, if at least two TCI states are activated. The default TCI state may be selected based on a variety of rules as described herein.

FIGS. 19A, 19B and 19C may be described in connection with FIG. 17. For example, the wireless device 1901 in FIG. 19A and FIG. 19B may be the wireless device 1701 in FIG. 17. The computing device 1902 in FIG. 19A and FIG. 19B may be the computing device 1702 in FIG. 17. The configuration parameters 1910 in FIG. 19A and FIG. 19B may be the configuration parameters 1710 in FIG. 17. The control command 1920 in FIG. 19A and FIG. 19B may be the control command 1720 in FIG. 17. The DCI 1930 in FIG. 19A and FIG. 19B may be the DCI 1730 in FIG. 17. The DCI 1930 may indicate activation of at least two TCI states as described in FIG. 17. Each of time TO, T1, and/or T2 in FIGS. 19A and 19B may be time TO, T1, and/or T2 in FIG. 17 respectively.

At step 1970, the wireless device may receive first DCI (e.g., DCI 1930). The first DCI may indicate activation of at least two TCI states. For example, as shown in FIGS. 19A and 19B, DCI 1930 may indicate activation of a first TCI state (e.g., TCI state 26) and a second TCI state (e.g., TCI state 61).

At step 1975, the wireless device may receive/detect DCI 1940. The DCI 1940 may be received at time T3. The wireless device may receive/detect DCI 1940 via a CORE-SET of the plurality of CORESETS. The wireless device may receive (e.g., via the CORESET) the DCI 1940 in a PDCCH monitoring occasion. The base station 1902 may send (e.g., transmit) the DCI 1940 via the CORESET.

The DCI 1940 may schedule transmission/reception of a downlink signal 1960. The DCI 1940 may schedule transmission/reception of the downlink signal 1960 for/via the cell. The DCI 1940 may schedule reception of the downlink signal 1960 for/via the active downlink BWP of the cell.

The downlink signal may be, for example, a PDSCH transmission/reception. The PDSCH transmission/reception may comprise/indicate/carry a transport block. The downlink signal may be, for example, an aperiodic CSI-RS. The downlink signal may be, for example, a semi-persistent CSI-RS.

At step 1980, the wireless device may receive the downlink signal (e.g., downlink signal 1960). The downlink signal may be received at time T4. A time offset (e.g., offset 1950 in FIGS. 19A and 19B) may occur between the DCI 1940 and the downlink signal 1960.

The time offset 1950 may comprise, for example, a time offset between a last/latest/ending symbol of the DCI and a first/earliest/starting symbol of the downlink signal. The time offset 1950 may comprise, for example, a time offset between a last/latest/ending symbol of the DCI and a first/earliest/starting symbol of a resource (e.g., a time/frequency resource or a PDSCH resource or a CSI-RS resource) of (or to receive) the downlink signal. The time offset 1950 may comprise, for example, a time offset between reception of the DCI and a first/earliest/starting symbol of the downlink signal.

The time offset 1950 may comprise, for example, a time offset between a last/latest/ending symbol of the PDCCH monitoring occasion that the DCI is received and a first/earliest/starting symbol of the downlink signal. The time offset 1950 may comprise, for example, a time offset between a last/latest/ending symbol of the PDCCH monitoring occasion that the DCI is received and a first/earliest/starting symbol of a resource (e.g., a time/frequency resource or a PDSCH resource) of (or to receive) the downlink signal.

The time offset 1950 may comprise, for example, a time offset between a last/latest/ending symbol of the CORESET that the DCI is received and a first/earliest/starting symbol of the downlink signal. The time offset 1950 may comprise, for example, a time offset between a last/latest/ending symbol of the CORESET that the DCI is received and a first/earliest/starting symbol of a resource (e.g., a time/frequency resource or a PDSCH resource or a CSI-RS resource) of (or to receive) the downlink signal.

The DCI may indicate the resource to receive the downlink signal. The one or more configuration parameters may indicate the resource to receive the downlink signal.

The time offset 1950 may comprise, for example, a time offset between the DCI and a first/earliest/starting transmission occasion (or repetition) of the downlink signal. The base station may send (e.g., transmit) (or repeat transmission of) the downlink signal in a plurality of transmission occasions (e.g., PDSCH transmission occasions). The plurality of transmission occasions may comprise the first/earliest/starting transmission occasion. The first/earliest/starting transmission occasion may be a first/earliest/starting transmission occasion, among the plurality of transmission occasions, occurring in time. A starting time/symbol of the first/earliest/starting transmission occasion may be the first/earliest among starting times/symbols of the plurality of transmission occasions.

At step 1985, the wireless device may determine whether the time offset 1950 is less/lower than a threshold (e.g., timeDurationForQCL, beamSwitchTiming). If the wireless device determines that the time offset is more/higher than the threshold, the method may proceed to step 1990. At step 1990, the wireless device may receive the downlink signal based on a TCI state of the at least two TCI states. The TCI state may be indicated by the DCI 1940. If the wireless device determines that the time offset is less/lower than the threshold, the method may proceed to step 1995.

Referring back to step 1985, the threshold may be determined in a variety of ways, as described herein. For example, the base station may need (additional) one or more radio access capability information of the wireless device (e.g., UE radio access capability information). The base station may initiate a procedure to request the one or more UE radio access capability information (e.g., by an information element UECapabilityEnquiry) from the wireless device. The wireless device may use an information element (e.g., UECapabilityInformation message) to send (e.g., transfer) one or more UE radio access capability information requested by the base station. The wireless device may provide/indicate the threshold (e.g., timeDurationForQCL, beamSwitchTiming) in FeatureSetDownlink indicating a set of features that the wireless device supports. The wireless device may send (e.g., transmit) a capability information (e.g., UE capability information) indicating the threshold.

The one or more configuration parameters may not comprise a higher layer parameter trs-info for a CSI-RS resource set (e.g., NZP-CSI-RS-ResourceSet) comprising the downlink signal (e.g., aperiodic CSI-RS or aperiodic CSI-RS resource).

For example, a value of the threshold reported by the wireless device (in UE capability information) may be at least one of: {14, 28, 48}. The one or more configuration parameters may not comprise a beam switch timing enabler (e.g., enableBeamSwitchTiming). The threshold may be equal to the value of the threshold reported by the wireless device, for example, if the value of the threshold reported by the wireless device is at least one of: {14, 28, 48}. The threshold may be equal to the value of the threshold reported by the wireless device, for example, if the one or more configuration parameters do not comprise the beam switch timing enabler.

A value of the threshold reported by the wireless device may be at least one of: {224, 336}. The threshold may be equal to 48 symbols if the value of the threshold reported by the wireless device is at least one of: {224, 336}.

The threshold (e.g., timeDurationForQCL) may comprise/indicate a minimum number/quantity of OFDM symbols for the wireless device to perform a PDCCH reception with a first DCI. The threshold may comprise/indicate a minimum number/quantity of OFDM symbols for the wireless device to apply spatial QCL information (e.g., TCI-State) received in (or indicated by) the first DCI for a processing of a first downlink signal scheduled by the first DCI. The wireless device may need the minimum number/quantity of OFDM symbols between the PDCCH reception and the processing of the first downlink signal to apply the spatial QCL information. The spatial QCL information may be indicated by the first DCI to the first downlink signal. The threshold (e.g., beamSwitchTiming) may comprise/indicate a minimum number/quantity of OFDM symbols between the first DCI triggering of the first downlink signal (e.g., aperiodic CSI-RS) and transmission of the first downlink signal. The number/quantity of OFDM symbols may be measured from the last symbol of (or containing) the first DCI to the first/starting symbol of the first downlink signal.

The wireless device may monitor downlink control channels in the CORESET based on a third TCI state (e.g., a default TCI state). The base station may send (e.g., transmit)

DCIs (or PDCCH transmissions) in/via the CORESET based on the third TCI state. The at least two TCI states may comprise the third TCI state. The third TCI state may be one of the first TCI state or the second TCI state.

The subset of TCI states (e.g., activated by the activation command 1920) may comprise the third TCI state. The plurality of TCI states (e.g., configured by the configuration parameters 1910) may comprise the third TCI state. The wireless device may receive an activation command 1920 indicating activation of the third TCI state for the CORE-SET. The activation command may be, for example, different from the DCI 1930 (e.g., e.g., received at time T2). The activation command 1920 may be, for example, same as the DCI 1930 (e.g., received at time T2). The base station may send (e.g., transmit) the activation command 1920 indicating activation of the third TCI state for the CORESET.

The third TCI state of the CORESET may be associated with the PCI of the cell. The one or more configuration parameters may not indicate, for the third TCI state, an additional PCI index of the at least one additional PCI index. The third TCI state may not comprise/have an additional PCI index of the at least one additional PCI index. An additional PCI index may be absent in configuration parameter(s) of the third TCI state. The one or more configuration parameters may comprise the configuration parameter(s) of the third TCI state. The third TCI state may be associated with the PCI of the cell, for example, based on the third TCI state not comprising/having an additional PCI index of the at least one additional PCI index. The third TCI state may be associated with the PCI of the cell, for example, based on the one or more configuration parameters not indicating, for the third TCI state, an additional PCI index of the at least one additional PCI index.

The CORESET may be associated with the PCI of the cell, for example, based on (e.g., in response to) monitoring the downlink control channels in the CORESET based on the third TCI state associated with the PCI of the cell. The CORESET may be associated with the PCI of the cell, for example, based on (e.g., in response to) receiving the activation command indicating activation of the third TCI state for the CORESET. The third TCI state may be associated with the PCI of the cell.

The downlink signal may be associated with the PCI of the cell, for example, based on receiving, via the CORESET associated with the PCI of the cell, the DCI scheduling transmission/reception of the downlink signal. The downlink signal may be associated with the PCI of the cell, for example, based on receiving, via the CORESET with the third TCI state that is associated with the PCI of the cell, the DCI scheduling transmission/reception of the downlink signal.

The third TCI state of the CORESET may be associated with a second PCI. The second PCI may be different from the PCI of the cell. The second PCI may indicate/identify a second cell. The at least one cell of the one or more cells may comprise the second cell. The at least one PCI in (or indicated by) the list of PCI sets may comprise the second PCI. The third TCI state may comprise/have an additional PCI index of the at least one additional PCI index. The one or more configuration parameters may indicate, for the third TCI state, the additional PCI index. The additional PCI index may indicate a PCI set of the list of PCI sets. The PCI set may comprise/indicate/have the second PCI. The third TCI state may be associated with the second PCI, for example, based on the third TCI state comprising/having the additional PCI index indicating the second PCI. The third TCI state may be associated with the second PCI, for example, based on the one or more configuration parameters indicating, for the third TCI state, the additional PCI index that indicates the second PCI. The third TCI state may be associated with the second PCI, for example, based on the one or more configuration parameters indicating, for the third TCI state, the additional PCI index indicating the PCI set that indicates/comprises the second PCI.

The CORESET may be associated with the second PCI, for example, based on (e.g., in response to) monitoring the downlink control channels in the CORESET based on the third TCI state associated with the second PCI. The CORESET may be associated with the second PCI, for example, based on (e.g., after or in response to) receiving the activation command indicating activation of the third TCI state, for the CORESET, associated with the second PCI.

The downlink signal may be associated with the second PCI that is different from the PCI of the cell, for example, based on receiving, via the CORESET associated with the second PCI, the DCI scheduling transmission/reception of the downlink signal. The downlink signal may be associated with the second PCI, for example, based on receiving, via the CORESET with the third TCI state that is associated with the second PCI, the DCI scheduling transmission/reception of the downlink signal.

The one or more configuration parameters may indicate, for the CORESET, one or more search space sets. The wireless device may receive the DCI 1940 (e.g., at time T3 in FIG. 19A) via a search space set of the one or more search space sets. The base station may send (e.g., transmit) the DCI 1940 (e.g., at time T3 in FIG. 19A) via the search space set. The wireless device may monitor, for a PDCCH candidate, downlink control channels in the PDCCH monitoring occasion associated with the search space set. The search space set may be mapped to (or be associated with) the CORESET. The PDCCH candidate may be associated with the search space set. The wireless device may receive the DCI 1940 in the PDCCH monitoring occasion associated with the search space set. The search space set may be, for example, a common search space set.

At step 1995, the wireless device may receive the downlink signal based on a TCI state among the at least two TCI states (e.g., at time T4 in FIG. 19). The base station may send (e.g., transmit) the downlink signal based on the TCI state among the at least two TCI states. The TCI state may be a default TCI state (or a default antenna port quasi co-location property/assumption). The default TCI state may be determined in a variety of ways as described herein. For example, the default TCI state may be determined based on PCI associated with the at least two TCI states. The wireless device may determine the default TCI state as the first TCI state, for example, based on the first TCI state is associated with the PCI of the cell. The wireless device may determine the default TCI state as the first TCI state, for example, based on the second TCI state, of the at least two TCI states, is associated with a PCI different from the cell.

The wireless device may receive the downlink signal based on the default TCI state among the at least two TCI states, for example, based on (e.g., in response to) the time offset being less/lower than the threshold. The base station may send (e.g., transmit) the downlink signal based on the default TCI state among the at least two TCI states, for example, if the time offset being less/lower than the threshold.

The wireless device may receive the downlink signal based on the default TCI state among the at least two TCI states, for example, based on (e.g., in response to) the search space set being a common search space set (e.g., Type0-

PDCCH CSS set, Type0A-PDCCH CSS set, Type1-PDCCH CSS set, Type2-PDCCH CSS set, Type 3-PDCCH CSS set, and the like). The base station may send (e.g., transmit) the downlink signal based on the TCI state among the at least two TCI states, for example, based on (e.g., in response to) the search space set being a common search space set.

The wireless device may receive the downlink signal based on the default TCI state among the at least two TCI states, for example, based on (e.g., in response to) the DCI being a fallback DCI (e.g., DCI format 1_0). The base station may send (e.g., transmit) the downlink signal based on the TCI state (e.g., a default TCI state) among the at least two TCI states, for example, based on (e.g., in response to) the DCI being a fallback DCI (e.g., DCI format 1_0).

The wireless device may receive the downlink signal based on the TCI state among the at least two TCI states, for example, based on (e.g., in response to) the DCI being a DCI format 1_0. The base station may send (e.g., transmit) the downlink signal based on the TCI state among the at least two TCI states, for example, based on (e.g., in response to) the DCI being a DCI format 1_0.

The one or more configuration parameters may comprise an enabling parameter (e.g., enableDefaultTCI-StatePerPCI, enableDefaultTCI-StatePerCell, enableDefaultTCI-StatePerTRP and the like). The enabling parameter may indicate that the wireless device applies/uses, for reception of downlink signals, a default TCI state per PCI. The wireless device may receive the downlink signal based on the TCI state among the at least two TCI states, for example, based on (e.g., in response to) the one or more configuration parameters comprising the enabling parameter (or set to enabled). The base station may send (e.g., transmit) the downlink signal based on the TCI state among the at least two TCI states, for example, based on (e.g., in response to) the one or more configuration parameters comprising the enabling parameter (or set to enabled).

The wireless device may select/determine, for reception of the downlink signal, the TCI state among the at least two TCI states. The base station may select/determine, for transmission of the downlink signal, the TCI state among the at least two TCI states.

The TCI state may indicate a reference signal (e.g., CSI-RS, SS/PBCH block, DM-RS, TRS, etc.). The one or more configuration parameters may indicate, the reference signal for the TCI state. The TCI state may comprise a reference signal index (e.g., provided by a higher layer parameter referenceSignal, ssb-index, csi-RS-Index, NZP-CSI-RS-ResourceId) identifying (or indicating or of) the reference signal. The one or more configuration parameters may indicate the reference signal index for the reference signal.

The TCI state may indicate a quasi co-location type (e.g., QCL TypeA, QCL TypeB, QCL TypeC, QCL TypeD, etc.). The one or more configuration parameters may indicate the quasi co-location type for the TCI state.

The receiving the downlink signal based on the TCI state (or the antenna port quasi co-location property/assumption) may comprise at least one DM-RS antenna port of the downlink signal being quasi co-located (QCL-ed) with the reference signal indicated by (or in) the TCI state. The at least one DM-RS antenna port of the downlink signal may be quasi co-located (QCL-ed) with the reference signal with respect to at least one of: Doppler shift, Doppler spread, average delay, delay spread, and/or spatial RX parameters. The at least one DM-RS antenna port of the downlink signal may be quasi co-located (QCL-ed) with the reference signal with respect to at least one of: Doppler shift, Doppler spread, average delay, delay spread, and/or spatial RX parameters, if applicable. The at least one DM-RS antenna port of the downlink signal may be quasi co-located (QCL-ed) with the reference signal with respect to Doppler shift, Doppler spread, average delay, delay spread, and/or spatial RX parameters, if applicable. The at least one DM-RS antenna port of the downlink signal may be QCL-ed with the reference signal with respect to the quasi co-location type indicated by (or in) the TCI state.

The receiving the downlink signal based on the TCI state may comprise applying the TCI state (or the antenna port quasi co-location property/assumption) for a reception (or to receive) the downlink signal. The wireless device may measure the downlink signal (e.g., aperiodic CSI-RS) based on the TCI state. The wireless device may measure/determine a radio link quality (e.g., L1-RSRP, L-RSRP, SINR, SNR, BLER) of the downlink signal based on the TCI state. The wireless device may measure a radio link quality (e.g., L1-RSRP, L-RSRP, SINR, SNR, BLER) of the reference signal to determine the radio link quality of the downlink signal. The wireless device may send (e.g., transmit) an uplink report indicating the radio link quality of the downlink signal. The uplink report may be, for example, a CSI report. The uplink report may be, for example, an aperiodic CSI report.

The wireless device may receive/measure the downlink signal with/using a spatial domain receiving/reception filter/beam. The wireless device may determine the spatial domain receiving/reception filter/beam determined based on the reference signal indicated by the TCI state.

The spatial domain receiving/reception filter/beam may be, for example, same as (or substantially same as, x degrees apart, x=0, 1, 5, 10, and the like) a spatial domain reception/receiving filter/beam used to receive the reference signal. The spatial domain receiving/reception filter/beam may be, for example, same as (or substantially same as, x degrees apart, x=0, 1, 5, 10, and the like) a spatial domain transmission/transmitting filter/beam used to send (e.g., transmit) the reference signal.

The base station may send (e.g., transmit) the downlink signal with/using a spatial domain transmitting/transmission filter/beam. The base station may determine the spatial domain transmitting/transmission filter/beam determined based on the reference signal indicated by the TCI state.

The TCI state may be identified/indicated by a TCI state index that is lowest among at least two TCI state indexes of the at least two TCI states. The at least two TCI states may comprise the TCI state. The at least two TCI state indexes may comprise the TCI state index. The one or more configuration parameters may indicate, for the TCI state, the TCI state index. The one or more configuration parameters may indicate, for the at least two TCI states, the at least two TCI state indexes. The one or more configuration parameters may indicate, for each TCI state of the at least two TCI states, a respective TCI state index of the at least two TCI state indexes. The wireless device may receive the downlink signal based on the TCI state, for example, based on (e.g., in response to) the TCI state index of the TCI state being lowest among the at least two TCI state indexes of the at least two TCI states. The base station may send (e.g., transmit) the downlink signal based on the TCI state, for example, based on (e.g., in response to) the TCI state index of the TCI state being lowest among the at least two TCI state indexes of the at least two TCI states.

The at least two TCI state indexes may comprise the first TCI state index of the first TCI state and the second TCI state index of the second TCI state.

The TCI state may be a TCI state, among the first TCI state and the second TCI state, with a lowest index among the first TCI state index of the first TCI state and the second TCI state index of the second TCI state. The one or more configuration parameters may indicate, for the TCI state among the first TCI state and the second TCI state, a TCI state index that is lowest among the first TCI state index and the second TCI state index.

For example, the first TCI state index of the first TCI state may be lower/less than the second TCI state index of the second TCI state. The TCI state may be the first TCI state, for example, based on the first TCI state index of the first TCI state being lower/less than the second TCI state index of the second TCI state. The wireless device may receive the downlink signal, for example, based on the first TCI state. The wireless device may receive the downlink signal based on the first TCI state, for example, based on (e.g., in response to) the first TCI state index of the first TCI state being lower/less than the second TCI state index of the second TCI state. The base station may send (e.g., transmit) the downlink signal based on the first TCI state, for example, based on (e.g., in response to) the first TCI state index of the first TCI state being lower/less than the second TCI state index of the second TCI state.

The first field of the control command indicating activation of the subset of TCI states may comprise the first TCI state index indicating/identifying the first TCI state. The first field may occur/be (or be located) in the first octet of the control command. The second field of the control command may comprise the second TCI state index indicating/identifying the second TCI state. The second field may occur/be (or be located) in the second octet of the control command.

The TCI state may be a TCI state, among the first TCI state and the second TCI state, associated with a lowest octet among the first octet associated with (or indicating) the first TCI state and the second octet associated with (or indicating) the second TCI state. The octet associated with (or indicating) the TCI state may be the lowest octet among the first octet associated with (or indicating) the first TCI state and the second octet associated with (or indicating) the second TCI state.

For example, the first octet associated with (or indicating) the first TCI state may be lower/less than the second octet associated with (or indicating) the second TCI state. The TCI state may be determined as the first TCI state, for example, based on the first octet associated with (or indicating) the first TCI state being lower/less than the second octet associated with (or indicating) the second TCI state. The wireless device may receive the downlink signal based on the first TCI state, for example, based on (e.g., in response to) the first octet associated with (or indicating) the first TCI state being lower/less than the second octet associated with (or indicating) the second TCI state. The base station may send (e.g., transmit) the downlink signal based on the first TCI state, for example, based on (e.g., in response to) the first octet associated with (or indicating) the first TCI state being lower/less than the second octet associated with (or indicating) the second TCI state.

The TCI state may be a TCI state, among the first TCI state and the second TCI state, that occurs first in the list/set/vector of the at least two TCI states (or in the TCI codepoint indicated by the DCI). The TCI state may be a starting/earliest/initial/first TCI state, among the first TCI state and the second TCI state, in the list/set/vector of the at least two TCI states (or in the TCI codepoint indicated by the DCI). For example, as shown in FIG. 19A, the starting/earliest/initial/first TCI state is the TCI state 26, if the list/set/vector of the at least two TCI states is equal to [TCI state 26, TCI state 61]. For example, the starting/earliest/initial/first TCI state is the TCI state 61, if the list/set/vector of the at least two TCI states is equal to [TCI state 61, TCI state 26].

For example, the at least two TCI states may be equal to [TCI state 26, TCI state 61]. The first TCI state (e.g., TCI state 26) may occur first in the list/set/vector of the at least two TCI states. The first TCI state may be a first/starting/earliest/initial TCI state in the list/set/vector of the at least two TCI states. The TCI state may be the first TCI state, for example, based on the first TCI state occurring first in the list/set/vector of the at least two TCI states. The TCI state may be determined as the first TCI state, for example, based on the first TCI state being the first/starting/earliest/initial TCI state in the list/set/vector of the at least two TCI states. The wireless device may receive the downlink signal based on the first TCI state, for example, based on (e.g., in response to) the first TCI state occurring first in the list/set/vector of the at least two TCI states. The wireless device may receive the downlink signal based on the first TCI state, for example, based on (e.g., in response to) the first TCI state being the first/starting/earliest/initial TCI state in the list/set/vector of the at least two TCI states. The base station may send (e.g., transmit) the downlink signal based on the first TCI state, for example, based on (e.g., in response to) the first TCI state being the first/starting/earliest/initial TCI state in the list/set/vector of the at least two TCI states.

For example, the at least two TCI states may be equal to [TCI state 61, TCI 26]. The second TCI state (e.g., TCI state 61) may occur first in the list/set/vector of the at least two TCI states. The second TCI state may be a first/starting/earliest/initial TCI state in the list/set/vector of the at least two TCI states. The TCI state may be the second TCI state, for example, based on the second TCI state occurring first in the list/set/vector of the at least two TCI states. The TCI state may be determined as the second TCI state, for example, based on the second TCI state being the first/starting/earliest/initial TCI state in the list/set/vector of the at least two TCI states. The wireless device may receive the downlink signal based on the second TCI state, for example, based on (e.g., in response to) the second TCI state occurring first in the list/set/vector of the at least two TCI states. The wireless device may receive the downlink signal based on the second TCI state, for example, based on (e.g., in response to) the second TCI state being the first/starting/earliest/initial TCI state in the list/set/vector of the at least two TCI states. The base station may send (e.g., transmit) the downlink signal based on the second TCI state, for example, based on (e.g., in response to) the second TCI state being the first/starting/earliest/initial TCI state in the list/set/vector of the at least two TCI states.

The CORESET may be associated with the PCI of the cell. The first TCI state may be associated with the PCI of the cell. The second TCI state may be associated with the second PCI different from the PCI of the cell. The wireless device may receive the downlink signal based on the first TCI state, for example, based on (e.g., in response to) the CORESET, that the wireless device receives the DCI scheduling reception of the downlink signal, being associated with the PCI of the cell. The wireless device may receive the downlink signal based on the first TCI state associated with the PCI of the cell, for example, based on (e.g., in response to) the CORESET, that the wireless device receives the DCI scheduling reception of the downlink signal, being associated with the PCI of the cell. The base station may send (e.g., transmit) the downlink signal based on the first TCI state associated with the PCI of the cell, for example, based on (e.g., in response to) the CORESET, that the wireless device receives the DCI scheduling reception of the downlink signal, being associated with the PCI of the cell. The wireless device may receive the downlink signal based on the first TCI state, for example, based on (e.g., in response to) the first TCI state being associated with the PCI of the cell. The wireless device may receive the downlink signal based on the first TCI state, for example, based on (e.g., in response to) the first TCI state and the CORESET being associated with the same PCI (e.g., the PCI of the cell). The wireless device may not receive the downlink signal based on the second TCI state, for example, based on (e.g., in response to) the second TCI state being associated with the second PCI different from the PCI of the cell. The wireless device may not receive the downlink signal based on the second TCI state, for example, based on (e.g., in response to) the second TCI state and the CORESET being associated with different PCIs.

The CORESET may be associated with the second PCI different from the PCI of the cell. The first TCI state may be associated with the PCI of the cell. The second TCI state may be associated with the second PCI different from the PCI of the cell. The wireless device may receive the downlink signal based on the second TCI state, for example, based on (e.g., in response to) the CORESET, that the wireless device receives the DCI scheduling reception of the downlink signal, being associated with the second PCI. The wireless device may receive the downlink signal based on the second TCI state associated with the second PCI, for example, based on (e.g., in response to) the CORESET, that the wireless device receives the DCI scheduling reception of the downlink signal, being associated with the second PCI. The base station may send (e.g., transmit) the downlink signal based on the second TCI state associated with the second PCI, for example, based on (e.g., in response to) the CORESET, that the wireless device receives the DCI scheduling reception of the downlink signal, being associated with the second PCI. The wireless device may receive the downlink signal based on the second TCI state, for example, based on (e.g., in response to) the second TCI state being associated with the second PCI. The wireless device may receive the downlink signal based on the second TCI state, for example, based on (e.g., in response to) the second TCI state and the CORESET being associated with the same PCI (e.g., the second PCI).

The wireless device may not receive the downlink signal based on the first TCI state, for example, based on (e.g., in response to) the first TCI state being associated with the PCI of the cell. The wireless device may not receive the downlink signal based on the first TCI state, for example, based on (e.g., in response to) the first TCI state and the CORESET being associated with different PCIs.

The DCI 1940 (e.g., received at time T3 in FIG. 19A) may comprise a field (e.g., TCI field, RV field, HARQ process field, TDRA field, FDRA field, and the like). A value of the field may indicate the TCI state. The The TCI state may be the first TCI state, for example, if the field is equal/set to a first value (e.g., 0, or 000). The wireless device may receive the downlink signal based on the first TCI state, for example, based on (e.g., in response to) the field of the DCI being equal/set to the first value. The wireless device may buffer the downlink signal based on each of the at least two TCI states. The wireless device may receive (e.g., decode) a copy of the downlink signal that is buffered based on the first TCI state. The wireless device may discard one or more copies of the downlink signal buffered based on the other TCI states of the at least two TCI states.

The TCI state may be the second TCI state, for example, if the field is equal/set to a second value (e.g., 1, 001, or 111). The wireless device may receive the downlink signal based on the second TCI state, for example, based on (e.g., in response to) the field of the DCI being equal/set to the second value. The wireless device may buffer the downlink signal based on each of the at least two TCI states. The wireless device may receive (e.g., decode) a copy of the downlink signal that is buffered based on the second TCI state. The wireless device may discard one or more copies of the downlink signal buffered based on the other TCI states of the at least two TCI states.

A wireless device may perform a method comprising multiple operations. The wireless device may receive one or more configuration parameters indicating a plurality of uplink power control sets for a cell and at least two uplink power control sets of the plurality of uplink power control sets for an uplink bandwidth part (BWP) of the cell. The wireless device may receive downlink control information (DCI) indicating activation of a transmission configuration indicator (TCI) state. The wireless device may, based on the one or more configuration parameters not indicating an uplink power control set index for the TCI state, transmit an uplink signal via the uplink BWP of the cell and using a transmission power determined based on a first uplink power control set of the at least two uplink power control sets. The wireless device may further receive second DCI scheduling transmission of a downlink signal for the cell. A time offset between the second DCI and the downlink signal may be less than a threshold. The wireless device may receive the downlink signal using the TCI state based on the time offset being less than the threshold; and the TCI state being associated with a physical cell identifier (PCI) of the cell. The wireless device may further monitor a control resource set (CORESET) based on a second TCI state and receive second DCI scheduling transmission of a downlink signal for the cell. A time offset between the second DCI and the downlink signal may be less than a threshold. The wireless device may receive the downlink signal using the second TCI state based on: the time offset being less than the threshold; and the TCI state being associated with a physical cell identifier (PCI) different from a PCI of the cell. The wireless device may further determine the first uplink power control set for transmitting the uplink signal based on: the first uplink power control set being associated with a physical cell identifier (PCI); and the PCI being associated with the TCI state. The wireless device may further determine the first uplink power control set for transmitting the uplink signal based on the first uplink power control set being associated with a control resource set (CORESET); and the TCI state being associated with the CORESET. The wireless device may further receive second DCI indicating activation of a second TCI state, and may transmit, based on the one or more configuration parameters not indicating an uplink power control set for the second TCI state, a second uplink signal using a second transmission power determined based on a second uplink power control set of the at least two uplink power control sets. The wireless device may further receive second DCI indicating activation of a second TCI state, and may transmit, based on the one or more configuration parameters indicating a second uplink power control set for the second TCI state, a second uplink signal using a second transmission power determined based on the second uplink power control set. The wireless device may comprise one or more processors and memory, storing instructions, that when executed by the one or more processors perform the method described herein. A system may comprise the wireless device configured to perform the described method, additional operations, and/or include the additional elements; and a base station configured to transmit the one or more messages. A computer-readable medium may store instructions that, when executed, cause performance of the described method, additional operations, and/or include additional elements. A base station may perform a corresponding method comprising multiple operations. The base station may perform a corresponding method, for example, by transmitting the one or more messages.

A wireless device may perform a method comprising multiple operations. A wireless device may receive, a control command indicating a transmission configuration indicator (TCI) state for a cell, and may receive DCI scheduling transmission of a downlink signal for the cell. A time offset between the DCI and the downlink signal is less than a threshold. The wireless device may receive the downlink signal using the TCI state based on: the time offset being less than the threshold; and the TCI state being associated with a physical cell identifier (PCI) of the cell. The downlink signal may be a physical downlink shared channel (PDSCH) reception; or an aperiodic channel state information-reference signal (CSI-RS). The wireless device may further monitor a control resource set (CORESET) based on the TCI state, and may receive third DCI indicating activation of a second TCI state for the cell. The receiving the downlink signal using the TCI state may be further based on the second TCI state being associated with a second PCI different from the PCI of the cell. The wireless device may further receive one or more configuration parameters indicating: a plurality of uplink power control sets for a cell; and at least two uplink power control sets of the plurality of uplink power control sets for an uplink bandwidth part (BWP) of the cell. The wireless device may receive third DCI indicating a second TCI state; and based on the one or more configuration parameters not indicating an uplink power control set index for the second TCI state, transmitting an uplink signal via the uplink BWP of the cell and using a transmission power determined based on a first uplink power control set of the at least two uplink power control sets. The threshold is indicated by capability information of the wireless device. The receiving the downlink signal using the TCI state may be further based on the second DCI being received via a common search space set. At least two TCI states may be activated while the downlink signal is received. The second DCI may indicate a second TCI state of the at least two activated TCI states. The receiving the downlink signal using the TCI state may comprise receiving the downlink signal using the TCI state by applying an antenna port quasi co-location assumption based on the TCI state. The receiving the downlink signal may comprise assuming at least one DM-RS antenna port for receiving the downlink signal being quasi co-located with a reference signal indicated by the TCI state. The wireless device may comprise one or more processors and memory, storing instructions, that when executed by the one or more processors perform the method described herein. A system may comprise the wireless device configured to perform the described method, additional operations, and/or include the additional elements; and a base station configured to transmit the one or more messages. A computer-readable medium may store instructions that, when executed, cause performance of the described method, additional operations, and/or include additional elements. A base station may perform a corresponding method comprising multiple operations. The base station may perform a corresponding method, for example, by transmitting the one or more messages.

A base station may perform a method comprising multiple operations. The base station may send a control command indicating a transmission configuration indicator (TCI) state for a cell, and may send DCI scheduling transmission of a downlink signal for the cell. A time offset between the DCI and the downlink signal may be less than a threshold. The base station may send the downlink signal using the TCI state based on: the time offset being less than the threshold; and the TCI state being associated with a physical cell identifier (PCI) of the cell. The downlink signal may be a physical downlink shared channel (PDSCH) signal; or an aperiodic channel state information-reference signal (CSI-RS). The base station may further send, via a control resource set (CORESET) and based on the TCI state, third DCI indicating a second TCI state for the cell. The sending the downlink signal using the TCI state may be further based on the second TCI state being associated with a second PCI different from the PCI of the cell. The threshold may be indicated by capability information of a wireless device. The sending the downlink signal using the TCI state may be further based on the second DCI being sent via a common search space set. At least two TCI states may be activated while the downlink signal is sent. The second DCI may indicate a second TCI state of the at least two activated TCI states. The sending the downlink signal using the TCI state may comprise sending the downlink signal using the TCI state by applying an antenna port quasi co-location assumption based on the TCI state. The sending the downlink signal may comprise assuming at least one DM-RS antenna port for receiving the downlink signal being quasi co-located with a reference signal indicated by the TCI state. The base station may comprise one or more processors and memory, storing instructions, that when executed by the one or more processors perform the method described herein. A system may comprise the base station configured to perform the described method, additional operations, and/or include the additional elements; and a wireless device configured to receive the one or more messages. A computer-readable medium may store instructions that, when executed, cause performance of the described method, additional operations, and/or include additional elements. A wireless device may perform a corresponding method comprising multiple operations. The wireless device may perform a corresponding method, for example, by receiving the one or more messages.

A wireless device may perform a method comprising multiple operations. A wireless device may monitor a control resource set (CORESET) based on a first transmission configuration indicator (TCI) state, may receive first downlink control information (DCI) indicating a second TCI state for a cell, may receive DCI scheduling transmission of a downlink signal for the cell. A time offset between the DCI and the downlink signal is less than a threshold. The wireless device may receive the downlink signal using the first TCI state based on: the time offset being less than the threshold; and the second TCI state being associated with a second physical cell identifier (PCI) different from a PCI of the cell. The downlink signal may be a physical downlink shared channel (PDSCH) reception; or an aperiodic channel state information-reference signal (CSI-RS). The receiving the downlink signal using the first TCI state may be further based on the first TCI state being associated with the PCI of the cell. The wireless device may further receive one or more configuration parameters indicating: a plurality of uplink power control sets for a cell; and at least two uplink power control sets of the plurality of uplink power control sets for an uplink bandwidth part (BWP) of the cell. The wireless device may receive third DCI indicating activation of a third TCI state; and based on the one or more configuration parameters not indicating an uplink power control set index for the third TCI state, may transmit an uplink signal via the uplink BWP of the cell and using a transmission power determined based on a first uplink power control set of the at least two uplink power control sets. The receiving the downlink signal using the first TCI state may be further based on the second DCI being received via a common search space set. At least two TCI states may be activated while the downlink signal is received. The second DCI may indicate a second TCI state of the at least two activated TCI states. The receiving the downlink signal using the TCI state may comprise receiving the downlink signal using the TCI state by applying an antenna port quasi co-location assumption based on the TCI state. The receiving the downlink signal may comprise assuming at least one DM-RS antenna port for receiving the downlink signal being quasi co-located with a reference signal indicated by the TCI state. The wireless device may comprise one or more processors and memory, storing instructions, that when executed by the one or more processors perform the method described herein. A system may comprise the wireless device configured to perform the described method, additional operations, and/or include the additional elements; and a base station configured to transmit the one or more messages. A computer-readable medium may store instructions that, when executed, cause performance of the described method, additional operations, and/or include additional elements. A base station may perform a corresponding method comprising multiple operations. The base station may perform a corresponding method, for example, by transmitting the one or more messages.

A wireless device may perform a method comprising multiple operations. A wireless device may receive one or more configuration parameters indicating: a plurality of uplink power control sets for a cell; and at least two uplink power control sets of the plurality of uplink power control sets for an uplink bandwidth part (BWP) of the cell. The wireless device may receive a downlink control information (DCI) indicating activation of a transmission configuration indicator (TCI) state; and in response to the one or more configuration parameters not indicating an uplink power control set index for the TCI state. The wireless device may transmit, via the uplink BWP of the cell, an uplink signal with a transmission power determined based on one of the at least two uplink power control sets. The TCI state and the one of the at least two uplink power control sets may be associated with the same physical cell index (PCI). The DCI may indicate activation of a single TCI state. The one of the at least two uplink power control sets may be an uplink power control set that occurs first in a list/vector/set of the at least two uplink power control sets. The one of the at least two uplink power control sets may be an uplink power control set, among the at least two uplink power control sets, with a lowest uplink power control set index. The wireless device may receive an activation command that indicates mapping of at least two TCI states to a TCI codepoint, wherein the at least two TCI states may comprise a first TCI state and a second TCI state. The DCI may comprise a TCI field indicating the TCI codepoint. A first octet, of the activation command, comprising a first TCI state index identifying the first TCI state may be lower than a second octet, of the activation command, comprising a second TCI state index identifying the second TCI state. The one of the at least two uplink power control sets may be: a first uplink power control set of the at least two uplink power control sets based on the TCI state being the first TCI state; and a second uplink power control set of the at least two uplink power control sets based on the TCI state being the second TCI state. The first uplink power control set may occur first in a list/vector/set of the at least two uplink power control sets; and the second uplink power control set may occur second in the list/vector/set of the at least two uplink power control sets. The first uplink power control set may be identified with a lower uplink power control set index than the second uplink power control set; and the second uplink power control set may be identified with a higher uplink power control set index than the first uplink power control set. The TCI state may be not associated with any uplink power control set of the plurality of uplink power control sets based on the one or more configuration parameters not indicating an uplink power control set index for the TCI state. The one or more configuration parameters may indicate, for the uplink BWP of the cell, at least two uplink power control set indexes identifying the at least two uplink power control sets, wherein each uplink power control set index of the at least two uplink power control set indexes may identify a respective uplink power control set of the at least two uplink power control sets. The transmitting the uplink signal may be further based on the TCI state. The wireless device may further determine the transmission power based on one or more power control parameters indicated by the one of the at least two uplink power control sets. The one or more power control parameters may comprise at least one of: a target received power parameter; a closed-loop index parameter; and a pathloss compensation factor parameter. The one of the at least two uplink power control sets may be: the first uplink power control set of the at least two uplink power control sets based on the first TCI state being associated with a first control resource set (coreset) pool index; and the second uplink power control set of the at least two uplink power control sets based on the second TCI state being associated with a second coreset pool index. The TCI state and the one of the at least two uplink power control sets are associated with: a PCI of the cell; or a second PCI different from the PCI of the cell. The one or more configuration parameters may indicate a list of additional PCI indexes for the plurality of uplink power control sets, wherein each additional PCI index of the list of additional PCI indexes may be associated with a respective uplink power control set of the plurality of uplink power control sets. A size of the list of additional PCI indexes may be determined based on a number of the plurality of uplink power control sets. A list of PCI sets may be associated with the plurality of uplink power control sets, wherein each PCI set of the list of PCI sets may be associated with a respective uplink power control set of the at least two uplink power control sets. A first uplink power control set that occurs first in the at least two uplink power control sets may be associated with a PCI of the cell; and a second uplink power control set that occurs second in the at least two uplink power control sets may be associated with a PCI set that occurs first in the list of PCI sets. A first uplink power control set that occurs first in the at least two uplink power control sets may be associated with a first PCI set that occurs first in the list of PCI sets; and a second uplink power control set that occurs second in the at least two uplink power control sets may be associated with a second PCI set that occurs second in the list of PCI sets. The wireless device may further activate the uplink BWP as an active uplink BWP of the cell. A wireless device may receive one or more configuration parameters indicating at least two uplink power control sets for an uplink bandwidth part (BWP) of a cell, may receive a downlink control information (DCI) indicating activation of a transmission configuration indicator (TCI) state associated with a physical cell index (PCI), in response to the TCI state not being associated with any uplink power control set, may select an uplink power control set, among the at least two uplink power control sets, associated with the PCI of the TCI state; and may transmit, via the uplink BWP of the cell, one or more uplink signals with a transmission power determined based on the selected uplink power control set. The wireless device may comprise one or more processors and memory, storing instructions, that when executed by the one or more processors perform the method described herein. A system may comprise the wireless device configured to perform the described method, additional operations, and/or include the additional elements; and a base station configured to transmit the one or more messages. A computer-readable medium may store instructions that, when executed, cause performance of the described method, additional operations, and/or include additional elements. A base station may perform a corresponding method comprising multiple operations. The base station may perform a corresponding method, for example, by transmitting the one or more messages.

A wireless device may perform a method comprising multiple operations. A wireless device may receive a first downlink control information (DCI) indicating activation of at least two transmission configuration indicator (TCI) states for a cell, may receive a second DCI scheduling transmission of a downlink signal, wherein a time offset between the second DCI and the downlink signal is less than a threshold; and based on the time offset being less than the threshold, may receive the downlink signal based on a TCI state among the at least two TCI states. The downlink signal may be a physical downlink shared channel (PDSCH) transmission. The downlink signal may be an aperiodic channel state information reference signal (CSI-RS). The TCI state may be identified with a lowest TCI state index among at least two TCI state indexes of the at least two TCI state indexes. The receiving the downlink signal based on the TCI state may be in response to the TCI state being associated with a physical cell index (PCI) of the cell. The receiving the downlink signal based on the TCI state may be in response to the second DCI being a DCI format 1_0. The receiving the second DCI may be via a search space set associated with a control resource set (coreset). The receiving the downlink signal based on the TCI state may be in response to the search space set being a common search space set. At least one demodulation reference signal (DM-RS) antenna port of the PDSCH transmission may be quasi co-located (QCL-ed) with a reference signal indicated by the TCI state. The receiving the aperiodic CSI-RS based on the TCI state may comprise determining a radio link quality of the aperiodic CSI-RS based on a reference signal indicated by the TCI state. The wireless device may transmit a CSI report indicating the radio link quality of the aperiodic CSI-RS. The TCI state may occur first in a list of the at least two TCI states. The wireless device may further receive an activation command indicating mapping of the at least two TCI states to a TCI codepoint. The second DCI may comprise a TCI field with a value indicating the TCI codepoint. An octet, of the activation command, comprising a TCI state index identifying the TCI state may be lowest among at least two octets, of the activation command, comprising at least two TCI state indexes identifying the at least two TCI states. The wireless device may comprise one or more processors and memory, storing instructions, that when executed by the one or more processors perform the method described herein. A system may comprise the wireless device configured to perform the described method, additional operations, and/or include the additional elements; and a base station configured to transmit the one or more messages. A computer-readable medium may store instructions that, when executed, cause performance of the described method, additional operations, and/or include additional elements. A base station may perform a corresponding method comprising multiple operations. The base station may perform a corresponding method, for example, by transmitting the one or more messages.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or Information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising: receiving, by a wireless device, a control command indicating a transmission configuration indicator (TCI) state; receiving downlink control information (DCI) scheduling transmission of a downlink signal, wherein a time offset between the DCI and the downlink signal is less than a threshold; and based on the time offset being less than the threshold and the TCI state being associated with a physical cell identifier (PCI) of a serving cell, receiving the downlink signal using the TCI state.

2. The method of claim 1, further comprising: receiving, by the wireless device, one or more configuration parameters indicating: a plurality of uplink power control sets for a second cell; and at least two uplink power control sets of the plurality of uplink power control sets for an uplink bandwidth part (BWP) of the second cell; receiving second DCI indicating activation of a second TCI state; and based on the one or more configuration parameters not indicating an uplink power control set index for the second TCI state, transmitting an uplink signal via the uplink BWP of the second cell and using a transmission power determined based on a first uplink power control set of the at least two uplink power control sets.

3. The method of claim 1, wherein the downlink signal is: a physical downlink shared channel (PDSCH) reception; or an aperiodic channel state information-reference signal (CSI-RS).

4. The method of claim 1, further comprising: monitoring, by the wireless device, a control resource set (CORESET) based on the TCI state; receiving second DCI indicating a second TCI state; and wherein the receiving the downlink signal using the TCI state is further based on the second TCI state being associated with a second PCI different from the PCI of the serving cell.

5. The method of claim 1, wherein the threshold is indicated by capability information of the wireless device.

6. The method of claim 1, wherein the receiving the downlink signal using the TCI state comprises receiving the downlink signal using the TCI state by applying an antenna port quasi co-location assumption based on the TCI state.

7. The method of claim 1, wherein the receiving the downlink signal by the TCI state comprises assuming at least one DM-RS antenna port for receiving the downlink signal being quasi co-located with a reference signal indicated by the TCI state.

8. A method comprising: monitoring, by a wireless device, a control resource set (CORESET) based on a first transmission configuration indicator (TCI) state; receiving a control command indicating a second TCI state; receiving downlink control information (DCI) scheduling transmission of a downlink signal, wherein a time offset between the DCI and the downlink signal is less than a threshold; and based on the time offset being less than the threshold and the second TCI state being associated with a second physical cell identifier (PCI) different from a PCI of a serving cell, receiving the downlink signal using the first TCI state.

9. The method of claim 8, further comprising: receiving, by the wireless device, one or more configuration parameters indicating: a plurality of uplink power control sets for a second cell; and at least two uplink power control sets of the plurality of uplink power control sets for an uplink bandwidth part (BWP) of the second cell; receiving second DCI indicating a third TCI state; and based on the one or more configuration parameters not indicating an uplink power control set index for the third TCI state, transmitting an uplink signal via the uplink BWP of the cell and using a transmission power determined based on a first uplink power control set of the at least two uplink power control sets.

10. The method of claim 8, wherein the downlink signal is: a physical downlink shared channel (PDSCH) reception; or an aperiodic channel state information-reference signal (CSI-RS).

11. The method of claim 8, wherein the receiving the downlink signal using the TCI state comprises receiving the downlink signal using the TCI state by applying an antenna port quasi co-location assumption based on the TCI state.

12. The method of claim 8, wherein the receiving the downlink signal comprises assuming at least one DM-RS antenna port for receiving the downlink signal being quasi co-located with a reference signal indicated by the TCI state.

13. The method of claim 8, wherein the receiving the downlink signal using the first TCI state is further based on the first TCI state being associated with the PCI of the serving cell.

14. A method comprising: receiving, by a wireless device, one or more configuration parameters indicating: a plurality of uplink power control sets for a serving cell; and at least two uplink power control sets of the plurality of uplink power control sets for an uplink bandwidth part (BWP) of the serving cell; receiving downlink control information (DCI) indicating a transmission configuration indicator (TCI) state; and transmitting, via the uplink BWP of the serving cell and using a transmission power that is based on a first uplink power control set of the at least two uplink power control sets, an uplink signal based on: the one or more configuration parameters not indicating an uplink power control set index for the TCI state; and the first uplink power control set being associated with a physical cell identifier (PCI) of the serving cell.

15. The method of claim 14, further comprising: receiving second DCI scheduling transmission of a downlink signal, wherein a time offset between the second DCI and the downlink signal is less than a threshold; and based on the time offset being less than the threshold and the TCI state being associated with the PCI of the serving cell, receiving the downlink signal using the TCI state.

16. The method of claim 14, further comprising: monitoring, by the wireless device, a control resource set (CORESET) based on a second TCI state; receiving second DCI scheduling transmission of a downlink signal, wherein a time offset between the second DCI and the downlink signal is less than a threshold; and based on the time offset being less than the threshold and the TCI state being associated with a PCI different from the PCI of the serving cell, receiving the downlink signal using the second TCI state.

17. The method of claim 14, further comprising determining the first uplink power control set for transmitting the uplink signal based on: the PCI being associated with the TCI state.

18. The method of claim 14, further comprising:

receiving second DCI indicating a second TCI state; and transmitting, based on the one or more configuration parameters not indicating an uplink power control set for the second TCI state, a second uplink signal using a second transmission power determined based on a second uplink power control set of the at least two uplink power control sets.

19. The method of claim 14, further comprising:

receiving second DCI indicating a second TCI state; and transmitting, based on the one or more configuration parameters indicating a second uplink power control set for the second TCI state, a second uplink signal using a second transmission power determined based on the second uplink power control set.

* * * * *